United States Patent
Compagnone, Jr.

(10) Patent No.: US 7,608,781 B2
(45) Date of Patent: *Oct. 27, 2009

(54) TEMPORARY PROTECTIVE COVER FOR AN ELECTRICAL BOX

(76) Inventor: Carlo Compagnone, Jr., P.O. Box 600032, Newtonville, MA (US) 02460

( * ) Notice: Subject to any disclaimer, the term of this patent is extended or adjusted under 35 U.S.C. 154(b) by 0 days.

This patent is subject to a terminal disclaimer.

(21) Appl. No.: 11/448,298

(22) Filed: Jun. 7, 2006

(65) Prior Publication Data

US 2006/0278421 A1 Dec. 14, 2006

Related U.S. Application Data

(63) Continuation-in-part of application No. 10/947,651, filed on Sep. 22, 2004, which is a continuation-in-part of application No. 10/459,268, filed on Jun. 11, 2003, now Pat. No. 6,867,370, which is a continuation-in-part of application No. 10/170,101, filed on Jun. 12, 2002, now Pat. No. 6,686,540, which is a continuation-in-part of application No. 09/800,141, filed on Mar. 5, 2001, now abandoned, which is a continuation-in-part of application No. 09/590,103, filed on Jun. 8, 2000, now abandoned.

(51) Int. Cl.
*H01H 9/02* (2006.01)

(52) U.S. Cl. ............... 174/58; 174/66; 174/67; 220/3.8; 220/241; 220/242

(58) Field of Classification Search ........... 174/66, 174/67, 53, 58, 57, 54, 480, 481; 220/3.2, 220/3.8, 3.7, 241, 242; 33/DIG. 10, 528, 33/562; 16/DIG. 2; 118/505, 504, 506; D13/154, D13/156, 177; 200/333; D8/352

See application file for complete search history.

(56) References Cited

U.S. PATENT DOCUMENTS

| | | | | | |
|---|---|---|---|---|---|
| 1,956,196 | A | * | 4/1934 | Korab | 220/3.4 |
| 3,619,477 | A | * | 11/1971 | Rasmussen | 174/56 |
| 3,745,664 | A | * | 7/1973 | Altseimer | 33/DIG. 10 |
| 3,987,928 | A | * | 10/1976 | Mori | 220/241 |
| 4,979,633 | A | * | 12/1990 | Lakey | 220/3.8 |
| D345,142 | S | * | 3/1994 | Porter | D13/156 |
| 5,359,152 | A | * | 10/1994 | Hone-Lin | 174/53 |
| 5,526,952 | A | * | 6/1996 | Green | 220/241 |
| 5,639,991 | A | * | 6/1997 | Schuette | 174/58 |
| 5,902,960 | A | * | 5/1999 | Smith | 174/66 |
| 6,103,974 | A | * | 8/2000 | Erdfarb | 174/66 |
| 6,166,329 | A | * | 12/2000 | Oliver et al. | 174/66 |

(Continued)

*Primary Examiner*—Angel R Estrada
(74) *Attorney, Agent, or Firm*—Kriegsman & Kriegsman

(57) ABSTRACT

A temporary protective cover which can be removably attached to a plaster ring which can be removably mounted onto an electrical box having an open front end includes a plate sized and shaped to be removably mounted onto the plaster ring, a pair of wings formed onto the plate for removably securing the cover onto the plaster ring and a pair of posts formed onto the plate for removably securing the cover onto the plaster ring. Each wing is shaped to include a flexible leg and a pair of feet one at each end of the wing. The posts are shaped and sized to be press fit into bores on the plaster ring. In use, the wings and the posts both serve to removably secure the cover to the plaster ring.

26 Claims, 48 Drawing Sheets

U.S. PATENT DOCUMENTS

| | | | |
|---|---|---|---|
| 6,462,278 B1 * | 10/2002 | Vrame | 174/67 |
| 6,479,749 B1 * | 11/2002 | Vrame | 174/67 |
| 6,538,202 B1 * | 3/2003 | Shaffer et al. | 174/66 |
| 6,686,540 B2 * | 2/2004 | Compagnone, Jr. | 174/58 |
| 6,867,370 B2 * | 3/2005 | Compagnone, Jr. | 174/58 |
| 7,102,079 B1 * | 9/2006 | Kurtin | 174/58 |
| 7,390,965 B2 * | 6/2008 | Hartwig | 174/66 |

* cited by examiner

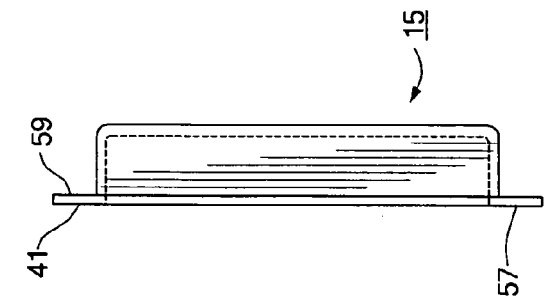
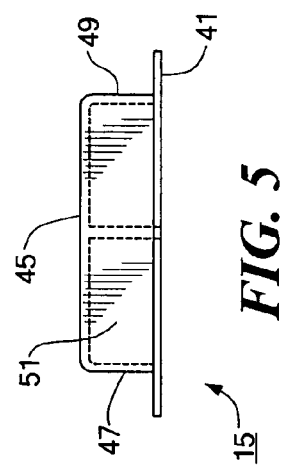
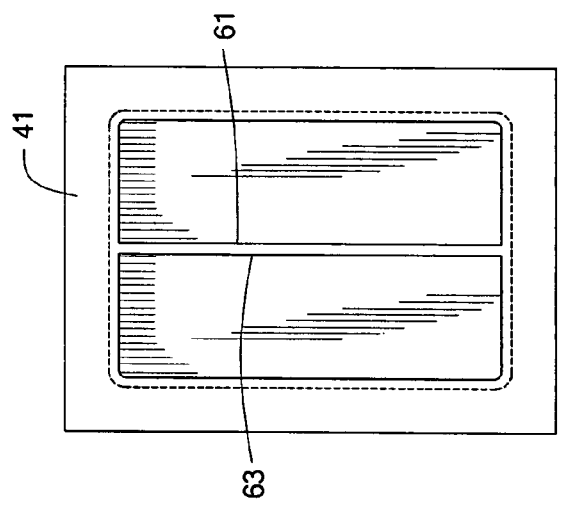
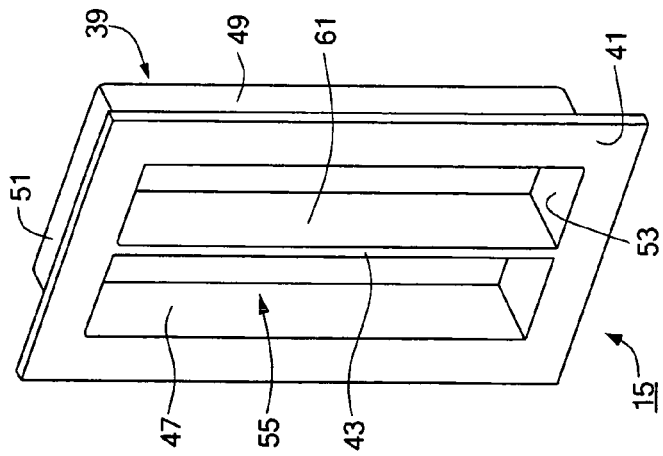

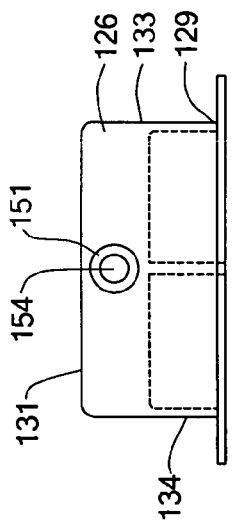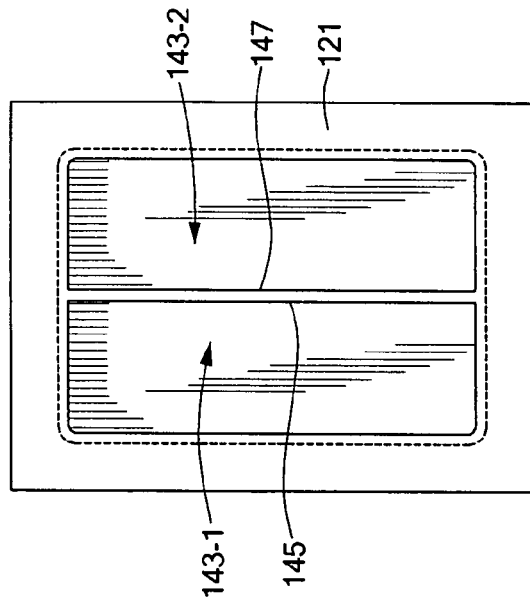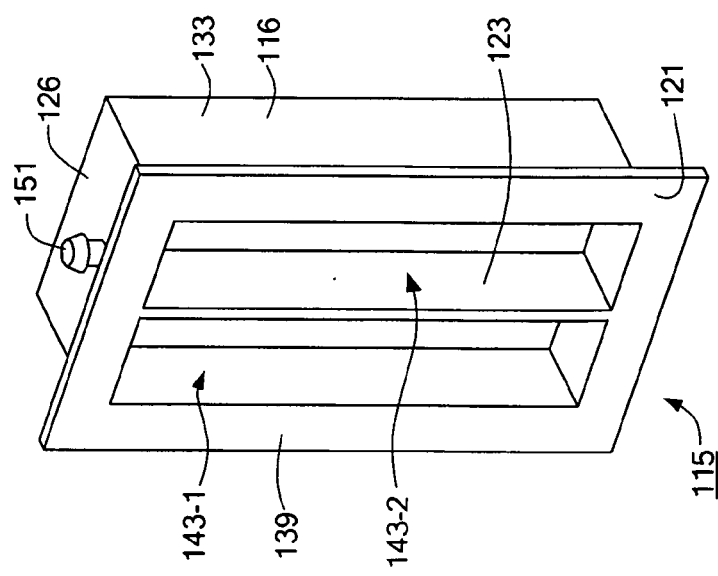

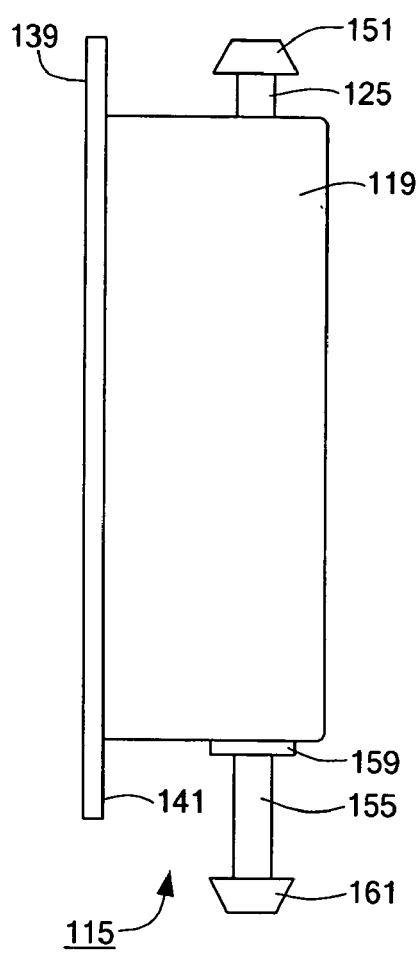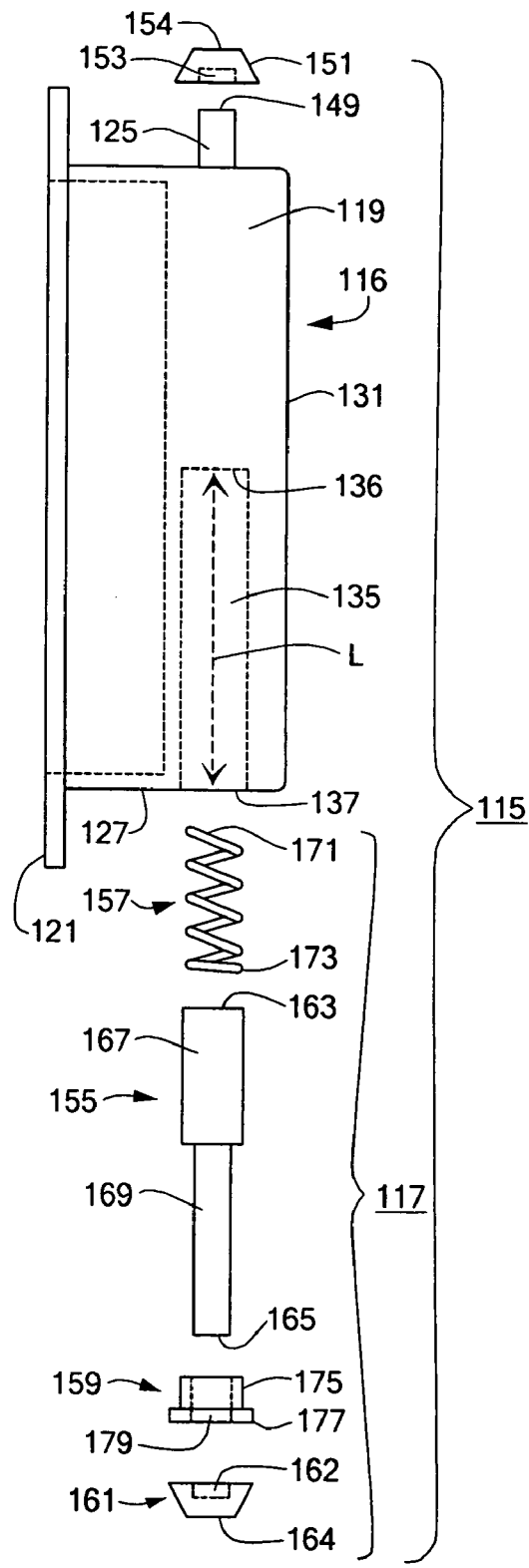
FIG. 19
FIG. 20

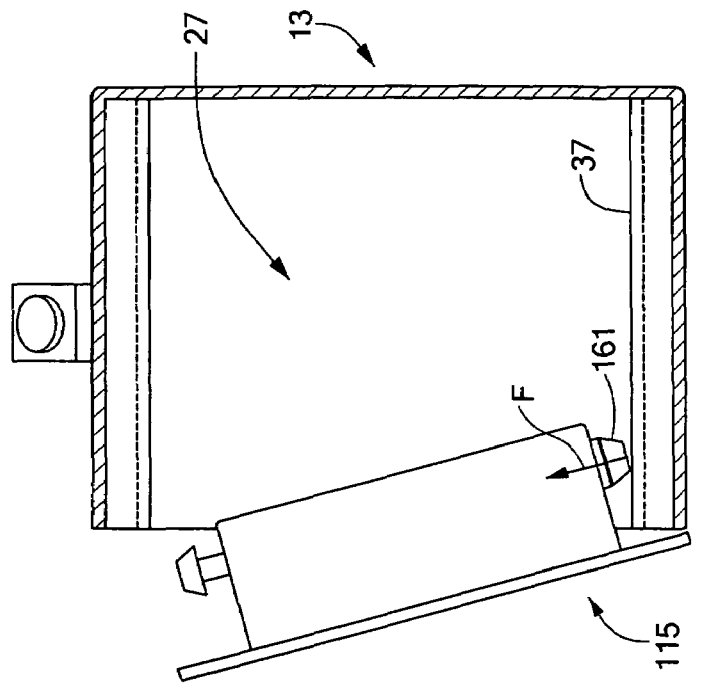
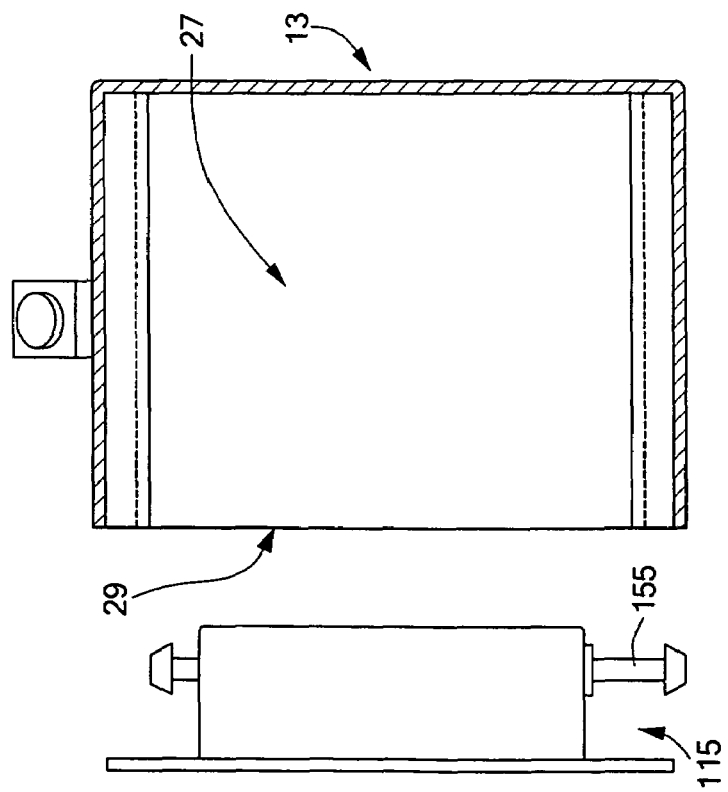
FIG. 23 (a)
FIG. 23 (b)

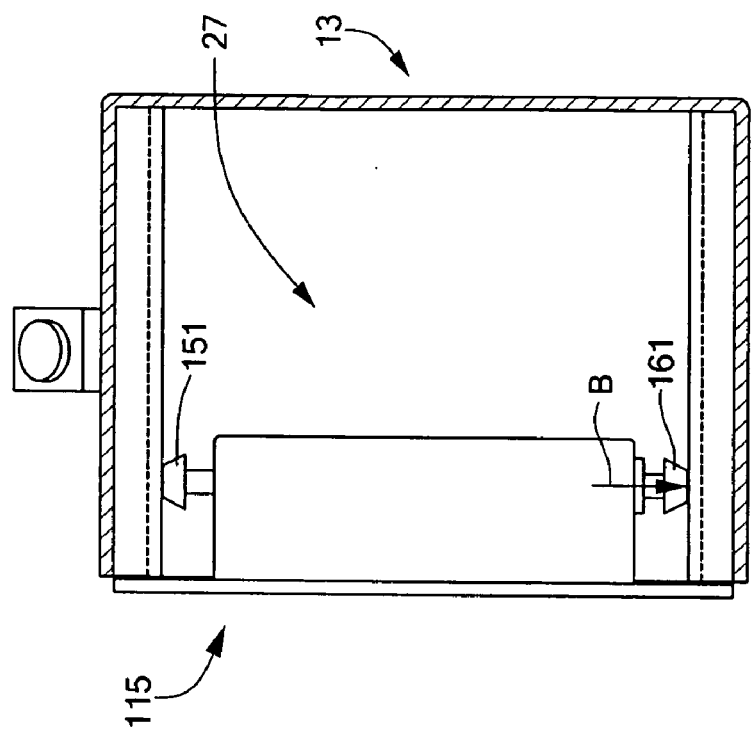
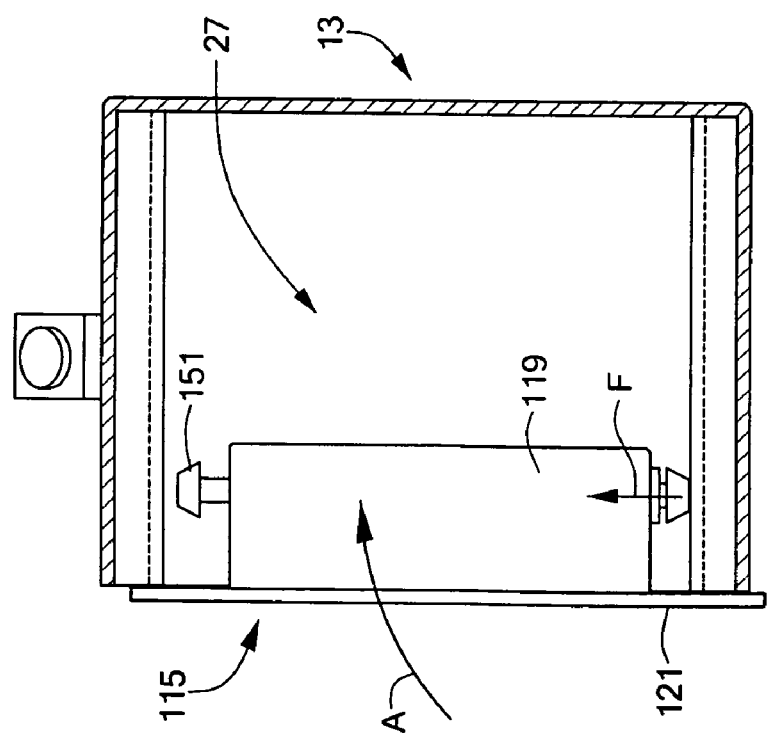
FIG. 23 (d)
FIG. 23 (c)

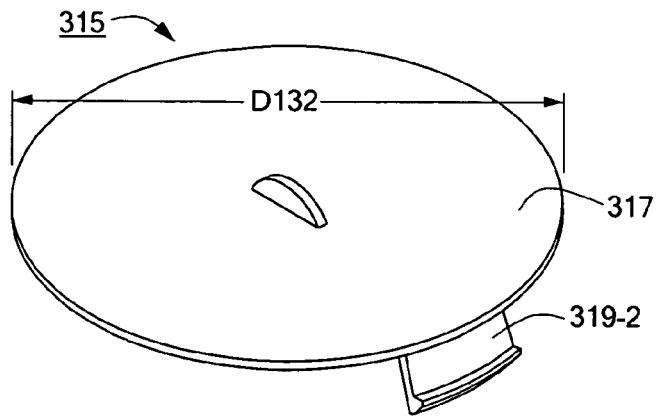
FIG. 32
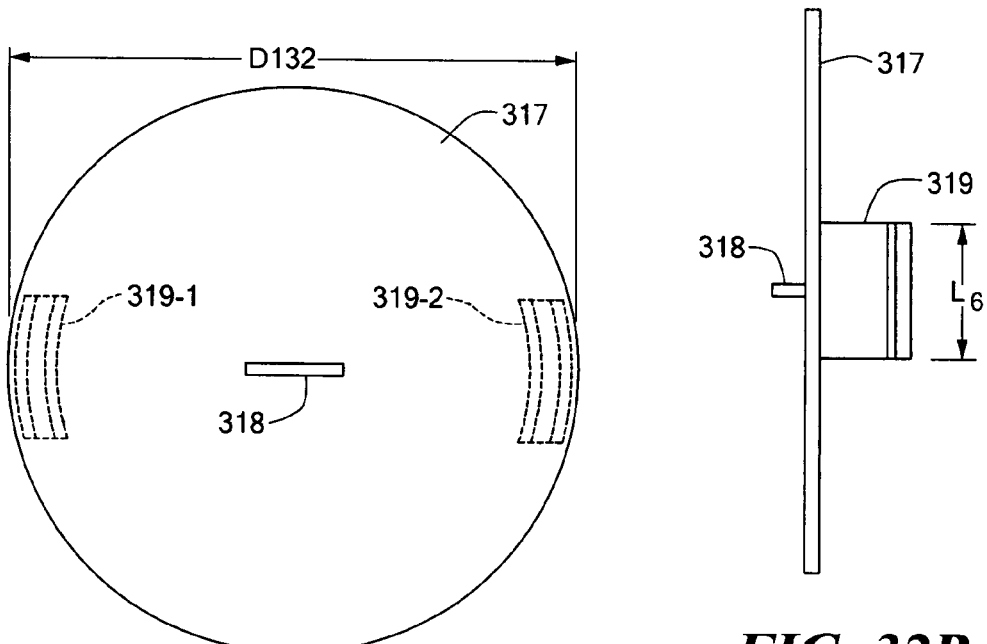
FIG. 32A  FIG. 32B
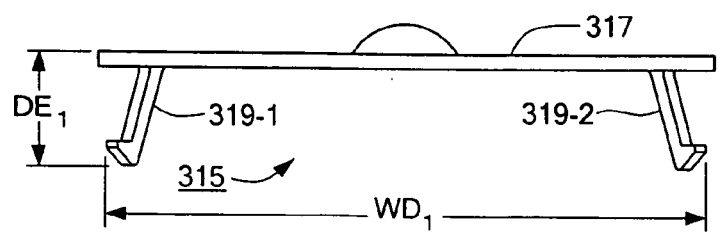
FIG. 33

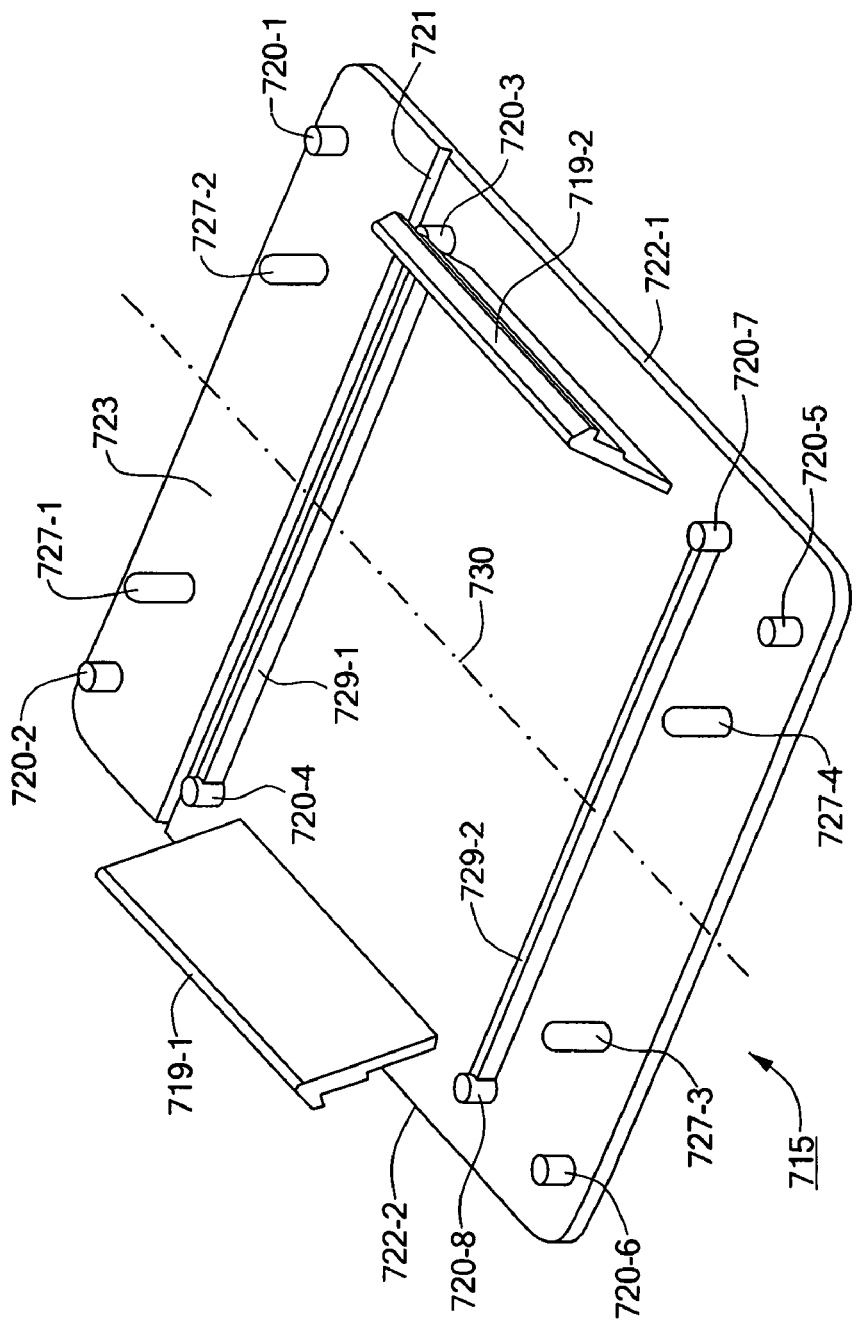

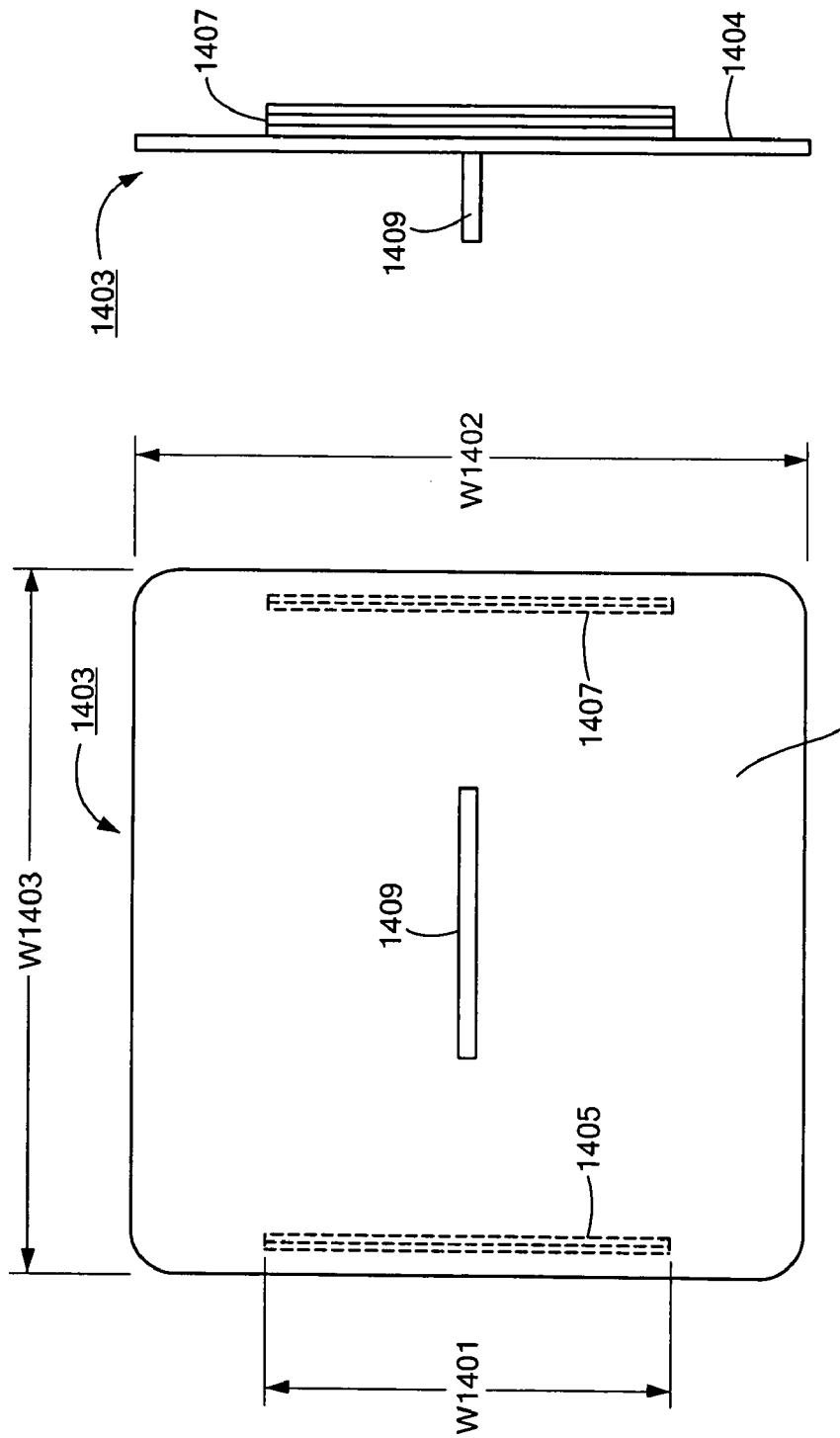

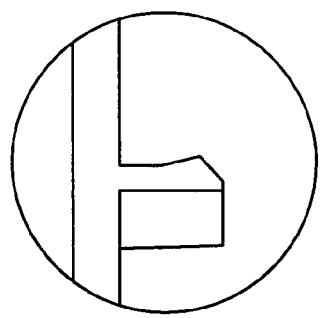
FIG. 62E
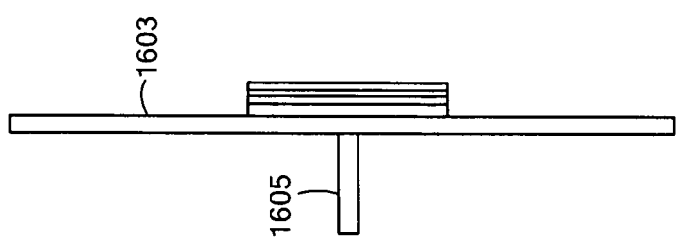
FIG. 62D
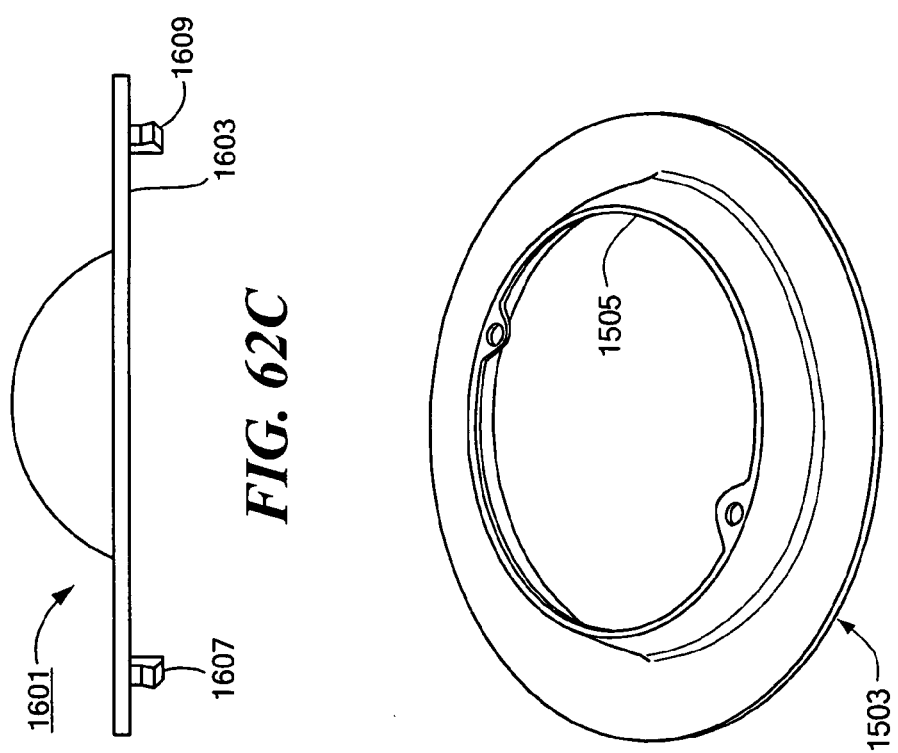
FIG. 62C
FIG. 62

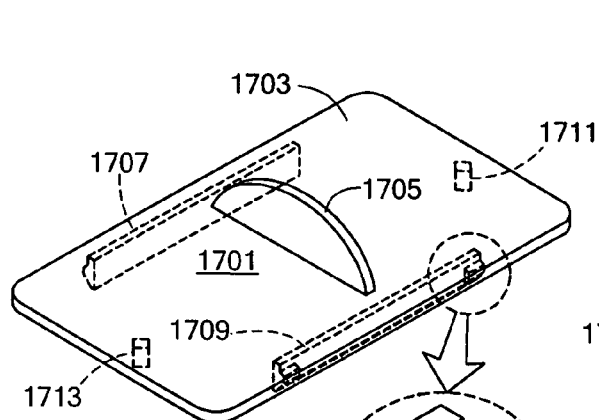
FIG. 63A
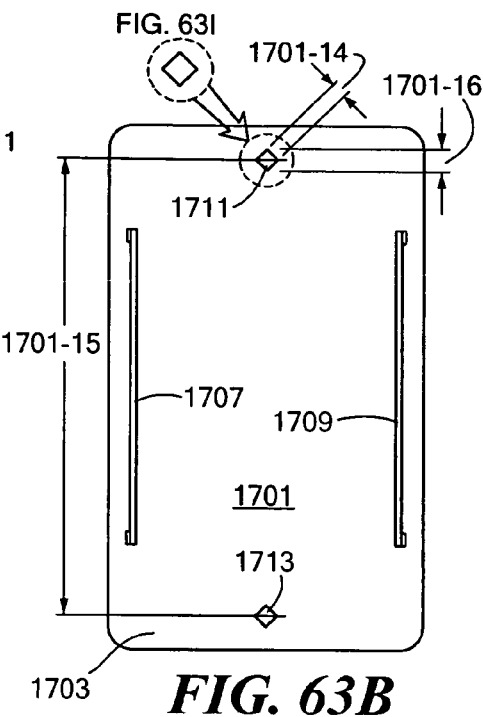
FIG. 63B
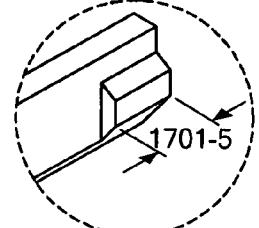
FIG. 63G
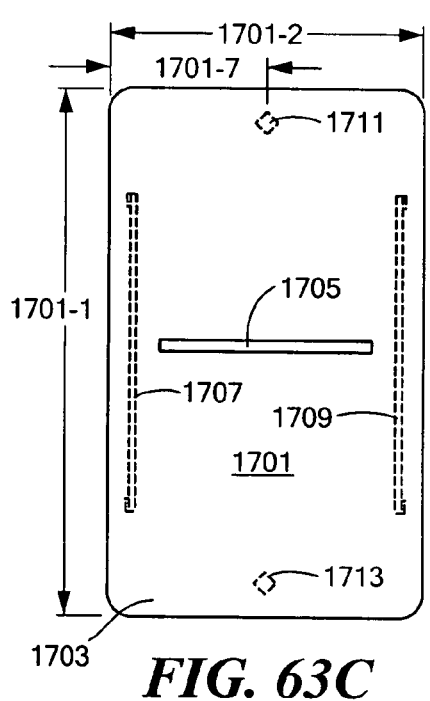
FIG. 63C
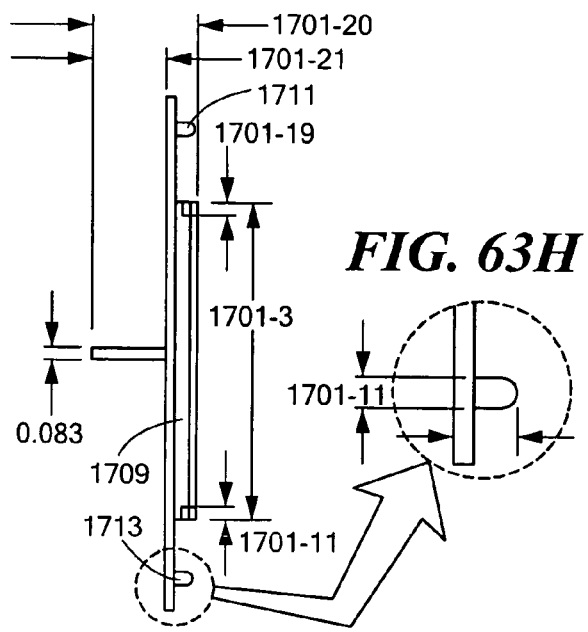
FIG. 63D
FIG. 63H

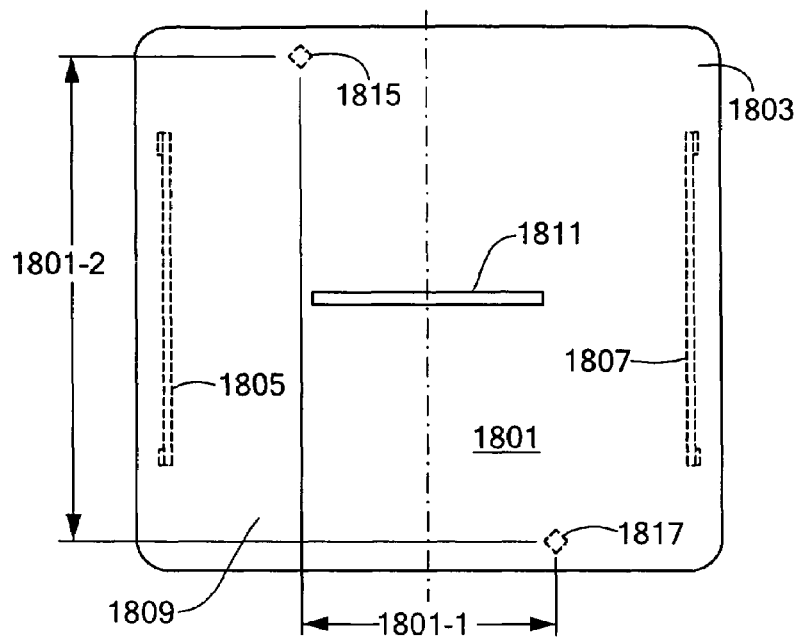
FIG. 64B
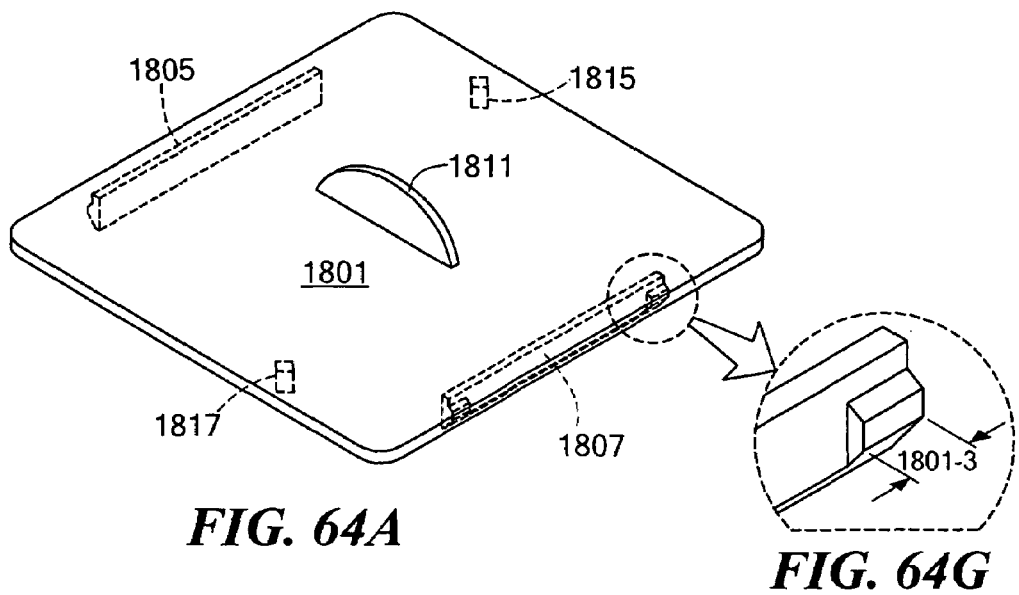
FIG. 64A  FIG. 64G

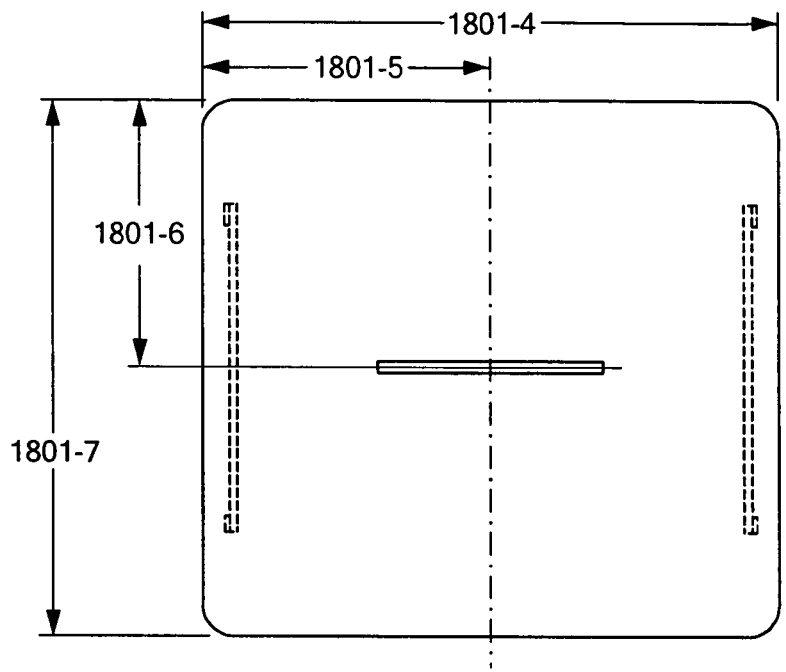
FIG. 64C
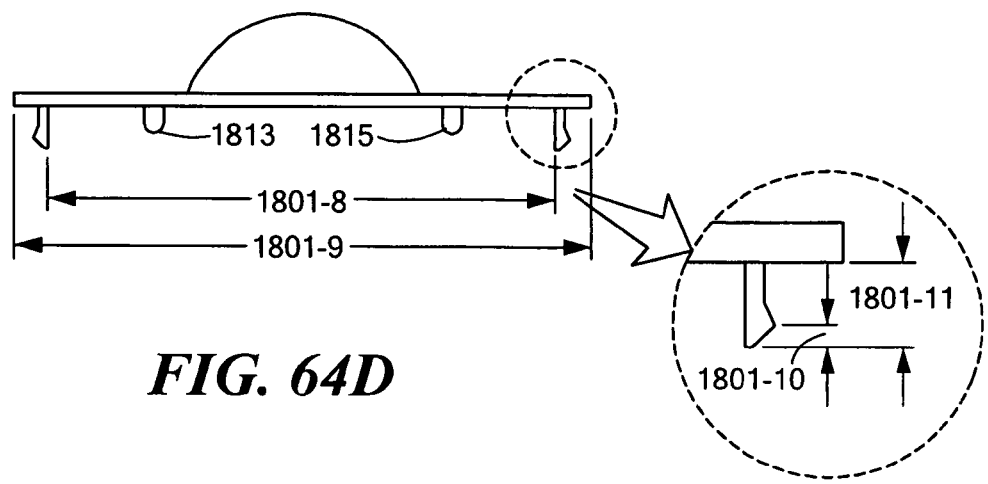
FIG. 64D
FIG. 64F

TEMPORARY PROTECTIVE COVER FOR AN ELECTRICAL BOX

CROSS-REFERENCE TO RELATED APPLICATIONS

This application is a continuation-in-part of U.S. patent application Ser. No. 10/947,651 which was filed on Sep. 22, 2004, in the name of Carlo Compagnone, Jr., which in turn is a continuation-in-part of U.S. patent application Ser. No. 10/459,268 which was filed on Jun. 11, 2003 in the name of Carlo Compagnone, and is now U.S. Pat. No. 6,867,370 and is incorporated herein by reference, which in turn is a continuation-in-part of U.S. patent application Ser. No. 10/170,101 which was filed on Jun. 12, 2002 in the name of Carlo Compagnone, Jr. and is now U.S. Pat. No. 6,686,540 and is incorporated herein by reference, which in turn is a continuation-in-part of U.S. patent application Ser. No. 09/800,141, which was filed on Mar. 5, 2001 in the name of Carlo Compagnone, Jr. and is now abandoned which, in turn, is a continuation-in-part of U.S. patent application Ser. No. 09/590,103, which was filed on Jun. 8, 2000 in the name of Carlo Compagnone, Jr. and is now abandoned.

BACKGROUND OF THE INVENTION

The present invention relates generally to electrical wiring and, more particularly, to electrical boxes for electrical wiring.

Electrical boxes are well known in the art and are commonly used to perform two principal functions. First, an electrical box commonly serves as a mounting structure for installing an electrical device, such as an outlet, switch or fixture, into a covering, such as a wall or ceiling panel. Second, an electrical box commonly serves as a connection point for coupling the electrical device to electrical wires which, in turn, are connected to a main power source.

Electrical boxes are commonly manufactured in various shapes and sizes. The particular size and shape of an electrical box is based largely upon the particular application in which the box is to be used. Specifically, different types of electrical boxes are constructed according to the location in which the electrical box is to be installed. For example, a wall box is one well known type of electrical box which is commonly used as a mounting structure for installing an electrical device, such as an outlet or switch, into a wall and as a connection point for electrically coupling the device to a main power source. As another example, a ceiling box is another well known type of electrical box which is commonly used as a mounting structure for installing an electrical device, such as a light or fan, into a ceiling and as a connection point for electrically coupling the device to a main power source.

Electrical boxes are also commonly manufactured out of different materials. As a first example, electrical boxes are commonly constructed of metal. Metal electrical boxes are desirable in that they are considerably durable and sturdy in construction. However, metal electrical boxes are undesirable in that they require proper grounding in order to avoid dangerous electrical conditions. As a second example, electrical boxes are also commonly constructed of a nonmetallic material, such as plastic. Nonmetallic electrical boxes are desirable in that they are considerably inexpensive to manufacture and do not require electrical grounding.

Electrical boxes are further constructed to include different mounting devices based upon the stage in construction when the electrical box is installed. For example, an old-work, or cut-in, electrical box is one well known type electrical box which is designed to be mounted into a hole in a covering, such as a wall or ceiling panel, which is already mounted onto one or more support beams. As another example, a new-work electrical box is another well known type of electrical box which is designed to be installed directly on a support beam before the covering is mounted onto the support beams.

Electrical boxes are typically shaped to include a back panel and one or more side panels which project out perpendicularly out from the back panel. The back panel and the one or more side panels together define an interior cavity into which electrical wiring is disposed. Each of the one or more side panels includes a free front edge, the free front edges of the one or more side panels together defining an open front end which provides access into the interior cavity of the electrical box. The particular volume of the interior cavity of the box is typically designed based upon the number of wires entering the box and the type and number of devices attached onto the box. Electrical boxes also commonly include one or more outwardly projecting tabs which facilitate mounting the box onto a structure. Specifically, each outwardly projecting tab is adapted to receive a securing device, such as a nail or screw, which, in turn, can be disposed into a structure, such as a support beam or wall panel, so as to fixedly mount the box onto the structure.

In use, a nonmetallic, new-work wall box can be used to install an electrical receptacle, or outlet, into a wall in the following manner. During the preliminary stages of constructing a building, support beams, typically in the form of wooden two-by-fours, are typically erected in order to define the general room configurations of the building. With the support beams erected, a nail disposed through each tab of the wall box is driven into a support beam, thereby fixedly mounting the wall box onto an associated support beam at a desired location within a room of the building.

With the wall box mounted onto the support beam as such, electrical wiring which is coupled to the main electrical power source is run amongst the support beams and into the various rooms of the building. Particular wires of the electrical wiring are fed through the wall box and into its interior cavity in order to provide electrical power to the outlet which is subsequently installed in the wall box. Specifically, selected wires which are coupled to the main electrical power source are passed through openings which are provided in the back panel or in one or more of the side panels, the openings commonly being created by removing break-away tabs which are pre-formed in the box.

Having mounted the wall box onto an associated support beam and having fed selected electrical wires into the interior cavity of the wall box as noted above, various sections of wall paneling, such as blue board, are then mounted onto the support beams to enclose the various rooms of the building. It should be noted that the sections of wall paneling are typically mounted onto the support beams directly over the wall box. In fact, the sections of wall paneling typically are mounted onto the support beams so as to abut directly against the open front end of the box. Because the wall paneling abuts against the open front end of the wall box, the section of wall paneling which is disposed directly over the wall box is often slightly raised or bubbled.

As can be appreciated, with the wall panels mounted onto the support beams directly over the wall box, an electrician is unable to access the interior cavity of the wall box and, as a result, is unable to install the electrical outlets into the wall. Accordingly, a worker is required to create an opening in the wall panels at the location of the wall box in order to provide a means of accessing the interior cavity of the wall box.

Conventionally, a router is used to pierce through the wall panels and cut out the wall box.

Once the wall panels have been cut so as to expose the interior recess of the wall box, a worker plasters the wall panels. After the wall panels have been plastered, another worker paints the wall panels, thereby completing construction of the wall of the room. With construction of the wall having been completed, an electrician connects one or more electrical outlets to the wires which are disposed within the interior cavity of the wall box in order to electrically connect the outlets to the main power source. After electrically connecting the outlets to the main power source, the outlets are disposed within the interior recess of the wall box and are fixedly retained in place by disposing one or more screws through openings formed in the electrical outlets and into engagement with a threaded bore formed in the wall box. A plastic cover plate is then commonly disposed over the outlets and is fixedly secured in place by one or more screws.

Although well known and widely used in commerce, electrical boxes of the type described above often suffer from some notable drawbacks.

As a first example, it has been found that disposing electrical wires within an electrical box having an open front end leaves the wires exposed during subsequent stages of construction, which is highly undesirable. Specifically, when an operator uses a router to cut an opening in the panels in order to access the interior cavity of a new-work box, the router, on occasion, will contact the wires disposed within the box. As a consequence, it has been found that establishing contact between the router and the wires can significantly damage the wires and/or create a potentially dangerous condition, which is highly undesirable.

As a second example, it has been found that, when a plasterer plasters over the wall panels or when a router cuts out a new-work wall box, significant amounts of debris can often accumulate within the interior cavity of the wall box. As a result, an electrician is forced to clean out the debris which has collected within the wall box before installing the electrical device, thereby rendering the work of the electrician more labor intensive, which is highly undesirable. Accordingly, temporary removable covers for enclosing electrical boxes are well known in the art.

As an example, in U.S. Pat. No. 6,103,974 to J. Erdfarb there is disclosed a paint cover including a plate having a front and rear surface. The front surface having a top, bottom and side portion. The top, bottom and side continuous outer edges which project rearward from the front surface, wherein the outer edge is curved and tapered. The rear surface having a top, bottom and side portions and a flexible arm extending rearwardly from each of the side portions of the rear surface, wherein the arms upon insertion into an outlet assembly frictionally engage the inside of the assembly so as to extend a force to secure the paint cover to an outlet box.

As another example, in U.S. Pat. No. 5,526,952 to R. L. Green there is disclosed a temporary protective cover for electrical outlet boxes and the like which prevents the boxes from being covered with wall material during installation, prevents paint and plaster from entering the boxes during finishing operations, and also prevents electrical shock from contact with exposed wires. The cover is molded in one piece and is constructed of polymeric material. The cover is universally dimensioned to cover the box openings of all conventionally sized boxes and includes a base member for encasing electrical elements positioned in and extending outwardly from the boxes. A plurality of retaining members frictionally secure the cover over the box openings. A plurality of projections extend from the cover to indicate the location of the box openings, to mark the periphery thereof on drywall for subsequent cutting, and to prevent wire damage during cutting. A plurality of holes are also provided in the cover for receiving fasteners to provide further securement of the cover over the openings.

As another example, in U.S. Pat. No. 5,562,222 to R. L. Jordan, there is disclosed a temporary cover for electrical outlet boxes which seals such boxes during the finishing stages of building construction, for plastering and wallboard work on interior walls and the like. The cover comprises a very thin sheet of continuous, unbroken material having an inwardly extending flange which is sized to frictionally engage the inner surfaces of the walls of the outlet box. The cover is pressed into place in the box opening, and plastering or wallboard joint compound work may be performed without possibility of contaminating the electrical box with plaster, wallboard joint compound, or similar materials, and/or possibly completely filling the box with the subsequent problems of locating the concealed box and/or accessing wiring or other components therein which have been covered by plaster or other material. The cover may be removed easily by an inwardly protruding grip, and may be economically discarded after a single use due to its construction of thin vacuum formed plastic or the like. Advertising or other messages may be applied to the surface of the opaque, translucent or transparent cover, and the cover may be made of transparent materials in order that persons may view any wiring or components within the electrical box.

As another example, in U.S. Pat. No. 4,907,711 to C. F. Stuchlik, III., there is disclosed a protective cover for electrical outlet boxes and the like which prevents the outlet box from being covered during installation of drywall and prevents entry of debris into the outlet box while permitting the interior of the outlet box to be readily accessible. The cover is provided with projections extending from the cover for indicating the location of the outlet box in the drywall, prior to being covered by the drywall while also providing a manner in which to mark reference points on the drywall for subsequent cutting. The cover can be of a reusable form or can be integrally molded with the outlet box.

Although well known in the art, covers of the type described above often suffer from a notable drawback. Specifically, it has been found that covers of the type described above are often insufficiently retained onto electrical outlet boxes. As a result, such covers are susceptible of being inadvertently removed from the electrical box outlet during use, which is highly undesirable.

SUMMARY OF THE INVENTION

It is an object of the present invention to provide a new and improved cover for an electrical box.

It is another object of the present invention to provide a cover as described above which can removably mounted onto an electrical box which, in turn, can be used as a mounting structure for installing an electrical device, such as an outlet, switch or fixture, into a covering, such as a wall or ceiling panel.

It is yet another object of the present invention to provide a cover as described above which can be removably mounted onto an electrical box which, in turn, can be used as a connection point for coupling the electrical device to electrical wiring which, in turn, is coupled to a main power source.

It is still another object of the present invention to provide a cover as described above which can be removably mounted onto an electrical box which, in turn, is sized and shaped to include an interior cavity into which the electrical wiring is disposed.

It is yet still another object of the present invention to provide a cover as described above which is sized and shaped to protect the electrical wiring which is disposed within the interior cavity of the electrical box.

It is another object of the present invention to provide a cover as described above which is sized and shaped to prevent debris from collecting within the interior cavity of the electrical box.

It is yet another object of the present invention to provide a cover as described above which can be sufficiently retained onto the electrical box.

It is a further object of this invention to provide a cover which can be removably mounted onto a plaster ring which in turn can be removably mounted onto an electrical box, such as a commercial type electrical box.

Accordingly, in one embodiment of the present invention, there is provided a temporary protective cover for an electrical box, said electrical box including an interior cavity and an open front end in communication with the interior cavity, said cover comprising a plate sized and shaped to enclose the open front end of said electrical box, and a pair of wings formed onto said plate, said pair of wings being adapted to secure said cover onto said electrical box, wherein each wing comprises a leg and a foot, said leg comprising a first end formed onto said plate and a second end, said foot being formed onto the second end of said leg.

In another embodiment of the present invention, there is provided a temporary protective cover for an electrical box, said electrical box including an interior cavity and an open front end in communication with the interior cavity, said cover comprising a plate sized and shaped to enclose the open front end of said electrical box, said plate including a front surface, a rear surface, a top edge, a bottom edge, a right side edge and a left side edge, and a pair of wings which extend rearwardly from the rear surface of said plate, said pair of wings being adapted to secure said cover onto said electrical box, wherein said first wing is spaced in from the left side edge of said plate and said second wing is spaced in from the right side edge of said plate.

In another embodiment of the present invention, there is provided a temporary protective cover for an electrical box, said electrical box including an interior cavity and an open front end in communication with the interior cavity, said cover comprising a plate sized and shaped to enclose the open front end of said electrical box, said plate including a front surface, a rear surface, a top edge, a bottom edge, a right side edge and a left side edge, a pair of wings which extend rearwardly from the rear surface of said plate, said pair of wings being adapted to secure said cover onto said electrical box, and at least one post formed onto the rear surface of said plate.

In another embodiment of the present invention, there is provided a temporary protective cover for an electrical box, said electrical box including an interior cavity and an open front end in communication with the interior cavity, said cover comprising a plate sized and shaped to enclose the open front end of said electrical box, said plate being shaped to include a line of weakness, and a pair of wings which extend rearwardly from the rear surface of said plate, said pair of wings being adapted to secure said cover onto said electrical box.

In another embodiment of the present invention, there is provided a temporary protective cover for an electrical box as, said electrical box including an interior cavity and an open front end in communication with the interior cavity, said cover comprising a plate sized and shaped to be removably mounted onto a plaster ring which is mounted onto the electrical box, said cover having a pair of wings, said pair of wings being adapted to secure said cover onto said plaster ring.

In another embodiment of the invention, there is provided a temporary protective cover for an electrical box on which is mounted a plaster ring, the cover comprising a plate having a pair of wings and a pair of posts.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration particular embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate particular embodiments of the invention and, together with the description, serve to explain the principles of the invention. In the drawings wherein like reference numerals represent like parts:

FIG. 3 is a front perspective view of the cover shown in FIG. 1;

FIG. 4 is a front plan view of the cover shown in FIG. 3;

FIG. 5 is a top plan view of the cover shown in FIG. 3;

FIG. 6 is a right side plan view of the cover shown in FIG. 3;

FIG. 16 is a front perspective view of the cover assembly shown in FIG. 14;

FIG. 17 is a front plan view of the cover assembly shown in FIG. 16;

FIG. 18 is a top plan view of the cover assembly shown in FIG. 16;

FIG. 19 is a right side plan view of the cover assembly shown in FIG. 16;

FIG. 20 is an exploded right side plan view of the cover assembly shown in FIG. 16;

FIGS. 23(a)-(d) show a sequence of right side views of the cover assembly shown in FIG. 14 as the cover assembly is mounted onto the electrical box, the electrical box being shown in section along lines 21-21;

FIG. 32 is a top plan view of another embodiment of a cover for an electrical box constructed according to the teachings of the present invention;

FIG. 32A is a top plan view of the cover shown in FIG. 32;

FIG. 32B is a right side view of the cover shown in FIG. 32;

FIG. 33 is a front view of the cover shown in FIG. 32;

FIG. 42 is a perspective view from the bottom of the cover shown in FIG. 40;

FIGS. 60A, FIG. 60B, FIG. 60C, FIG. 60D and FIG. 60E are perspective, top, front, side and fragmentary views, respectively, of a two gang commercial cover according to this invention which can be removably mounted onto the two gang rectangular plaster ring shown in FIG. 59;

FIG. 62 is a perspective view of a circular plaster ring which can be mounted on the outlet box shown in FIG. 61;

FIG. 62A, FIG. 62B, FIG. 62C, FIG. 62D and FIG. 62E are perspective, top, front, side and fragmentary views, respectively of a cover according to this invention which can be removably mounted onto the circular plaster ring shown in FIG. 62;

FIGS. 63A, 63B, 63C, 63D and 63E are perspective, bottom, top, side and front views respectively of another cover which can be mounted on the single gang rectangular ring shown in FIG. 57B. FIG. 63F is an enlarged end view of one of the wings in FIG. 63A, FIG. 63G is a fragmentary view of one of the winds in FIG. 63A. FIG. 63H is a side view of one of the posts in FIG. 63A, FIG. 63I is an enlarged perspective view of one of the wings in FIG. 63A and FIGS. 63J and 63K are enlarged top and side views respectively of one of the posts in FIG. 63A.

FIG. 64A, 64B, 64C, 64D and 64E are perspective bottom, top, front and side views, respectively of another cover which can be mounted on a two gang rectangular plastic ring, such as the plaster ring shown in FIG. 59; and FIGS. 64F, 64G and 64H are enlarged views of one of the wings, an end of one of the wings and one of the posts in the cover shown in FIG. 64A.

DETAILED DESCRIPTION OF PREFERRED EMBODIMENTS

Figure 1:
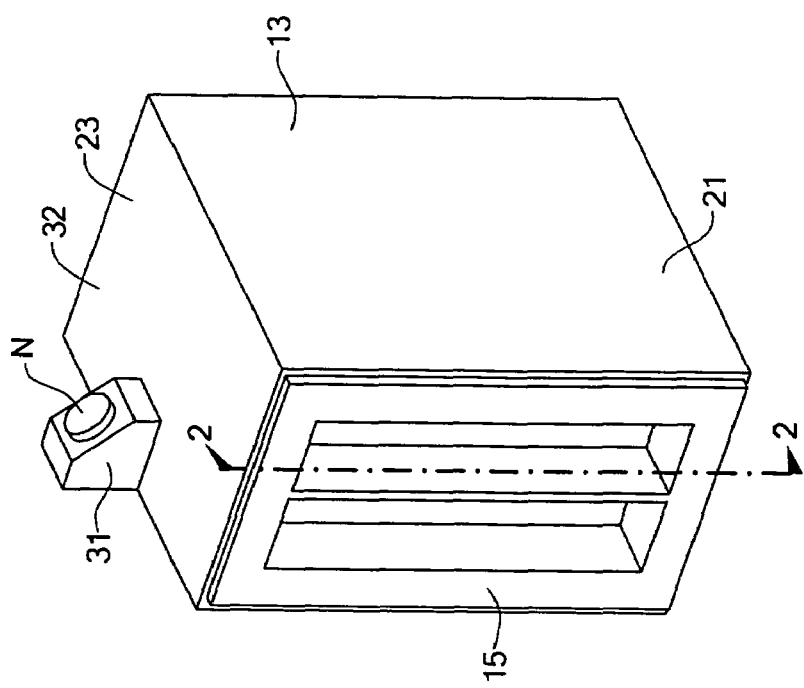
FIG. 1 is a front perspective view of a one embodiment of a cover for an electrical box constructed according to the teachings of the present invention, the cover being shown mounted onto an electrical box.

Referring now to FIG. 1, there is shown an embodiment of a cover which is adapted to be removably mounted onto an electrical box, said cover being constructed according to the teachings of the present invention. For purposes of identification, the electrical box is represented generally by reference numeral 13 and the cover is represented generally by reference numeral 15.

As will be described further in detail below, electrical box 13 serves two principal functions. First, electrical box 13 serves as a mounting structure for installing an electrical device, such as an outlet, switch or fixture, into a covering, such as a wall or ceiling panel. Second, electrical box 13 serves as a connection point for coupling the electrical device to electrical wires which, in turn, are connected to a main power source.

Electrical box 13 is a conventional new-work, electrical wall box which is constructed out of a nonmetallic material, such as plastic. Electrical box 13 is represented herein as a single gang electrical box (i.e., an electrical box which is sized and shaped to receive a single electrical outlet). However, it is to be understood that cover 15 is not limited for use with single gang electrical boxes. Rather, cover 15 could be modified in size and shape to be used in conjunction with alternative types of electrical boxes, as will be described further in detail below.

Electrical box 13 is an integral unit and comprises a rectangular back panel 17, a left side panel 19 having a free front edge 20, a right side panel 21 having a free front edge 22, a top panel 23 having a free front edge 24 and a bottom panel 25 having a free front edge 26. Panels 19, 21, 23 and 25 extend orthogonally out from back panel 17 so as to define a box-shaped interior cavity 27 therebetween. Free edges 20, 22, 24 and 26 together define an open front end 29 in communication with interior cavity 27, open front end 29 providing access to interior cavity 27 of box 13.

Electrical box 13 also comprises a tab 31 which is integrally formed onto exterior surface 32 of top panel 23. Tab 31 is shaped to include opening (not shown) through which a nail N can be disposed in order to mount electrical box 13 on a support member, as will be described further in detail below. It should be noted that electrical box 13 is not limited to a single tab 31. Rather, electrical box 13 could alternatively include a plurality of tabs 31 formed thereon for securing electrical box 13 onto a support member without departing from the spirit of the present invention. It should also be noted that electrical box 13 is not limited to tab 31 being formed onto top panel 23. Rather, electrical box 13 could be alternatively constructed so that tab 31 is formed onto a different panel of box 13, such as back panel 17, left side panel 19, right side panel 21 or bottom panel 25, without departing from the spirit of the present invention.

Electrical box 13 further comprises a plurality of openings 33 which are formed in back panel 17. Preferably, openings 33 are formed in back panel 17 through the use of break-away tabs (not shown) and are sized and shaped to enable selected electrical wiring to be disposed through electrical box 13 and into interior cavity 27. It should be noted that electrical box 13 is not limited to openings 33 being formed in back panel 17. Rather, electrical box 13 could be alternatively constructed so that openings 33 are formed onto a different panel of box 13, such as left side panel 19, right side panel 21, top panel 23 or bottom panel 25, without departing from the spirit of the present invention.

Electrical box 13 additionally comprises a first elongated projection 35 which is integrally formed onto top panel 23 and a second elongated projection 37 which is integrally formed onto bottom panel 25. First elongated projection 35 is generally tubular in shape and includes an elongated threaded bore 36. Similarly, second elongated projection 37 is generally tubular in shape and includes an elongated threaded bore 38. As will be described further in detail below, bores 36 and 38 are used to mount an electrical outlet onto electrical box 13.

It should be noted that the particular construction of electrical box 13 does not serve as a feature of the present invention. Accordingly, electrical box 13 could be replaced with alternative types of electrical boxes which are well known in the art without departing from the spirit of the present invention.

For example, electrical box 13 is shown as being constructed of a nonmetallic material. However, it is to be understood that electrical box 13 is not limited to being constructed of a nonmetallic material. Rather, electrical box could be constructed of alternative materials, such as metal, without departing from the spirit of the present invention.

As another example, electrical box 13 is represented as a wall box. However, it is to be understood that electrical box 13 is not limited to a wall box. Rather, electrical box 13 could represent alternative types of electrical boxes which are disposed in different structures, such as ceiling boxes, without departing from the spirit of the present invention.

As another example, electrical box 13 is represented as a new-work box. However, it is to be understood that electrical box 13 is not limited to a new-work box. Rather, electrical box 13 could represent alternative types of electrical boxes which are utilized at different stages of construction, such as old-work boxes, without departing from the spirit of the present invention.

As another example, electrical box 13 is represented as an integral electrical box. However, it is to be understood that electrical box 13 is not limited to being a one-piece electrical box. Rather, electrical box 13 could alternatively be constructed of multiple pieces without departing from the spirit of the present invention.

As noted above, the particular construction of electrical box 13 does not serve as a feature of the present invention. Rather, it should be noted that the novelty of the present invention relates to the construction of cover 15 and to the use of cover 15 to enclose open front end 29 of electrical box 13, as will be described further in detail below.

Specifically, cover 15 is sized and shaped to be removably mounted on electrical box 13 over open front end 29 so as to enclose interior cavity 27. In this manner, cover 15 serves to protect electrical wiring which is disposed within interior cavity 27 and to prevent debris from collecting within interior cavity, which is highly desirable.

Cover 15 is preferably constructed of a durable and inexpensive material, such as plastic, and comprises a tray 39, a flange 41 and a handle 43 which are integrally formed together to make cover 15 a single piece, as shown in FIGS. 3-6. It should be noted that cover 15 is not limited to having a one-piece construction. Rather, cover 15 could alternatively be constructed of multiple pieces without departing from the spirit of the present invention.

Tray 39 comprises an end wall 45 and a plurality of sidewalls 47, 49, 51 and 53 which extend orthogonally out from end wall 45 so as to define a box-shaped recess 55 therebetween. It should be noted that, with cover 15 mounted on electrical box 13, tray 39 is sized and shaped to press-fit within interior cavity 27. Specifically, tray 39 is sized and shaped to fit snugly within interior cavity 27, with sidewall 47 frictionally abutting against left side panel 19, sidewall 49 frictionally abutting against right side panel 21, sidewall 51 frictionally abutting against elongated, tubular projection 35 and sidewall 53 frictionally abutting against elongated tubular projection 37.

Figure 2:
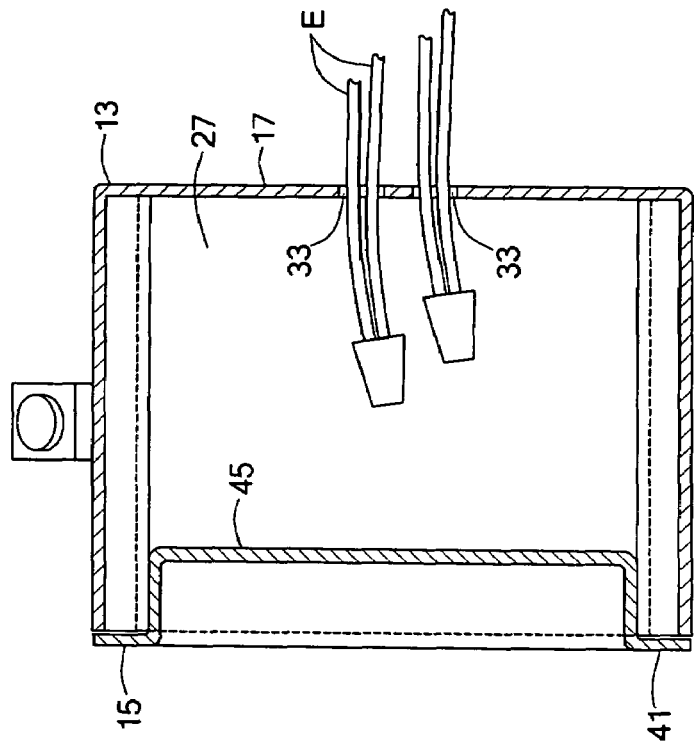
FIG. 2 is a side section view of the cover and the electrical box shown in FIG. 1, taken along lines 2-2, the electrical box being shown with electrical wires disposed into its interior cavity.

Flange 41 is orthogonally formed onto sidewalls 47, 49, 51 and 53 and comprises a generally flat top surface 57 and a generally flat bottom surface 59. It should be noted that, with cover 15 mounted on electrical box 13, flange 41 is sized and shaped so that bottom surface 59 abuts against electrical box 13 at open front end 29 so as to prevent cover 15 from being disposed entirely within interior cavity 27, as shown in FIG. 2.

Handle 43 is disposed within recess 55 of tray 35 and comprises a pair of finger gripping surfaces 61 and 63. It should be noted that an operator utilizes handle 43 for mounting cover 15 onto electrical box 13 and, similarly, for removing cover 15 from electrical box 13, as will be described further in detail below.

Handle 43 is shown as being generally in the shape of a thin rectangular panel. However, it is to be understood that handle 43 could be formed into alternative shapes, such as a C-shaped or U-shaped handle, without departing from the spirit of the present invention.

Handle 43 is also shown as being formed onto end wall 45, extending between sidewall 51 and sidewall 53 and lying flush with top surface 57 of flange 41. However, it is to be understood that handle 43 could be alternatively disposed, such as being formed entirely onto end wall 45, without departing from the spirit of the present invention.

Figure 7:
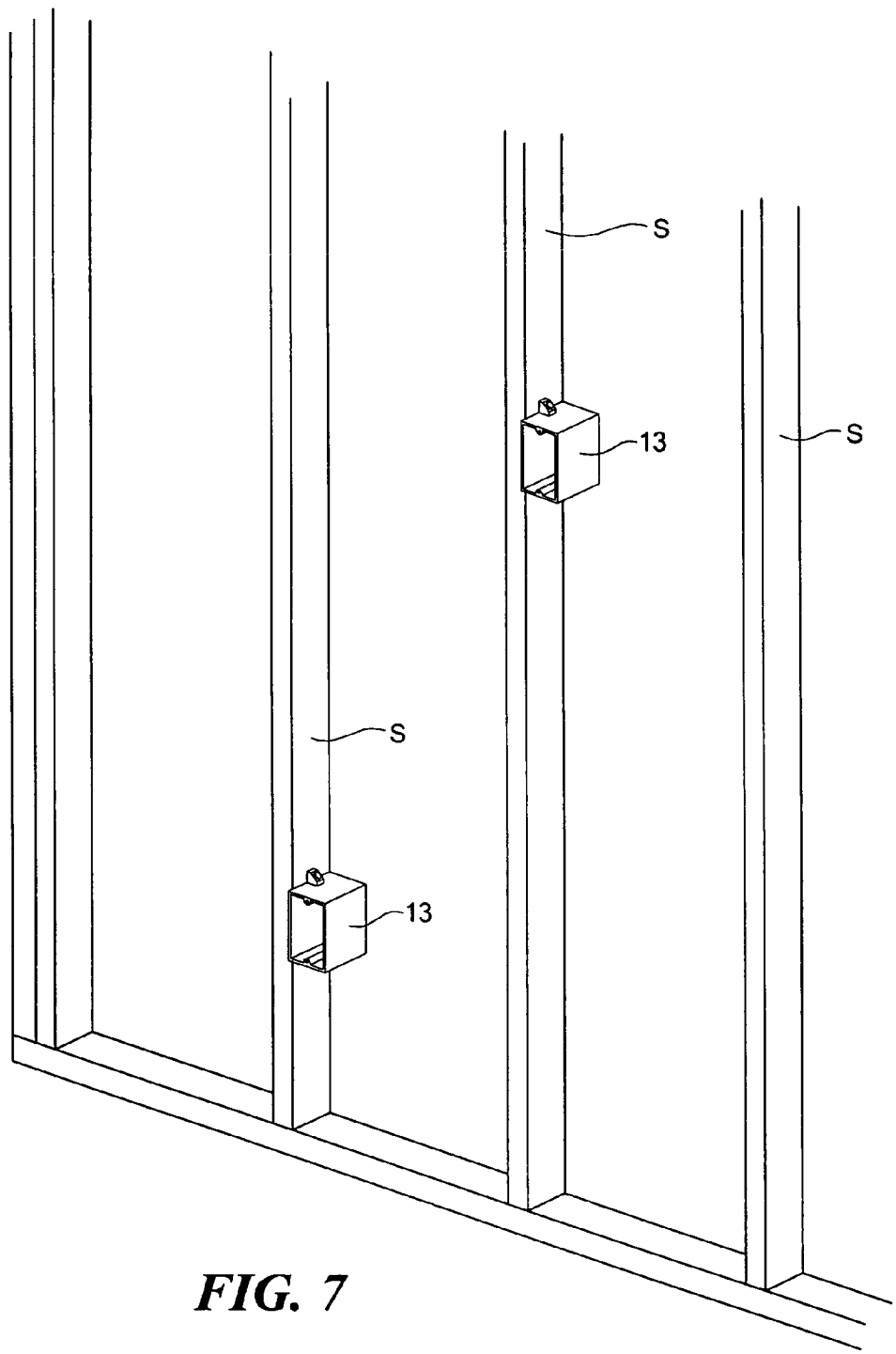
FIG. 7 is a front perspective view of a pair of the electrical boxes shown in FIG. 1, each electrical box being shown mounted on an associated support beam.

In use, electrical box assembly 11 can be used as a mounting structure for installing an electrical outlet O into a wall panel W and as a connection point for coupling electrical outlet O to electrical wires E which, in turn, are connected to a main power source in the following manner. Specifically, during the preliminary stages of constructing a building, support beams S, typically in the form of wooden two-by-fours, are erected in order to define the general room configurations of the building, as shown in FIG. 7.

Figure 8:
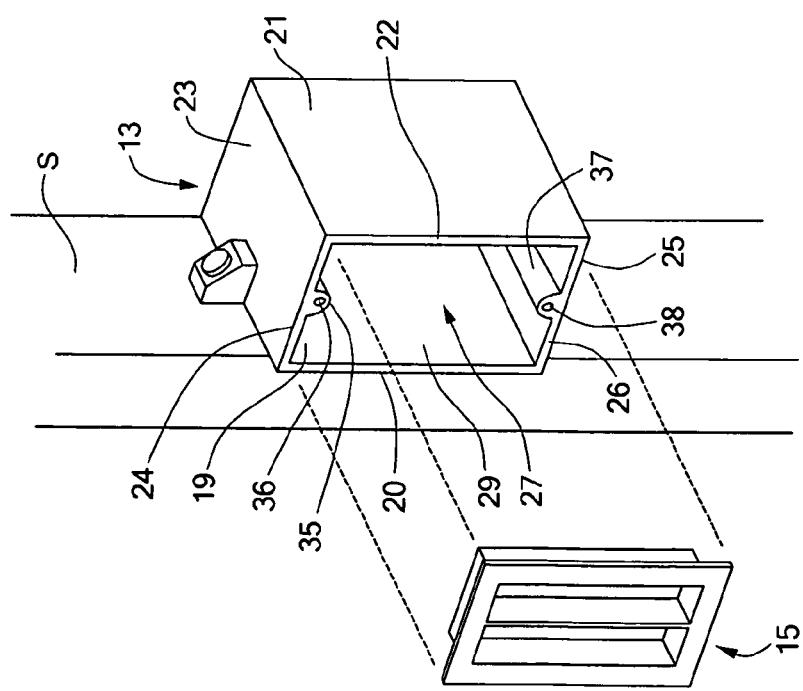
FIG. 8 is a perspective, exploded view of the cover and the electrical box shown in FIG. 1, the electrical box being shown mounted on an associated support beam.

Electrical box 13 is then mounted onto a support beam S in a location which optimizes the accessibility of electrical outlet O within the room. Specifically, a nail N is disposed through tab 31 and is driven into support beam S so as to fixedly mount electrical box 13 onto beam S, as shown in FIG. 8. Electrical wires E, which are connected to a main power source, are run amongst the support beams S and are disposed through openings 33 so as to project into interior cavity 27.

Figure 9:
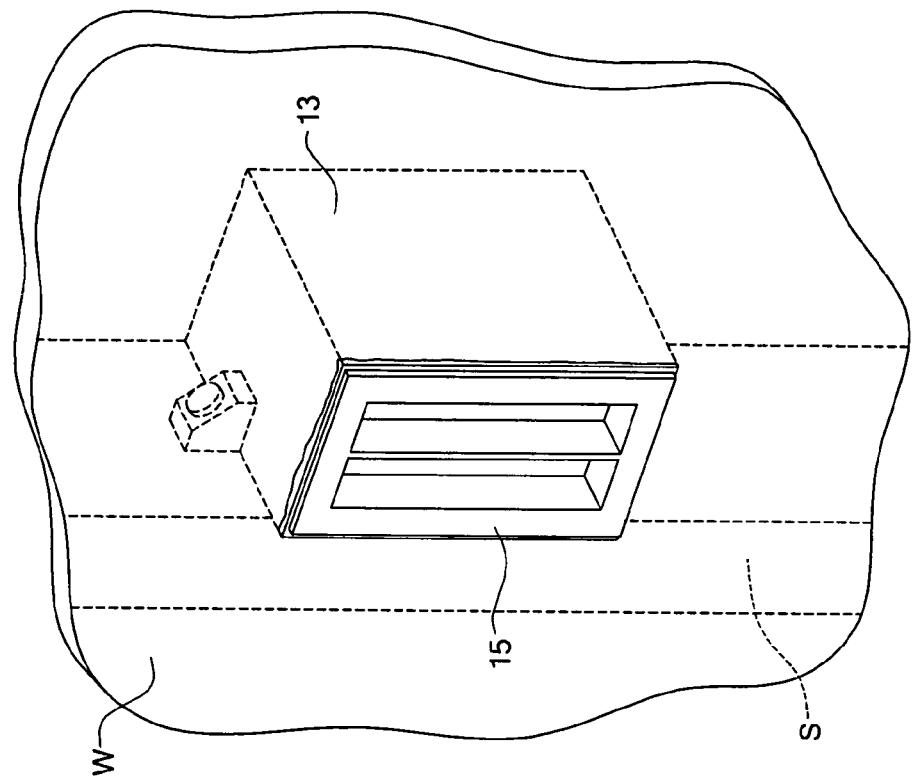
FIG. 9 is a perspective view of the cover and the electrical box shown in FIG. 1, the electrical box being shown mounted on an associated support beam, paneling being shown mounted over the paneling and the electrical box, the portion of the paneling covering the cover being cut out.

Cover 15 is then securely mounted onto electrical box 13. Once completed, wall panel W is mounted onto support beams S over electrical box 13 and cover 15. In order to access electrical box 13, a router is used to cut wall panel W around cover 15, as shown in FIG. 9. Wall panel W is then plastered and painted for aesthetic purposes, thereby completing construction of the walls of the room. As can be appreciated, with cover 15 securely mounted onto electrical box 13, cover 15 serves to protect electrical wires E from being damaged by the router when cutting wall panel W, which is an object of the present invention. In addition, with cover 15 securely mounted onto electrical box 13, cover 15 serves to prevent debris from collecting within interior cavity 27 of electrical box 13, which is another object of the present invention.

Figure 10:
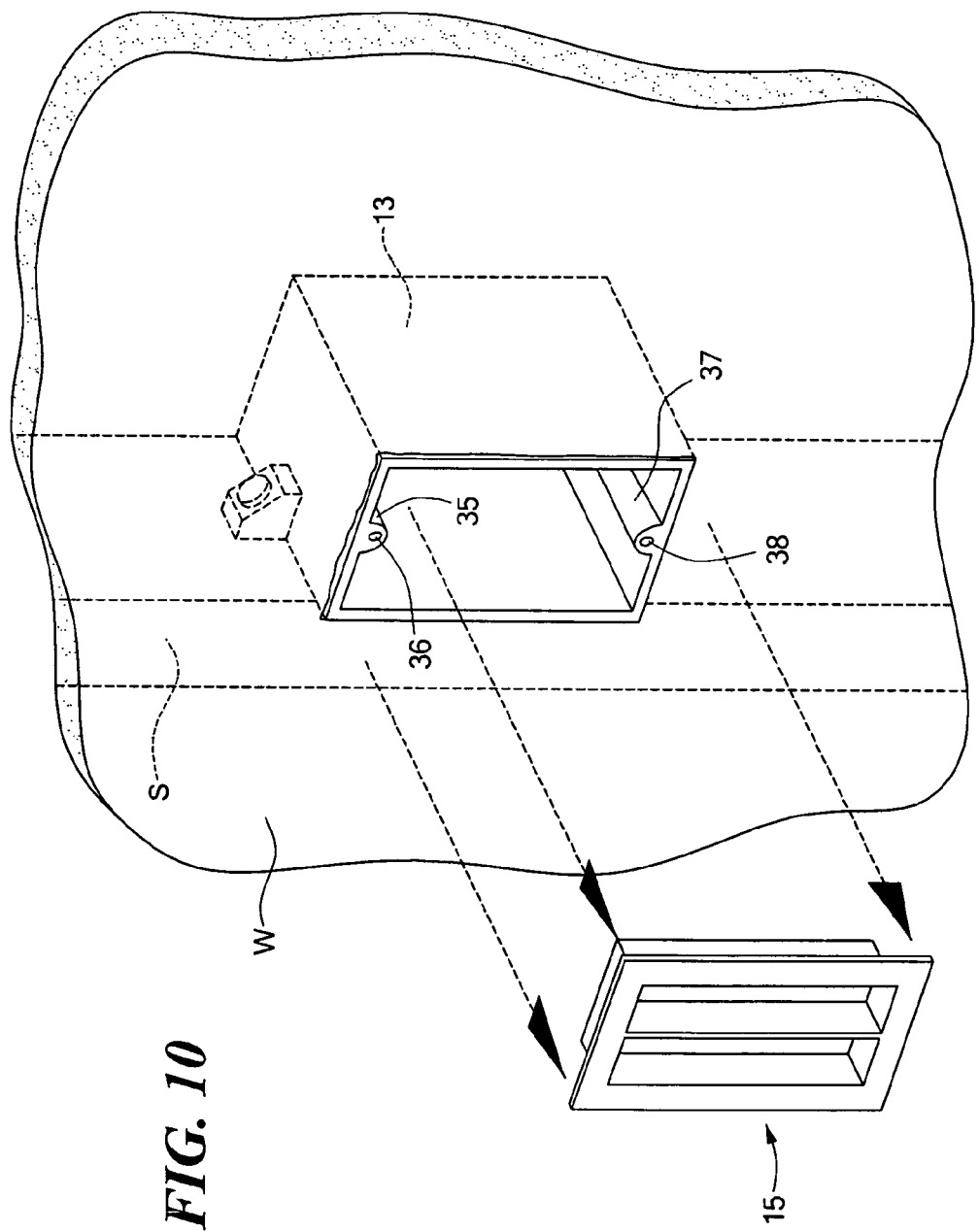
FIG. 10 is an exploded, perspective view of the cover, electrical box and paneling shown in FIG. 9, the cover being shown removed from the electrical box.
Figure 11:
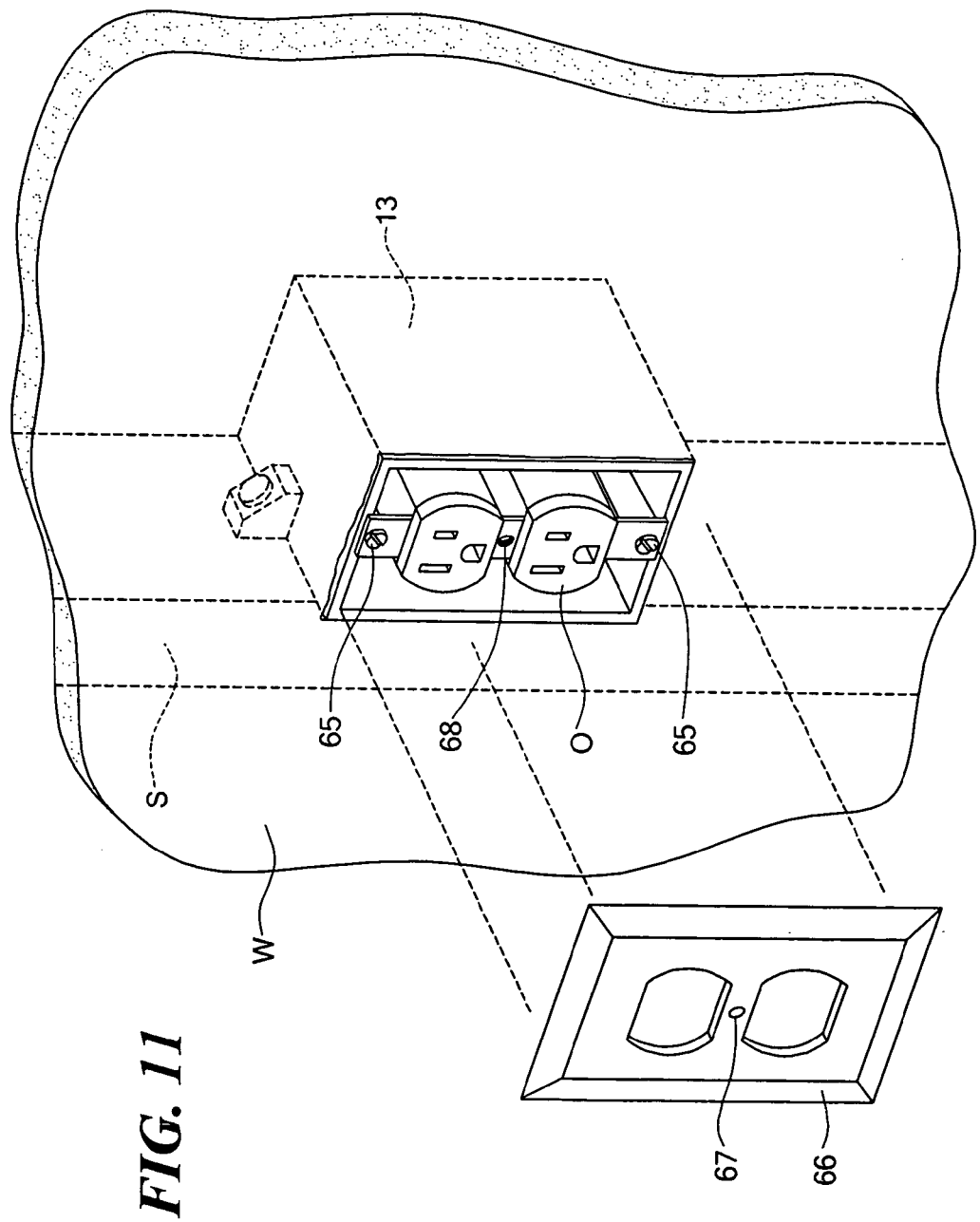
FIG. 11 is an exploded, perspective view of the cover, electrical box and paneling shown in FIG. 9, the electrical box being shown with an electrical outlet mounted thereto, the electrical box being shown with a cover plate aligned for mounting thereto over the electrical outlet.

Upon completion of the wall construction, an electrician removes cover 15 from electrical box 13 using handle 43, as shown in FIG. 10, and either discards cover 15 or stores cover 15 for future use. With cover 15 removed from electrical box 13, the electrician couples outlet O to electrical wires E and fixedly mounts outlet O onto electrical box 13 by passing a pair of screws 65 through a pair of preformed openings in outlet O and into engagement within threaded bores 36 and 38 in electrical box 13. With outlet O electrically coupled to wires E and fixedly mounted onto electrical box 13, a plastic cover plate 66 is mounted over outlet O, as shown in FIG. 11. Specifically, a screw (not shown) is passed through a preformed opening 67 in cover and into engagement with a threaded bore 68 which is formed in outlet O.

As noted briefly above, cover 15 is not limited in its size and shape. Rather, the size and shape of cover 15 could be modified to enable cover 15 to be mounted on different types of electrical boxes without departing from the spirit of the present invention.

Figure 12:
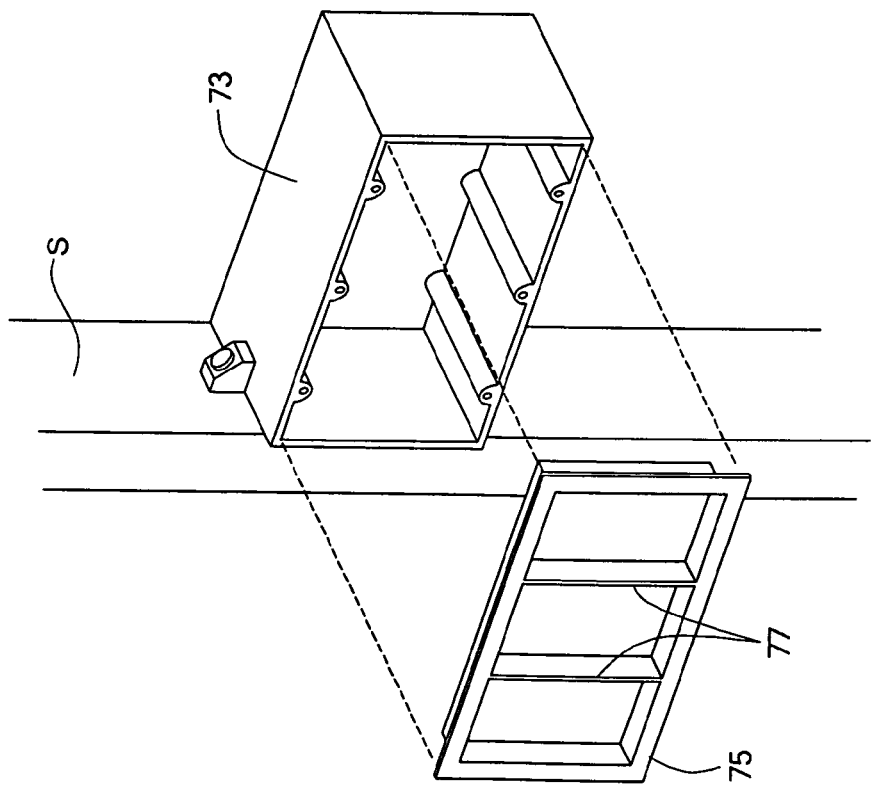
FIG. 12 is a perspective, exploded view of another embodiment of a cover for an electrical box constructed according to the teachings of the present invention, the cover being shown aligned for mounting onto an electrical box which, in turn, is mounted on an associated support beam.
Figure 15:
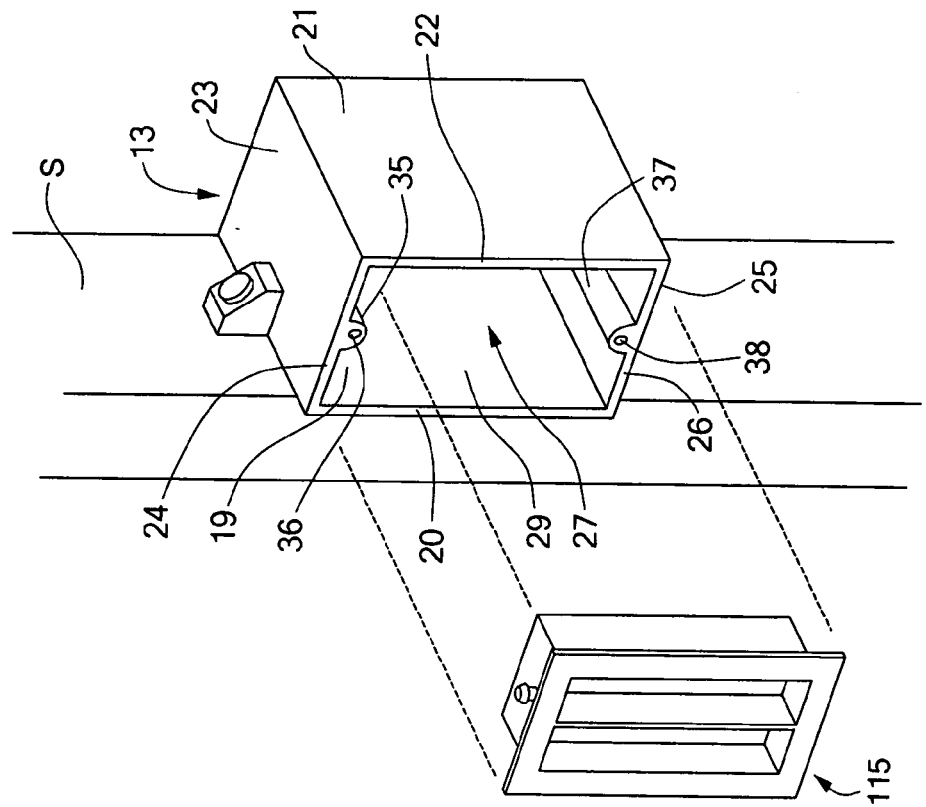
FIG. 15 is a perspective, exploded view of the cover assembly and the electrical box shown in FIG. 14, the electrical box being shown mounted on an associated support beam.

As an example, referring now to FIG. 12, there is disclosed another embodiment of a cover which is adapted to be removably mounted onto an electrical box, said cover being constructed according to the teachings of the present invention. For purposes of identification, the electrical box is represented generally by reference numeral 73 and the cover is represented generally by reference numeral 75.

Electrical box 73 is a conventional new-work, electrical wall box which differs from electrical box 13 only in that electrical box 73 is a three gang electrical box (i.e., designed to be used as a mounting structure for three electrical devices), whereas electrical box 13 is a single gang electrical box (i.e., designed to be used as a mounting structure for a single electrical device). Accordingly, cover 75 differs from cover 15 in that cover 75 is substantially larger than cover 15. Specifically, cover 75 is sized and shaped to be removably mounted onto electrical box 73, which is considerably larger than electrical box 13, and includes a pair of handles 77 to facilitate handling cover 75.

Figure 13:
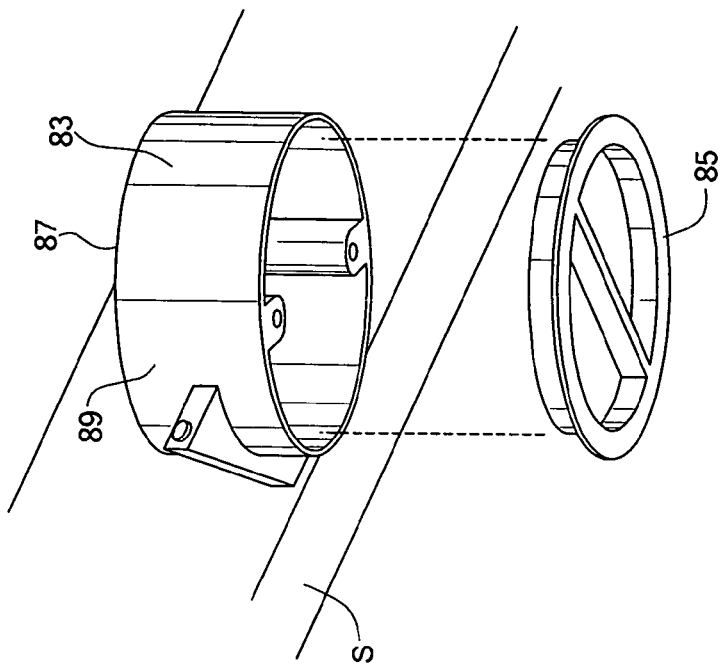
FIG. 13 is a perspective, exploded view of another embodiment of a cover for an electrical box constructed according to the teachings of the present invention, the cover being shown aligned for mounting onto an electrical box which, in turn, is mounted onto an associated support beam.

As another example, referring now to FIG. 13, there is disclosed a third embodiment of a cover which is adapted to be removably mounted onto an electrical box, said cover being constructed according to the teachings of the present invention. For purposes of identification, the electrical box is represented generally by reference numeral 83 and the cover is represented generally by reference numeral 85.

Electrical box 83 is a conventional new-work, electrical box which differs from electrical box 13 only in that electrical box 83 is designed to be used as a ceiling box, whereas electrical box 13 is designed to be used as a wall box. As such, electrical box 83 preferably has a generally circular shape and comprises a circular back panel 87 and a single circular side panel 89 which extends orthogonally out from back panel 87. Accordingly, cover 85 differs from cover 15 in that cover 85 is generally circular in shape so as to enable cover 85 to be removably mounted onto electrical box 83.

Referring now to FIGS. 14-23, there is disclosed another embodiment of a cover assembly which is adapted to be removably mounted onto an electrical box, said cover assembly being constructed according to the teachings of the present invention and identified generally by reference numeral 115.

Cover assembly 115 differs from cover 15 in that cover assembly 115 is constructed to be removably mounted onto electrical box 13 using a spring-loaded mounting technique, as will be described further in detail below, whereas cover 15 is constructed to be removably mounted onto electrical box 13 using a press-fit mounting technique.

As noted above, electrical box 13 is a conventional new-work, electrical wall box which is constructed out of a non-metallic material, such as plastic. Electrical box 13 is represented herein as a single gang electrical box (i.e., an electrical box which is sized and shaped to receive a single electrical outlet). However, it is to be understood that cover 115 is not limited for use with single gang electrical boxes. Rather, cover 115 could be modified in size and shape to be used in conjunction with electrical boxes which differ in size, shape and material, as will be described further in detail below.

Cover assembly 115 comprises a cover 116 and a spring-loaded retention device 117 which is slidably mounted onto cover 116.

Cover 116 is preferably constructed of a durable and inexpensive material, such as plastic which can be molded, and comprises a solid support block 119, a flange 121, a handle 123 and a fixed mounting post 125 which are integrally formed together to make cover 116 a single piece. However, it should be noted that cover 116 is not limited to having a one-piece construction. Rather, cover 116 could alternatively be constructed of multiple pieces without departing from the spirit of the present invention.

With cover assembly 115 mounted onto electrical box 13 over open front end 29, cover 116 is sized and shaped to enclose interior cavity 27. In this manner, cover 116 serves to protect electrical wiring which is disposed within interior cavity 27 and to prevent debris, such as dust or plaster, from collecting within interior cavity 27, which is highly desirable.

Support block 119 is a solid block of material which includes a top wall 126, a bottom wall 127, a front wall 129, a rear wall 131, a first sidewall 133 and a second sidewall 134.

Figure 14:
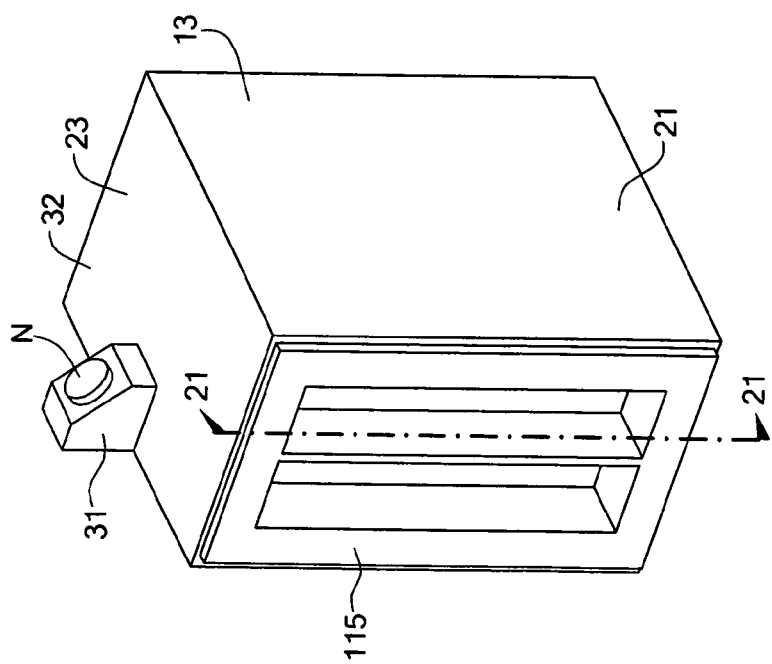
FIG. 14 is a front perspective view of another embodiment of a cover assembly for an electrical box constructed according to the teachings of the present invention, the cover assembly being shown mounted onto an electrical box.

Support block 119 is also shaped to include an elongated bore 135. Elongated bore 135 is preferably uniformly circular in lateral cross-section and includes a longitudinal axis L. Elongated bore 135 is formed into bottom wall 127 proximate rear wall 131 and extends up a portion of the distance to top wall 126. Bore 135 is defined partially by a closed end 136 located between top wall 126 and bottom wall 127 and an open end 137 located in bottom wall 127. Flange 121 is integrally formed onto the outer periphery front wall 129 of support block 119 and comprises a generally flat front surface 139 and a generally flat rear surface 141. It should be noted that, with cover 116 mounted onto open front end 29 of electrical box 13, flange 121 is sized and shaped so that rear surface 141 abuts against electrical box 13 at open front end 29, as shown in FIG. 14, so as to prevent cover 116 from being disposed entirely within interior cavity 27.

A pair of spaced apart cavities 143-1 and 143-2 are formed into front wall 129 of support block 119. It should be noted that cavities 143 are relatively shallow and extend only a portion of the distance from front wall 129 to rear wall 131. Together cavities 143 define handle 123 for holding cover 116. Specifically, handle 123 is generally rectangular in shape and extends vertically between cavities 143 from top wall 126 to bottom wall 127. Handle 123 comprises a pair of finger gripping surfaces 145 and 147 onto which the operator grasps in order to mount cover 115 onto electrical box 13 and, similarly, to removing cover 115 from electrical box 13, as will be described further in detail below.

Handle 123 is shown as being generally in the shape of a thin rectangular panel. However, it is to be understood that handle 123 could be formed into alternative shapes, such as a C-shaped or U-shaped handle, without departing from the spirit of the present invention.

Fixed mounting post 125 is integrally formed onto support block 119 and extends perpendicularly out from top wall 126. Mounting post 125 is generally circular in lateral cross-section and comprises a free end 149. As will be described further in detail below, fixed mounting post 125 functions in conjunction with retention device 117 to secure cover assembly 115 onto electrical box 13. However, it should be noted that fixed mounting post 125 could be removed from cover assembly 115 without significantly compromising the ability of retention device 117 to secure cover assembly 115 onto electrical box 13.

Cover 116, if made of plastic, may be fabricated using conventional plastic molding techniques. If cover 116 is fabricated using conventional plastic molding techniques, bore 135 may be formed during the molding process or may be drilled into block 119 after the molding process is completed.

A stopper 151, constructed preferably of rubber, is mounted onto free end 149. Specifically, stopper 151 includes a circular opening 153 which is sized and shaped to receive free end 149 of post 125 and a contact surface 154. Stopper 151 may be secured onto free end 143 of post 123 using an adhesive or by sizing post 125 so that free end 149 is securely press-fit within opening 153.

Spring-loaded retention device 117 is slidably mounted onto support block 119 of cover 116 and functions in conjunction with fixed mounting post 125 to secure cover assembly 115 onto electrical box 13, as will be described further in detail below.

Spring-loaded retention device 117 comprises a movable mounting post 155, a compression spring 157, a washer 159 and a stopper 161.

Movable mounting post 155 is a generally cylindrical post which is sized and shaped to be slidably disposed within elongated bore 135, mounting post 155 comprising a first end 163 and a second end 165. It should be noted that mounting post 155 has a tapered lateral cross-sectional area so as to define an enlarged portion 167 proximate first end 163 and a reduced portion 169 proximate second end 165, the diameter of enlarged portion 167 being greater than the diameter of reduced portion 169.

Compression spring 157 is sized and shaped to be disposed within elongated bore 135 and comprises a first end 171 and a second end 173.

Washer 159 is an integral piece constructed of an inexpensive and durable material, such as plastic, and comprises an internal ring 175, an external ring 177 integrally formed onto internal ring 175 and a central opening 179 which extends through internal ring 175 and external ring 177. It should be noted that central opening 179 is sized and shaped to enable reduced portion 169 of mounting post 155 to pass therethrough, but is sized and shaped to preclude enlarged portion 167 of mounting post 155 to pass therethrough. As will be described further in detail below, washer 159 is sized and shaped to be mounted onto open end 137 of bore 135.

Stopper 161, constructed preferably of rubber, includes a circular opening 162 which is sized and shaped to receive second end 165 of post 155 and a contact surface 164. Stopper 161 may be secured onto second end 165 of post 155 using an adhesive or by sizing post 155 so that second end 165 is securely press-fit within opening 162.

Spring loaded retention device 117 is positioned within support block 119 in the following manner. Compression spring 157 is disposed into bore 135 such that first end 171 of spring 157 contacts closed end 136. With compression spring 157 positioned as such, mounting post 155 is disposed within bore 135 such that first end 163 contacts second end 173 of spring 157. With mounting post 155 disposed within bore 135 in this manner, reduced portion 169 of post 155 extends out open end 137 and protrudes perpendicularly away from bottom wall 127. As can be appreciated, mounting post 155 is capable of being slidably displaced within elongated bore 135 along longitudinal axis L, compression spring 157 naturally biasing mounting post 155 away from closed end 136.

Having disposed spring 157 and post 155 into bore 135 in support block 119, washer 159 is mounted onto open end 137 of support block 119. Specifically, washer 159 is mounted onto open end 137 of support block 119 such that internal ring 175 is positioned within elongated bore 135 and external ring 177 is positioned outside of elongated bore 135.

Washer 159 is preferably sized and shaped to be securely press-fit into elongated bore 135. However, it is to be understood that washer 159 could be retained onto open end 137 of support block 119 by alternative means without departing from the spirit of the present invention. As an example, washer 159 could be retained onto open end 137 of support block 119 using an adhesive. As another example, washer 159 and/or elongated bore 135 could be shaped to enable washer 159 to be snap-fit onto open end 137 of support block 119.

Figure 21:
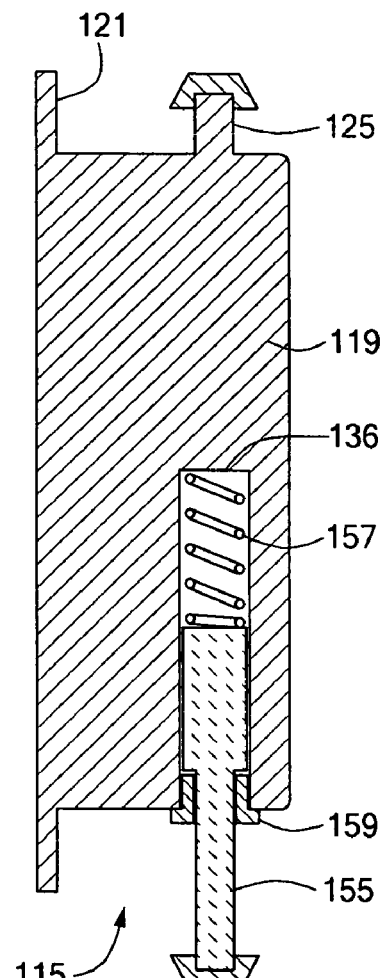
FIG. 21 is a right side section view of the cover assembly shown in FIG. 14, taken along lines 21-21.

It should be noted that with washer 159 mounted onto open end 137 in this manner, reduced portion 169 of mounting post 155 projects through central opening 179. As can be appreciated, washer 159 serves to retain enlarged portion 167 of mounting post 155 within elongated bore 135. Specifically, compression spring 157 naturally biases mounting post 155 outward away from closed end 136. However, because the diameter of enlarged portion 167 is larger than the diameter of opening 179, mounting post 155 is not capable of further outward displacement once enlarged portion 167 abuts against internal ring 175, as shown in FIG. 21.

Figure 22:
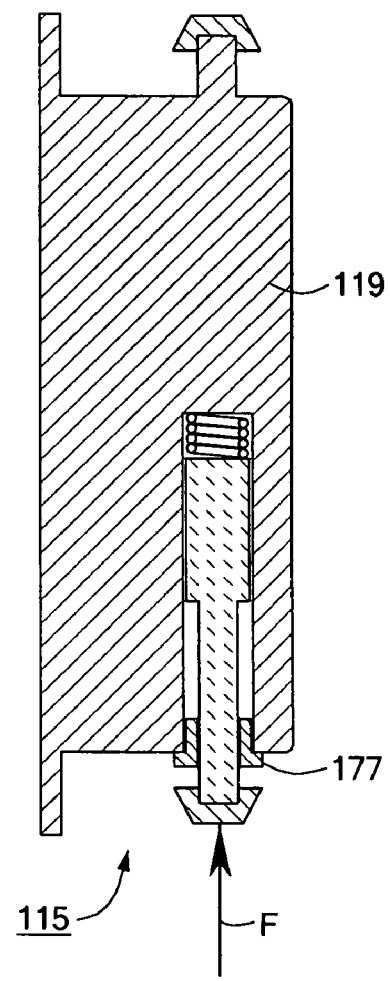
FIG. 22 is a right side section view of the cover assembly shown in FIG. 14, taken along lines 21-21, the cover assembly being shown with an inward force applied onto the inward mounting post.
Figure 24:
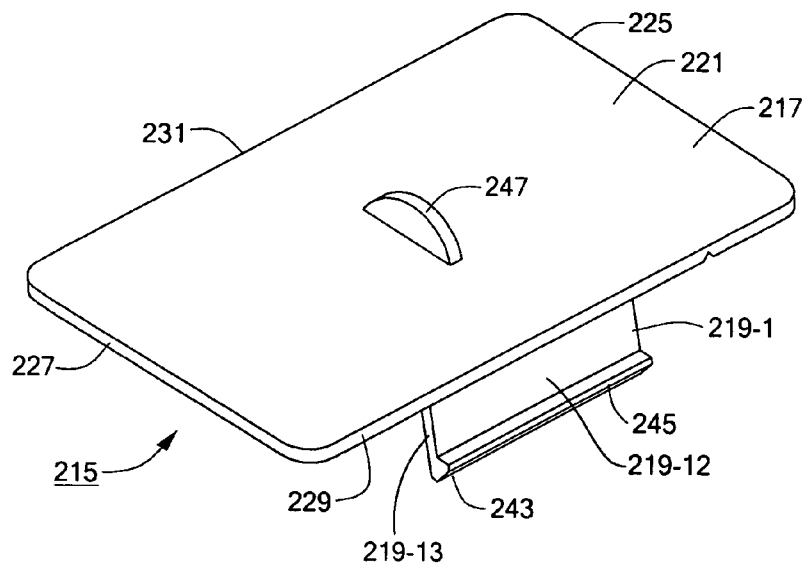
FIG. 24 is a front perspective view of another embodiment of a cover for an electrical box constructed according to the teachings of the present invention.
Figure 25:
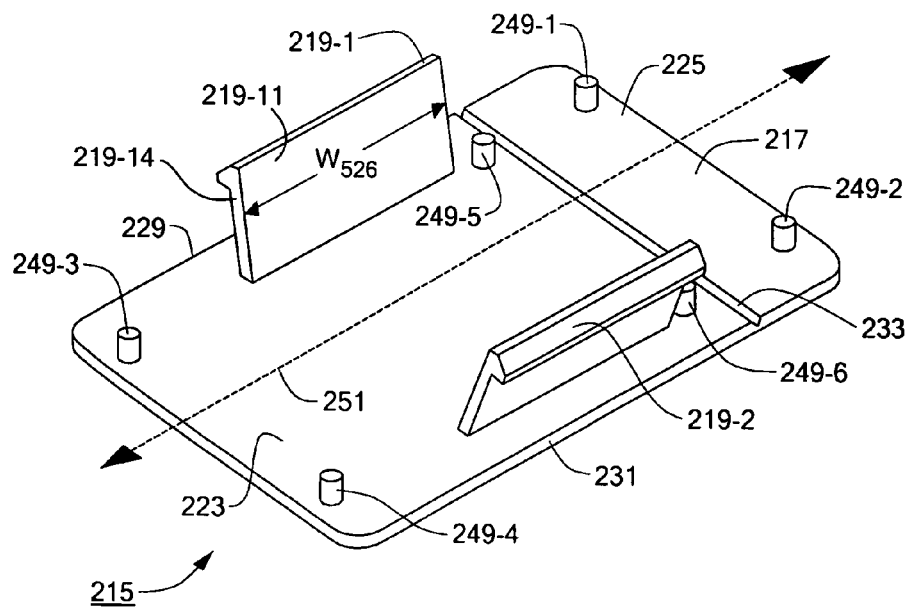
FIG. 25 is a top perspective view of the cover shown in FIG. 24.

With compression spring 157 and mounting post 155 slidably disposed within elongated bore 135 and with washer 159 mounted onto open end 137 of support block 119, rubber stopper 161 is mounted onto second end 165 of mounting post 155. As can be appreciated, the application of an inward force F onto contact surface 164 of rubber stopper 161 causes mounting post 155 to inwardly displace along longitudinal axis L, as shown in FIG. 22. Furthermore, it should be noted that rubber stopper 161 limits the inward displacement of mounting post 155. Specifically, as mounting post 155 is inwardly displaced, once rubber stopper 161 contacts external ring 177 of washer 159, mounting post 155 is incapable of further inward displacement.

Cover assembly 115 mounts onto electrical box 13 in the following manner. With cover assembly 115 removed from electrical box, compression spring 157 resiliently urges mounting post 155 outward, as shown in FIG. 23(a).

Using handle 123, cover assembly 115 is brought towards electrical box 13 in such a manner so that surface 164 of rubber stopper 161 is drawn into contact with bottom panel 25 or projection 37 formed onto bottom panel 25, cover 116 being disposed with rubber stopper 151 on fixed mounting post 125 disposed outside of cavity 27 of electrical box 13. With contact surface 164 of rubber stopper 161 abutting against electrical box 13 in this manner, the user is required to apply a substantially downward force onto cover 116, thereby creating inward force F onto stopper 161, as shown in FIG. 23(b). Inward force F applied to stopper 161 causes mounting post 155 to displace inward within elongated bore 135 along longitudinal axis L.

While maintaining the substantially downward force onto cover 116, the user pivots cover 116 in a clockwise direction about rubber stopper 161, as represented by arrow A in FIG. 23(c), until rubber stopper 151 on fixed mounting post 125 is disposed within cavity 27 of electrical box 13. As such, support block 119 is entirely disposed inside cavity 27 and flange 121 is entirely disposed outside cavity 27.

With rubber stoppers 151 and 161 disposed inside cavity 27, the user stops applying the downward force onto cover 116 which, in turn, eliminates inward force F applied onto stopper 161. Upon the elimination of inward force F onto rubber stopper 161, compression spring 157 urges mounting post 155 outward, as represented by arrow B in FIG. 23(d), until both rubber stoppers 151 and 161 abut against electrical box 13.

Cover assembly 115 can be removed from electrical box 13 using the reverse sequence of steps enumerated above for mounting cover assembly 115 onto electrical box 13.

As can be appreciated, the resilient outward force applied by compression spring 157 onto mounting post 155 enables cover assembly 115 to be spring-loaded onto electrical box 13. As a result, cover assembly 115 remains securely mounted onto electrical box during use, which is highly desirable.

Referring now to FIGS. 24-31, there is disclosed another embodiment of a cover which is adapted to be removably mounted onto an electrical box, said cover being constructed according to the teachings of the present invention and identified generally by reference numeral 215.

Cover 215 differs from cover 15 in that cover 215 is constructed to be removably mounted onto electrical box 13 using a pair of flexible retaining wings, as will be described further in detail below, whereas cover 15 is constructed to be removably mounted onto electrical box 13 using a press-fit mounting technique.

As noted above, electrical box 13 is a conventional new-work, electrical wall box which is preferably constructed out of a nonmetallic material, such as plastic. Electrical box 13 is represented herein as a single gang electrical box (i.e., an electrical box which is sized and shaped to receive a single electrical outlet). However, it is to be understood that cover 215 is not limited for use with single gang electrical boxes. Rather, cover 215 could be modified in size and shape to be used in conjunction with electrical boxes which differ in size and shape, as will be described further in detail below.

Cover 215 is preferably constructed of a durable and inexpensive material which can be molded, such as plastic. Cover 215 comprises a substantially flat plate 217 and a pair of retention wings 219-1 and 219-2 which are integrally formed onto flat plate 217 so as to render cover 215 a unitary device. However, it should be noted that cover 215 is not limited to having a one-piece construction. Rather, cover 215 could be alternatively constructed from multiple pieces without departing from the spirit of the present invention.

With cover 215 mounted onto electrical box 13, flat plate 217 is sized and shaped to completely cover open front end 29 and enclose interior cavity 27 as can be seen clearly in FIGS. 31(a) through 31(c). In this manner, flat plate 217 serves to protect electrical wiring which is disposed within interior cavity 27 and to prevent debris, such as dust or plaster, from collecting within interior cavity 27, which is highly desirable.

Flat plate 217 is generally rectangular in shape and includes a front surface 221, a rear surface 223, a top edge 225, a bottom edge 227, a right side edge 229 and a left side edge 231. Flat plate 217 has an overall length L126 of approximately 3.73 inches and an overall width W126 of approximately 2.23 inches and a thickness T126 of approximately 0.06 inches.

It should be noted that flat plate 217 is sized and shaped to enclose interior cavity 27 of a standard, one gang, electrical box 13 which is constructed out of plastic. However, it is to be understood that a standard, one gang, electrical box which is constructed of metal is typically smaller in size than a standard, one gang, electrical box which is constructed of plastic.

Also, it should be noted that two and three gang electrical boxes also usually come in two sizes, namely, a larger size if it is made of plastic and a smaller size if it is made of metal.

Accordingly, flat plate 217 is shaped to include a line of weakness 233. Specifically, line of weakness 233 is in the form of a V-shaped groove which is formed into rear surface 223 of flat plate 217, line of weakness 233 extending laterally across flat plate 217 from right side edge 229 to left side edge 231. Line of weakness 233 is spaced in slightly from top edge 225 so as to provide flat plate 217 with a length L226 from bottom edge 227 to line of weakness 233 which is approximately 3.00 inches. As can be seen, line of weakness 233 divides plate 217 into a main portion 217-1 having a length L226 of about 3.16 inches and a width W126 and a breakaway portion 217-2 having a length L326 of about 0.750 inches and a width W126. Other measurements are L426 of about 1.13 inches and Width W526 of about 1.5 inches.

As noted above, flat plate 217 is sized and shaped to enclose the open front end 29 of the larger sized, one gang, electrical box. However, in order to use cover 215 with the smaller sized, one gang, electrical box, the user is required to break off breakaway portion 217-2 of flat plate 217 through line of weakness 233, such as by bending portion 217-2 flat plate 217 back and forth by hand until it breaks off. After discarding the broken off portion 217-2 of flat plate 217 from line of weakness 233 to top edge 225, the remaining portion 217-1 of cover 215 is properly sized to enclose the open front end of the smaller sized, one gang, electrical box, which is highly desirable.

Wings 219 are formed onto rear surface 223 of flat plate 217 in a spaced apart relationship. Specifically, first wing 219-1 is formed onto rear surface 223 of flat plate 217 and is spaced slightly in from right side edge 229, as seen most clearly in FIG. 25. Similarly, second wing 219-2 is formed onto rear surface 223 of flat plate 217 and is spaced slightly in from left side edge 231. It should be noted that wings 219 project rearwardly out from rear surface 223 of flat plate 217 at an angle away from each other, as will be described further in detail below. Wing 219-1 includes an inner face 219-11, an outer face 219-12 and a pair of side edges 219-13 and 219-14.

Figure 30:
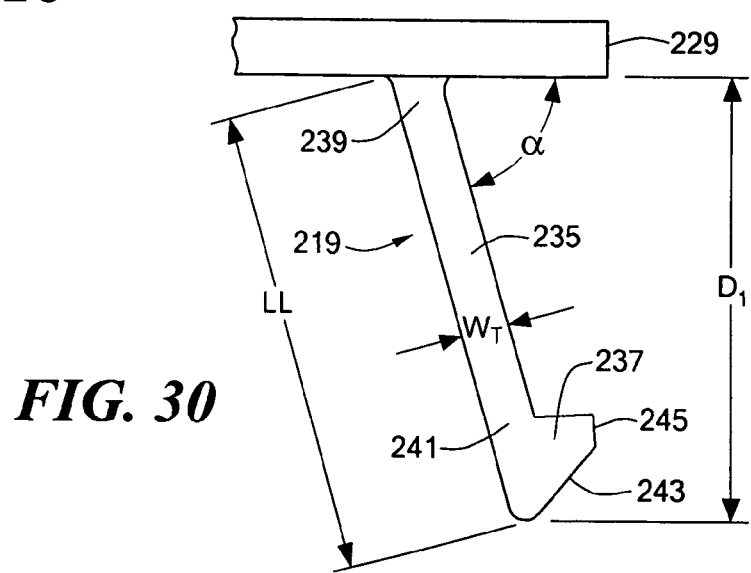
FIG. 30 is an enlarged, fragmentary, view showing the wing in cover shown in FIG. 24.
Figure 31:
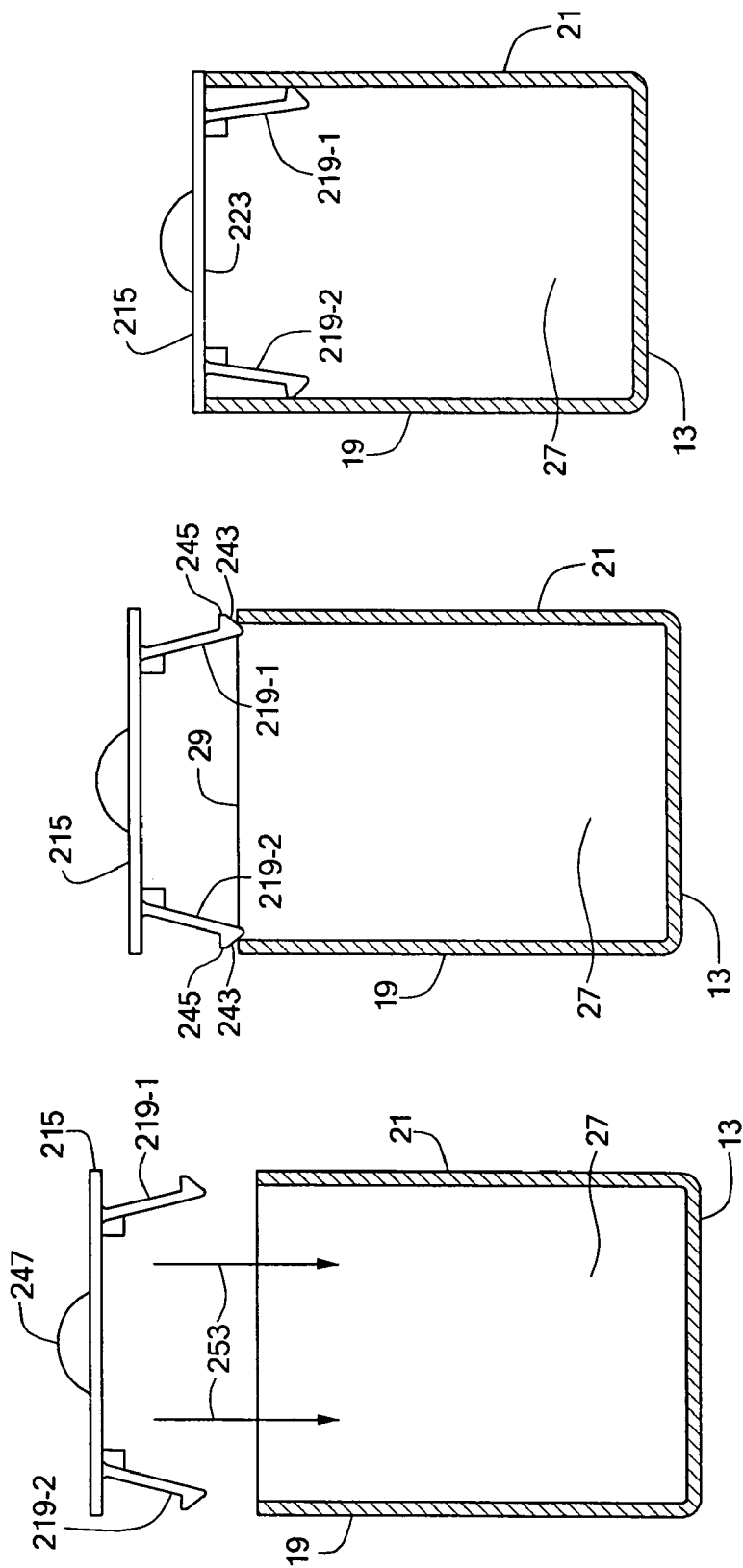
FIGS. 31(a)-(c) show a sequence of views as the cover in FIG. 24 is mounted onto an electrical box, the electrical box being shown in section.

As seen most clearly in FIG. 30, each wing 219 comprises an elongated leg 235, which is integrally formed and extends out from rear surface 223 of flat plate 217, and a foot 237, which is formed onto the free end of leg 235.

Leg 235 is elongated generally rectangularly shaped straight member which is generally rectangular in longitudinal cross-section, has a length LL of approximately 0.625 inches and a thickness $W_t$ of approximately 0.0625 inches. Leg 235 comprises a first end 239, which is integrally formed onto rear surface 223 of flat plate 217, and a second end 241. It should be noted that leg 235 extends rearwardly out from rear surface 223 of flat plate 217 at an angle α which is approximately 75 degrees and extends down from flat plate 215 a distance D1 of approximately 0.50 inches. As will be described further below, each leg 235 is capable of limited inward flexion upon the application of a significant inward force thereonto, each leg 235 resiliently returning to its original orientation upon the removal of the significant inward force.

Foot 237 is an elongated, enlarged member which is integrally formed onto second end 241 of leg 235 along its length. Foot 237 comprises a tapered guiding surface 243 which serves to facilitate the mounting of cover 215 onto electrical box 13, as will be described further below. Foot 237 also comprises a flat engagement surface 245 having a length L5 of approximately 0.05 inches which frictionally engages the inner surface of electrical box 13 to retain cover 215 onto electrical box 13, as will be described further below. As seen most clearly in FIG. 30, guiding surface 243 is not co-planar with engagement surface 245.

A handle 247 for holding cover 215 is integrally formed onto front surface 221. Handle 247 is shown as being in the shape of a flat, semi-circular member. However, it is to be understood that handle 247 is not limited to having a flat, semi-circular shape. Rather, handle 247 could be alternatively constructed in any shape useful for handling cover 215 without departing from the spirit of the present invention.

A first pair of spaced apart displacement limiting posts 249-1 and 249-2 are formed onto rear surface 223 along top edge 225. A second pair of spaced apart displacement limiting posts 249-3 and 249-4 are formed onto rear surface 223 along bottom edge 227. A third pair of spaced apart posts 249-5 and 249-6 are formed onto rear surface 223 along line of weakness 233.

Each post 249 is generally circular in lateral cross-section and is integrally formed onto flat plate 215 to render cover 215 a unitary device. With cover 215 mounted onto electrical box 13, posts 249 are sized and shaped to project into interior cavity 27. In this manner, posts 249 serve to limit displacement of cover 215 in the direction parallel to its longitudinal axis 251 when cover 215 is mounted onto electrical box 13, which is highly desirable while wings 219 limit displacement of cover 215 in the direction perpendicular to its longitudinal axis 251.

Referring now to FIGS. 31(a)-(c), cover 215 mounts onto electrical box 13 in the following manner. Using handle 247, cover 215 is urged towards electrical box 13 in the direction represented by arrows 253 in FIG. 31(a).

As cover 215 is disposed over open front end 29 of electrical box 13, tapered guiding surface 243 of wing 219-2 is drawn into contact against the free end of left side panel 19 and tapered guiding surface 243 of wing 219-1 is drawn into contact against the free end of right side panel 21, as shown in FIG. 31(b).

As cover 215 is further urged toward electrical box 13, the tapered shape of guiding surface 243 causes left side panel 19 and right side panel 21 to inwardly flex wings 219 in such a manner so that engagement surface 245 of wing 219-2 lies flush against the inner surface of left side panel 19 and so that the engagement surface 245 of wing 219-1 lies flush against the inner surface of right side panel 21. Cover 215 is advanced onto electrical box 13 until rear surface 223 of flat plate 215 is seated on top of left side panel 19 and on top of right side panel 21 of electrical box 13, as is clearly shown in FIG. 31(c), completely closing off front end 29 of electrical box 13.

With cover 215 mounted onto electrical box 13 in the manner shown in FIG. 31(c), flat plate 215 covers open front end 29 and encloses interior cavity 27. Furthermore, it should be noted that the construction of cover 215 causes flexible wings 219 to resiliently urge in the outward direction so that engagement surface 245 of wings 219 frictionally contacts side panels 19 and 21 of electrical box 13, thereby creating a frictional retaining force of cover 215 onto electrical box 13, which is highly desirable.

The application of a withdrawal force onto cover 215 which is greater than the frictional force between wings 219 and side panels 19 and 21 will enable cover 215 to be removed from electrical box 13. Subsequent mounting and removal of cover 215 from electrical box 13 can be repeated by the user as deemed necessary.

As noted above, cover 215 is not limited to be being mounted onto electrical box 13. Rather, cover 215 could additionally be mounted onto a smaller sized electrical box in the same manner as described above. However, before mounting cover assembly 215 onto the electrical box, the user is required to break flat plate 215 through line of weakness 233 and discard the portion of flat plate 215 from line of weakness 233 to top edge 225.

It should be noted that cover 215 is not limited in its size and shape. Rather, the size and shape of cover 215 could be modified to enable cover 215 to be mounted on different types of electrical boxes without departing from the spirit of the present invention.

As an example, referring now to FIGS. 32 and 33, there is disclosed another embodiment of a cover which is adapted to be removably mounted onto a circular type electrical box such as shown in FIG. 13, said cover being constructed according to the teachings of the present invention and identified generally by reference numeral 315.

Cover 315 is similar to cover 215 in that cover 315 comprises a substantially flat plate 317, a handle 318 and a pair of retention wings 319-1 and 319-2 which are integrally formed onto flat plate 317 so as to render cover 315 a unitary device.

Figure 26:
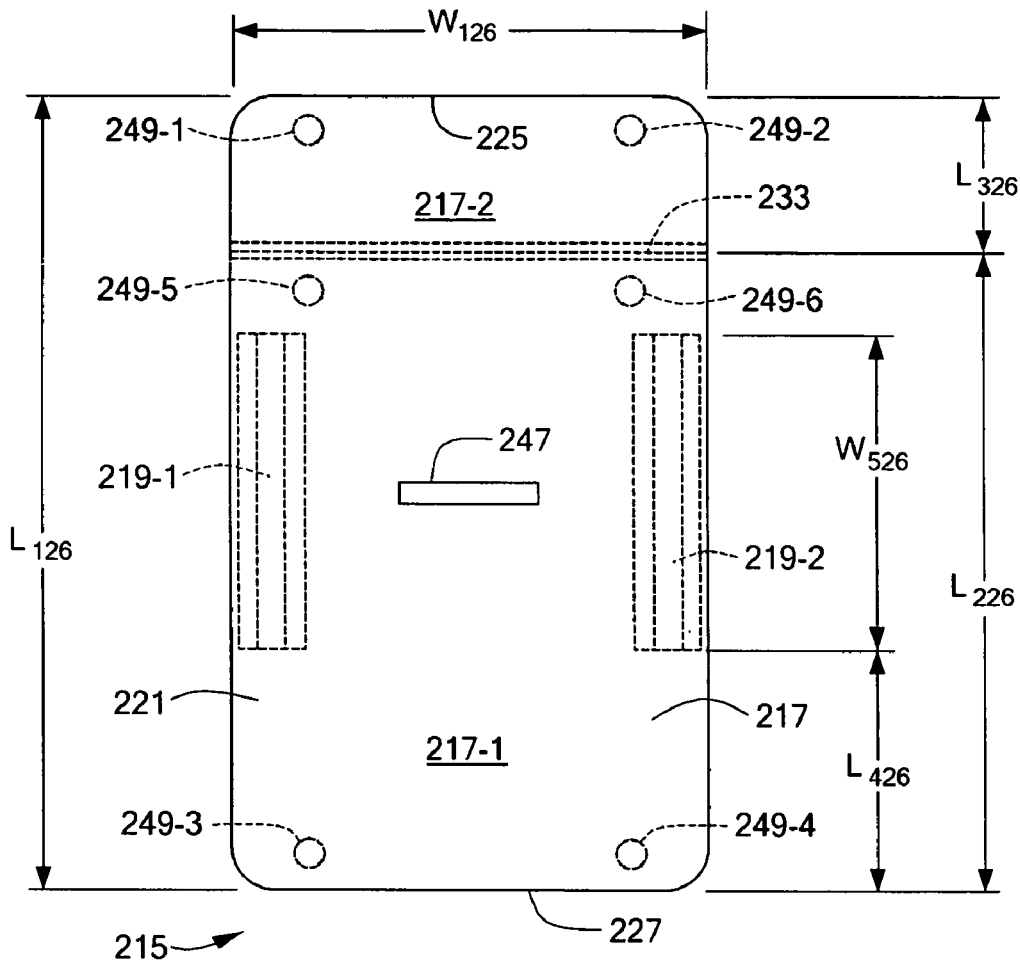
FIG. 26 is a top plan view of the cover shown in FIG. 24.
Figure 27:
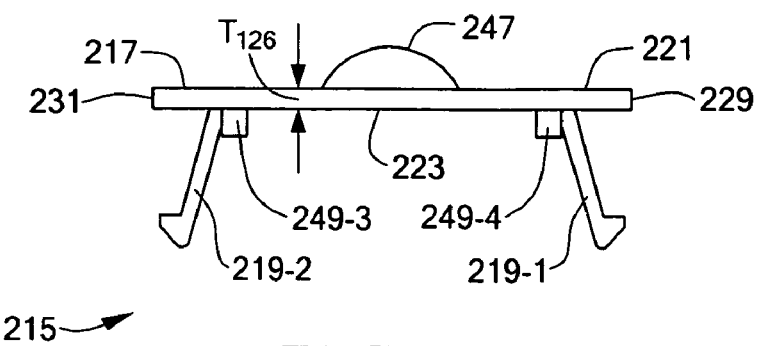
FIG. 27 is a front plan view of the cover shown in FIG. 24.
Figure 28:
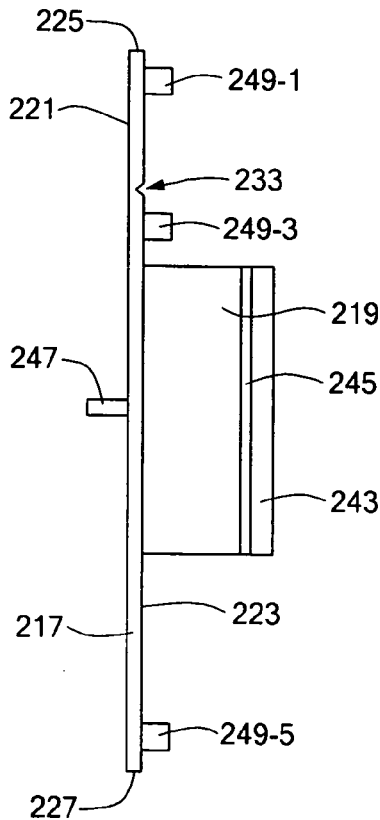
FIG. 28 is an end view of cover shown in FIG. 24.
Figure 29:
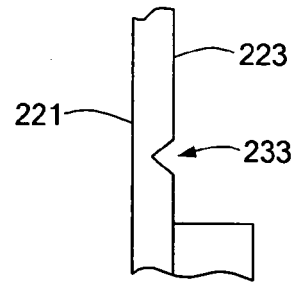
FIG. 29 is an enlarged, fragmentary, view of the cover shown in FIG. 24.

The primary distinctions between cover 315 and cover 215 are is that the size and shape of flat plate 317 differs from the size and shape of flat plate 217 and the shape of wings 319 are different from the shape of wings 219. Specifically, flat plate 317 is generally circular in shape with a thickness $T_1$ of approximately 0.075 inches and has an overall diameter D132 of approximately 4.02 inches, whereas flat plate 217 is generally rectangular in shape and wings 319 are generally arcuate shaped and spaced 180 degrees apart as shown in FIG. 32A and FIG. 32B rather than straight as shown in FIG. 26. As can be seen in FIG. 32B, wings 319 have an overall length $L_6$ width of approximately 1.00 inches extend down from the top of cover 315 a distance $DE_1$ of approximately 0.73 inches and the distance $WD_1$ from the tip of wing 319-1 to the tip of wing 319-2 is approximately 3.93 inches. As can be appreciated, posts, such as posts 249 are not needed in this embodiment. As a result, cover 315 is designed primarily for use in conjunction with an electrical box which is circular in shape, such as a ceiling box.

Figure 34:
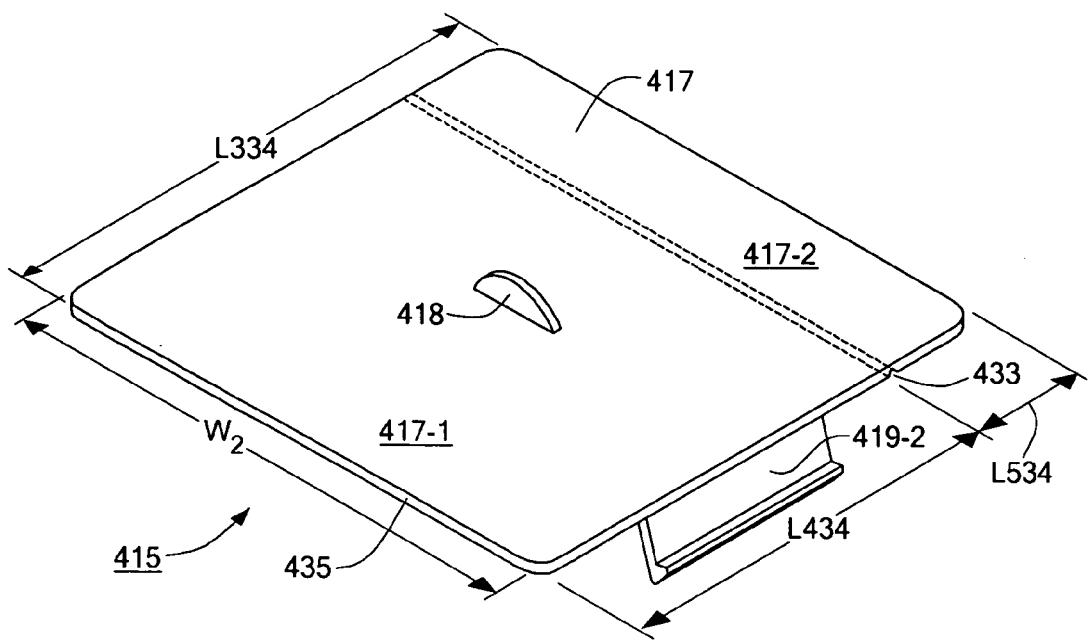
FIG. 34 is a perspective view taken from the top of another embodiment of a cover for an electrical box constructed according to the teachings of the present invention.
Figure 35:
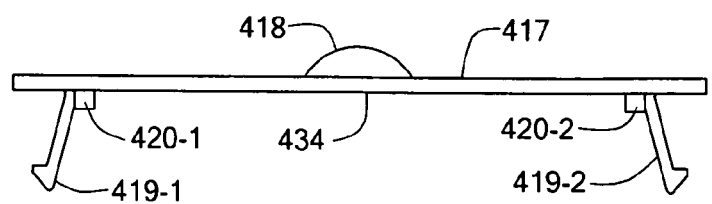
FIG. 35 is a front view of the cover shown in FIG. 34.

As another example, referring now to FIGS. 34 and 35, there is disclosed another embodiment of a cover which is adapted to be removably mounted onto an electrical box, said cover being constructed according to the teachings of the present invention and identified generally by reference numeral 415.

Cover 415 is similar to cover 215 in that cover 415 comprises a substantially flat plate 417 having an overall length L334, a handle 418, a pair of retention wings 419-1 and 419-2 which are integrally formed onto flat plate 417 so as to render cover 415 a unitary device and displacement limiting posts, two of which 420-1 and 420-2 as shown in FIG. 35. Flat plate 417 is shaped to include a line of weakness 433 on its bottom surface 434 which divides flat plate 417 into a main portion 417-1 having a length dimension L434 and a breakaway portion 417-2 having a length L534 which enables the length dimension of cover 415 to be made smaller.

The primary distinction between cover 415 and cover 215 is that the size and shape of flat plate 417 differs from the size and shape of flat plate 217. Specifically, flat plate 417 is designed primarily for use in conjunction with a two gang electrical box (i.e., an electrical box designed to be used as a mounting structure for two electrical devices), whereas flat plate 217 is designed primarily for use in conjunction with a single gang electrical box (i.e., an electrical box designed to be used as a mounting structure for a single electrical device). Flat plate 417 has an overall length L334 of approximately 3.73 inches and an overall width W234 of 4.05 inches. Furthermore, after breaking cover 415 through line of weakness 433, the remaining portion of flat plate 417, (i.e. the portion between edge 435 and line of weakness 433) has an overall length L434 of approximately 3.00 inches.

Figure 36:
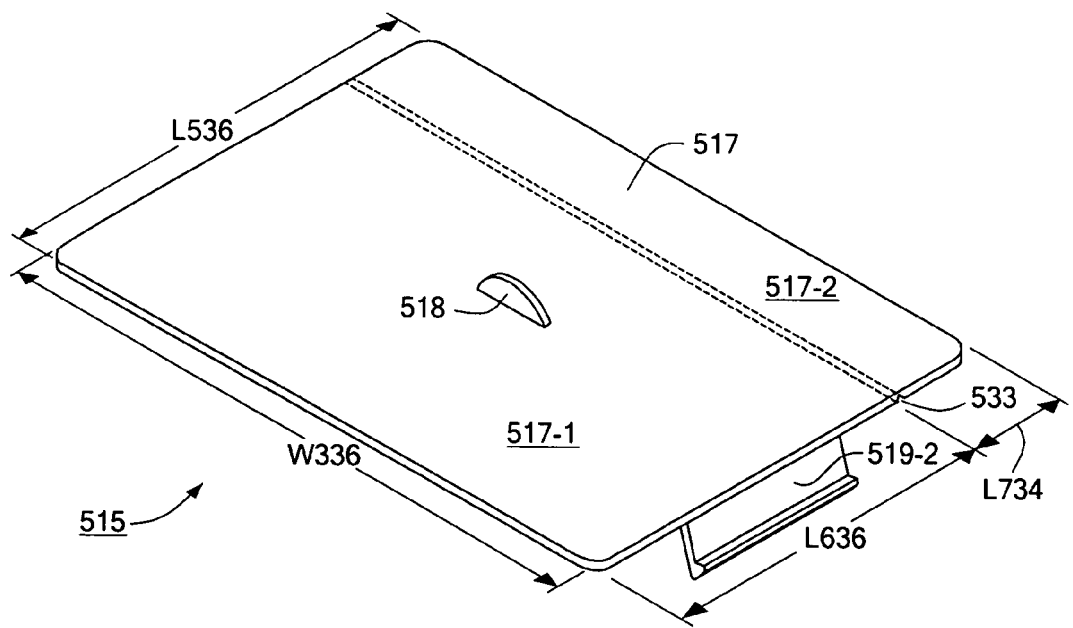
FIG. 36 is a top perspective view taken from the top of another embodiment of a cover for an electrical box constructed according to the teachings of the present invention.
Figure 37:
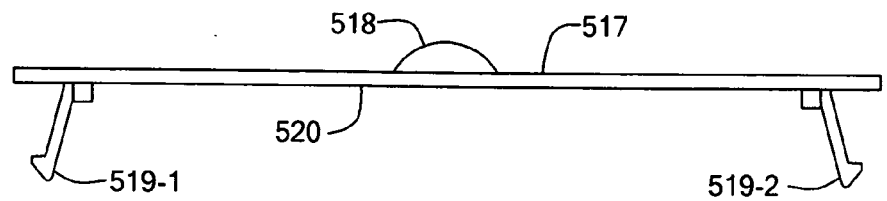
FIG. 37 is a front view of the cover shown in FIG. 36.

As another example, referring now to FIGS. 36 and 37, there is disclosed another embodiment of a cover which is adapted to be removably mounted onto an electrical box, said cover being constructed according to the teachings of the present invention and identified generally by reference numeral 515.

Cover 515 is similar to cover 215 in that cover 515 comprises a substantially flat plate 517 having an overall length dimension of L536, a handle 518 and a pair of retention wings 519-1 and 519-2 which are integrally formed onto flat plate 517 so as to render cover 515 a unitary device, flat plate 517 being shaped to include a line of weakness 533 on its bottom surface 520 dividing plate 517 into a main portion 517-1 having a length dimension L636 and a breakaway portion 517-2 having a length dimension L736.

The primary distinction between cover 515 and cover 215 is that the size and shape of flat plate 517 differs from the size and shape of flat plate 217. Specifically, flat plate 517 is designed primarily for use in conjunction with a three gang electrical box (i.e., an electrical box designed to be used as a mounting structure for three electrical devices), whereas flat plate 217 is designed primarily for use in conjunction with a single gang electrical box (i.e., an electrical box designed to be used as a mounting structure for a single electrical device). Flat plate 517 has an overall length L536 of approximately 3.73 inches and an overall width W336 of 5.83 inches. Furthermore, after breaking cover 515 through line of weakness 533, the remaining portion 517-1 of flat plate 517 has an overall length L636 of approximately 3.00 inches, the breakaway portion 517-2 having an overall length L736 of approximately 0.73 inches.

Figure 38:
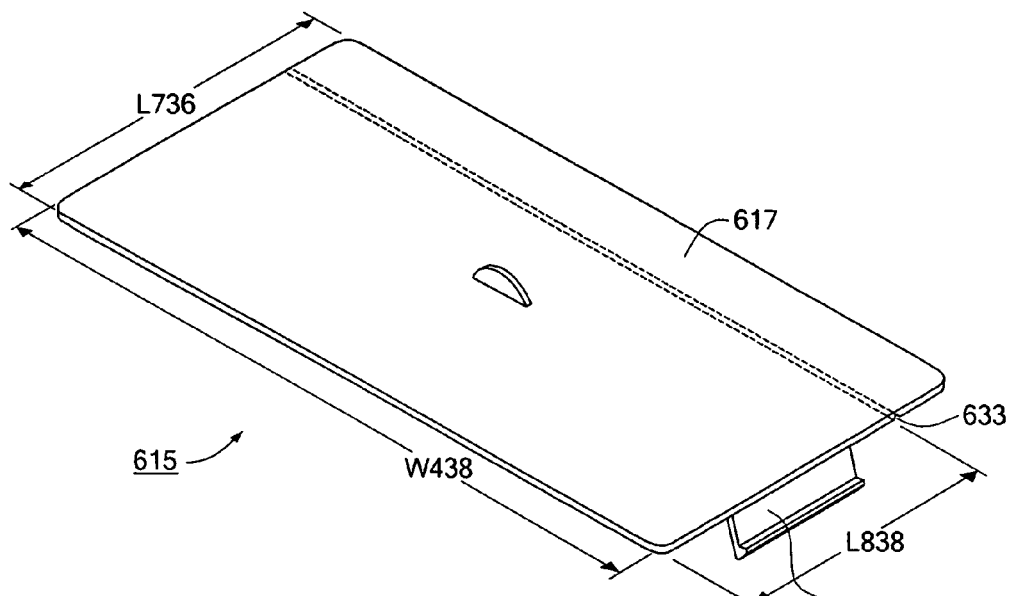
FIG. 38 is a perspective view taken from the top of another embodiment of a cover for an electrical box constructed according to the teachings of the present invention.
Figure 39:
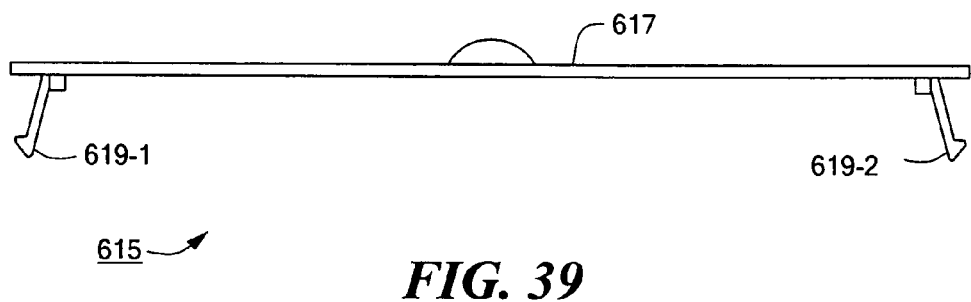
FIG. 39 is a front view of the cover shown in FIG. 38.
Figure 40:
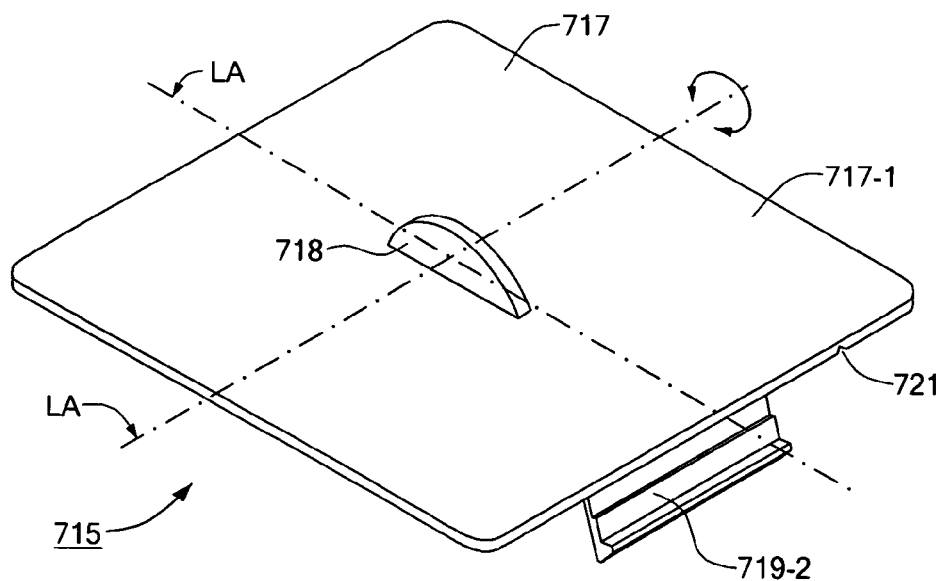
FIG. 40 is a perspective view taken from the top of another embodiment of a cover for an electrical box constructed according to the teachings of the present invention.
Figure 41:
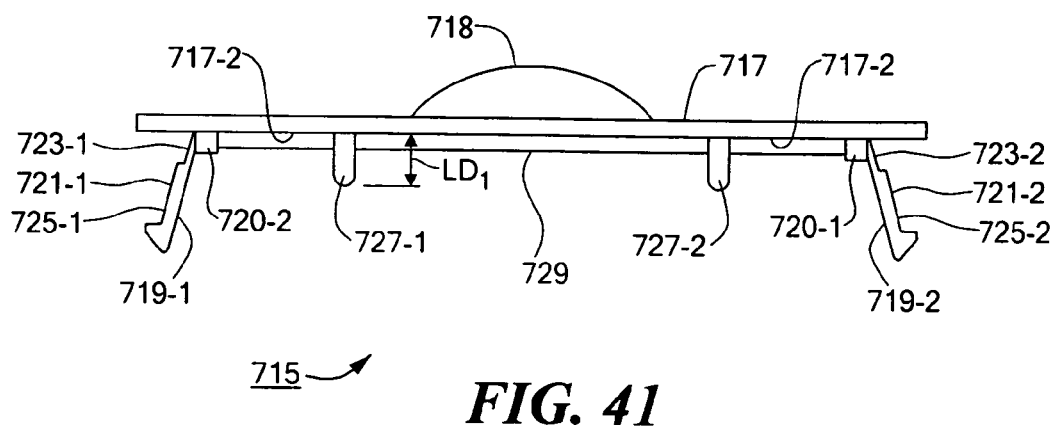
FIG. 41 is a front view of the cover shown in FIG. 40.

As another example, referring now to FIGS. 38 and 39, there is disclosed another embodiment of a cover which is adapted to be removably mounted onto an electrical box, said cover being constructed according to the teachings of the present invention and identified generally by reference numeral 615.

Cover 615 is similar to cover 215 in that cover 615 comprises a substantially flat plate 617, a handle 618 and a pair of retention wings 619-1 and 619-2 which are integrally formed onto flat plate 617 so as to render cover 615 a unitary device, flat plate 617 being shaped to include a line of weakness 633 which enables cover 615 to be reduced in size.

The primary distinction between cover 615 and cover 215 is that the size and shape of flat plate 617 differs from the size and shape of flat plate 217. Specifically, flat plate 617 is designed primarily for use in conjunction with a four gang electrical box (i.e., an electrical box designed to be used as a mounting structure for four electrical devices), whereas flat plate 217 is designed primarily for use in conjunction with a single gang electrical box (i.e., an electrical box designed to be used as a mounting structure for a single electrical device). Flat plate 617 has an overall length L738 of approximately 3.73 inches and an overall width W438 of 7.61 inches. Furthermore, after breaking cover 615 through line of weakness 633, the remaining portion of flat plate 617 has an overall length L838 of approximately 3.00 inches.

Figure 44:
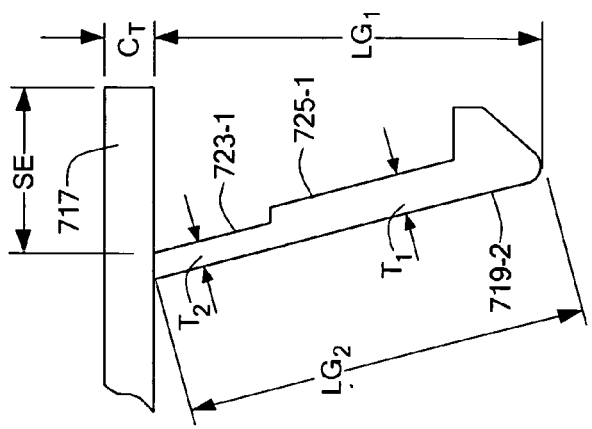
FIG. 44 is an enlarged fragmentary view of the cover shown in FIG. 40.
Figure 43:
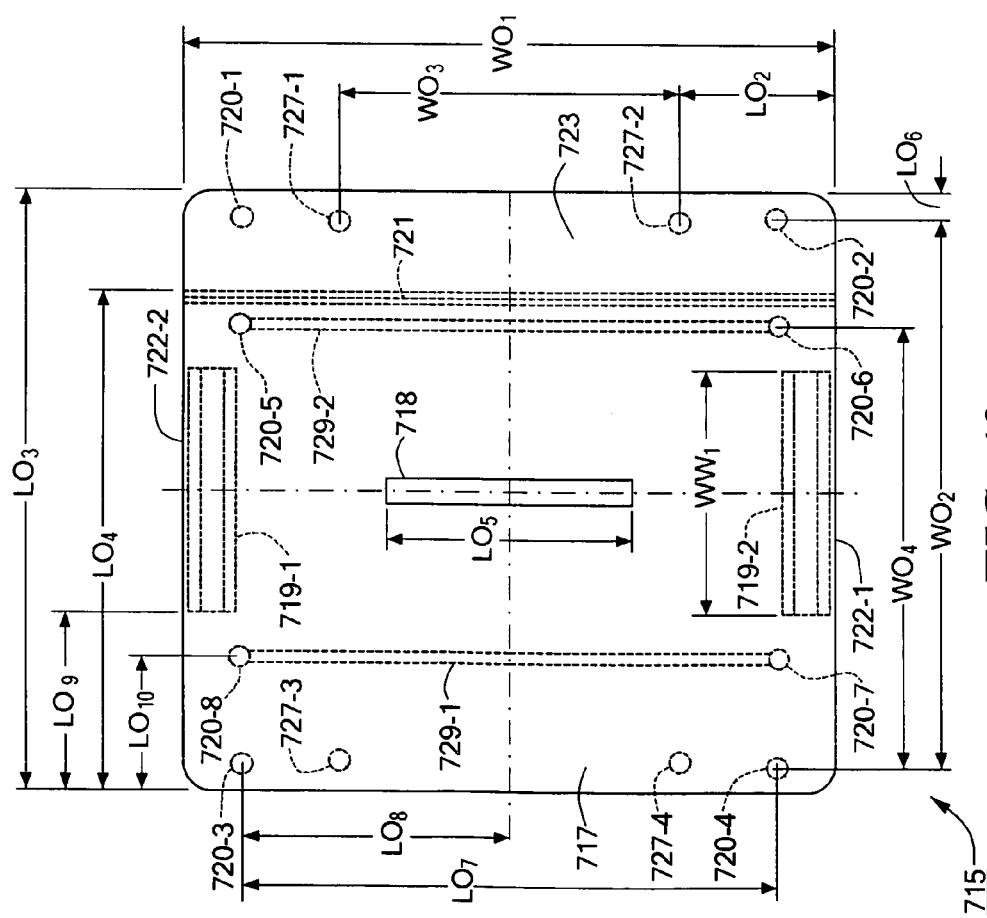
FIG. 43 is a top plan view of the cover shown in FIG. 40.
Figure 45:
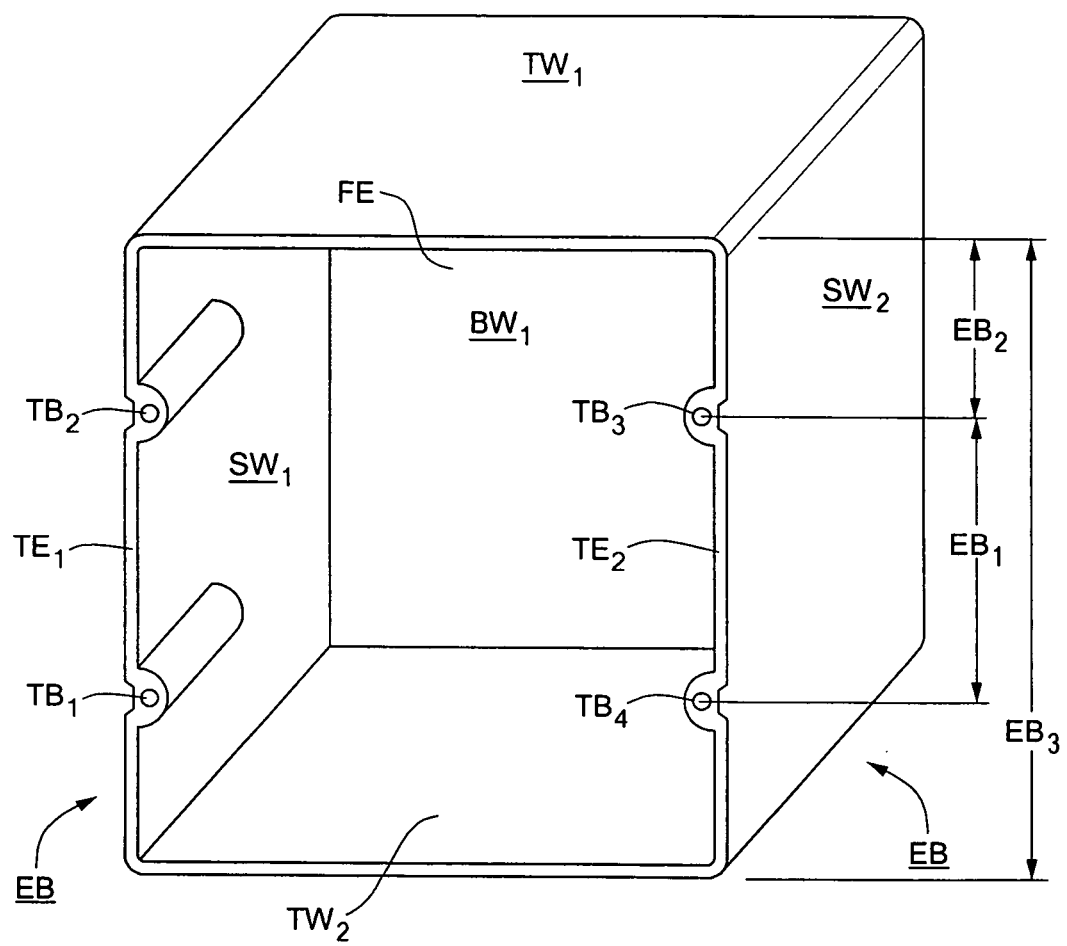
FIG. 45 is a perspective view of a two gang electrical box made of plastic with which the tenth embodiment of the invention may be used.
Figure 46:
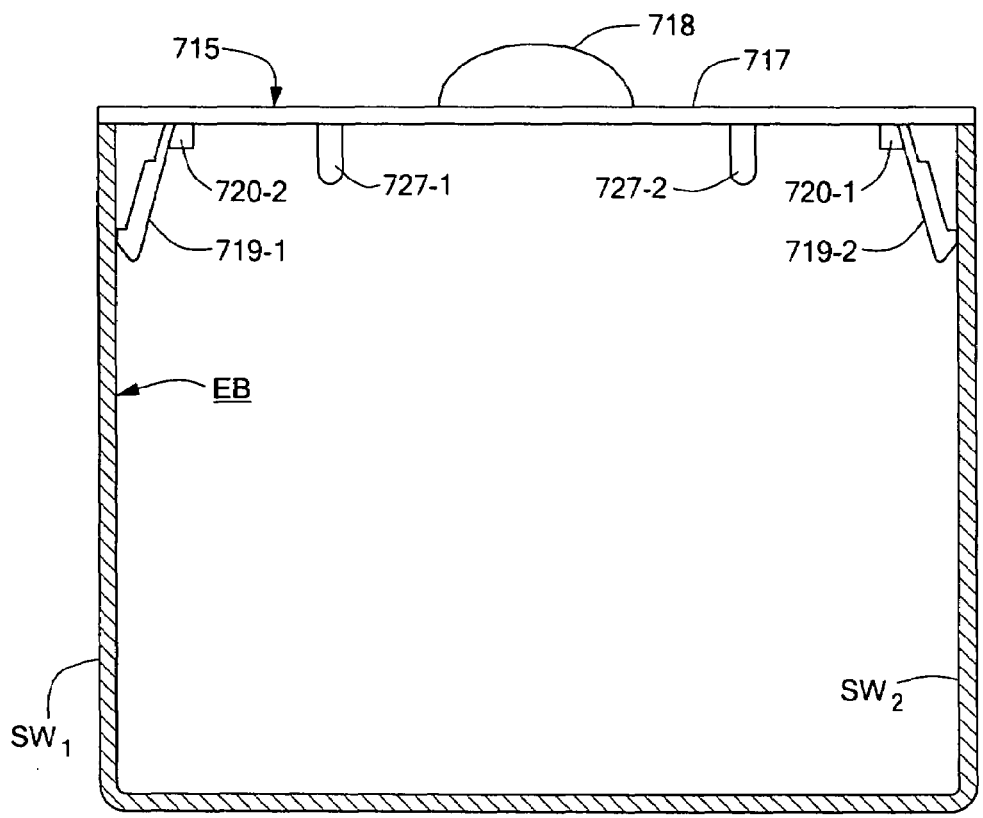
FIG. 46 is a view showing the cover in FIG. 40 mounted on the electrical box in FIG. 45.

As another example, referring now to FIGS. 40-43 there is disclosed another embodiment of a cover which is adapted to be removably mounted onto an electrical box, said cover being constructed according to the teachings of the present invention and identified generally by reference numeral 715. As will be explained in more detail below, cover 715 is usable with two different sized two gang electrical boxes, one size being made of plastic and the other size being made of metal. An enlarged fragmentary view of cover 715 is shown in FIG. 44 and a top view of an electrical box EB with which cover 715 may be used is shown in FIG. 45. A view showing cover 715 mounted on box EB is shown in FIG. 46. Electrical box EB is the larger size electrical box which is made of plastic and which includes an interior cavity defined by a pair of side walls SW1 and SW2, a top wall TW1, a bottom wall TW2, a back wall BW1 and an open front FE. Electrical box EB also includes four threaded bores TB1 through TB4 for receiving four electrical receptacle mounting screws for use in securing a pair of electrical receptacles to the box. Side wall SW1 includes a top edge TE1 and side wall SW2 includes a top edge TE2.

Cover 715 is similar to cover 415 in that cover 715 comprises a substantially flat plate 717, a handle 718 on the top surface 717-1 of plate 717 and a pair of retention wings 719-1 and 719-2 which are integrally formed onto the bottom surface 717-2 of flat plate 717. Flat plate 717 is shaped to include a line of weakness 721 on its bottom surface 717-2 extending laterally across from side edge 722-1 to side edge 722-2 which enables portion 723 of flat plate 717 too be broken off so as to reduce its length if it is to be used with an electrical box which is made of metal rather than plastic and which is shorter in length as noted above. As can be seen, especially in FIGS. 42 through 44, wings 719-1 and 719-2 do not extend out from side edges 722-2 and 722-1, respectively, of cover, but rather are spaced in from the side edges a distance SE, see for example FIG. 44. This enables a more closed off fit when cover is placed over box EB. Cover 715 also includes four displacement limiting posts 720-1 through 720-4 similar in structure and function to posts 249-1 through 249-6 in embodiment 215.

There are three main distinctions between cover 715 and cover 415.

The first distinction is that wings 719-1 and 719-2 have leg portions 721-1 and 721-2 respectively, which are not uniform in cross-section throughout their lengths as is the case with legs 419-1 and 419-2 but rather are thinner at their inner end portions 723-1 and 723-2 than at their outer end portions 725-1 and 725-2 so as to provide more flexibility than the wings in the previous embodiments.

The second main distinction is that cover 715 includes four pins 727-1 through 727-4 which are intended to be press fit into the threaded bores TB1 through TB4 in electrical box EB to prevent cover 715 from popping out when it is mounted thereon if it is hit by mistake. As can be seen, pins 727-1 through 727-4 along with wings 719 hold cover 715 in place in the electrical box. At the same time, pins 727-1 through 727-4 limit longitudinal and lateral movement of cover 715 relative to the electrical box.

The third main distinction is that flat plate 717 includes a pair of strengthening ribs 729-1 and 729-2 so that flat plate 717 is not so easily bendable about its longitudinal axis LA, as well as two pairs of posts, 720-5 and 720-6 and 720-7 and 720-8. Strengthening rib 729-1 extends from post 720-4 to post 720-3. Strengthening rib 729-2 extends from post 720-7 to post 720-8. If need be, posts 720-5 through 720-8 could be eliminated.

When being used with a metal electrical box, which is a smaller type of box than plastic box EB, portion 723 is broken off, retention wings 719-1 and 719-2 are used to hold the cover in place when mounted on the box, while posts 720-3, 720-4, 720-5 and 720-6 limit displacement of cover 715 in a direction parallel to its longitudinal axis 730. If desired, the other embodiments of the cover could be modified to include strengthening ribs as in cover 715. The overall length dimensions L03 and L04 and width dimensions W01 of cover 715 are the same as dimensions L3, L4 and W2, respectively, in cover 415, namely approximately 3.73 inches, 3.00 inches and 4.05 inches.

Dimensions of electrical box EB shown in FIG. 45 are as follows: EB1 is 1.80 inches, EB2 is 1.12 inches and EB3 is 4.06 inches, all dimensions being approximate values.

Other dimensions of cover 715 are as follows: WO3 is 1.80 inches, LO2 is 1.09 inches, LO6 is 1.7 inches, WO2 is 3.40 inches, WO4 is 2.65 inches, LO5 is 1.5 inches, LO7 is 3.32 inches, LO8 is 1.66 inches, LO9 is 1.00 inches, LO10 is 0.725 inches, LD1 is 0.25 inches, $C_T$ is 0.75 inches, T1 is 0.7 inches, T2 is 0.30 inches, LG 2 is 0.80 inches and $WW_1$ is 1.50 inches, all dimensions being approximate values.

As can be appreciated, pins 727 prevent lateral and longitudinal movement of cover 715 when mounted on electrical box EB.

Also, the embodiments described above constructed for use on the two and three gang electrical boxes may also be modified to include pins as in cover 715 which are intended to fit into the threaded bores of the electrical boxes.

Figure 47:
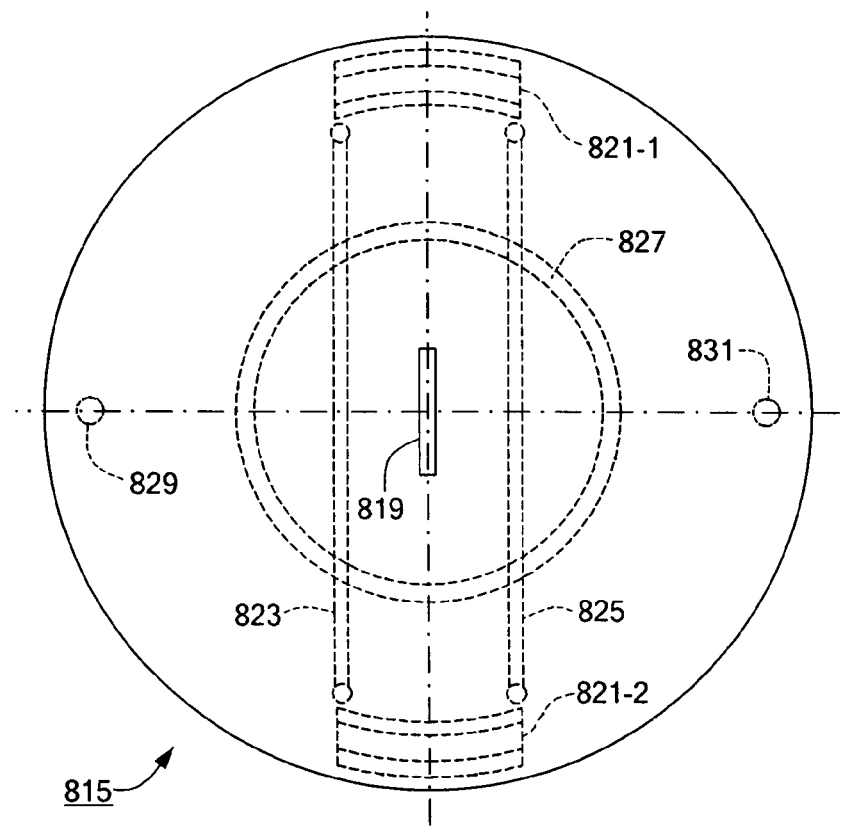
FIG. 47 is a top plan view of another embodiment of a cover for an electrical box constructed according to the teachings of the present invention.
Figure 48:
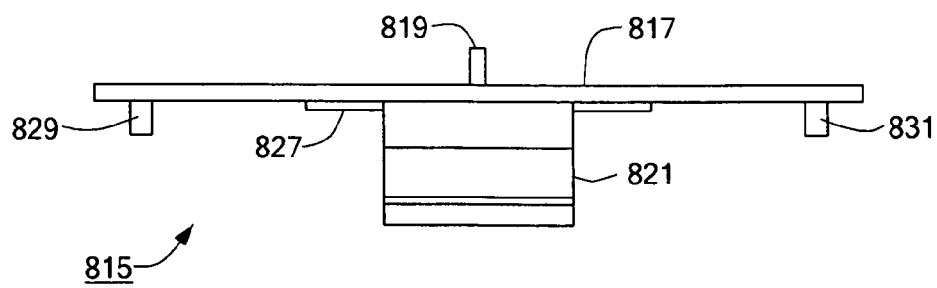
FIG. 48 is a right side view of the cover shown in FIG. 47.

Referring to FIGS. 47 and 48 there is shown another embodiment of a cover 815 constructed according to this invention for use with a circular type electrical box such as shown in FIG. 13. Cover 815 is similar to cover 315 in that it comprises a substantially flat circular shaped plate 817 identical in size to plate 317 in FIG. 32 and having a handle 819 and a pair of retention wings 821-1 and 821-2 identical in size and shape to wings 319-1 and 319-2, respectively, in cover 315. Handle 819 and retention wings 821-1 and 821-2 are all integrally formed onto flat plate 817 so as to render cover 815 a unitary device. However, in addition, cover 815 includes two straight strengthening ribs 823 and 825 and one circular strengthening rib 827 along with two cylindrically shaped pins 827 and 829 which are intended to fit into two threaded bores in the circular type electrical box.

Figure 49:
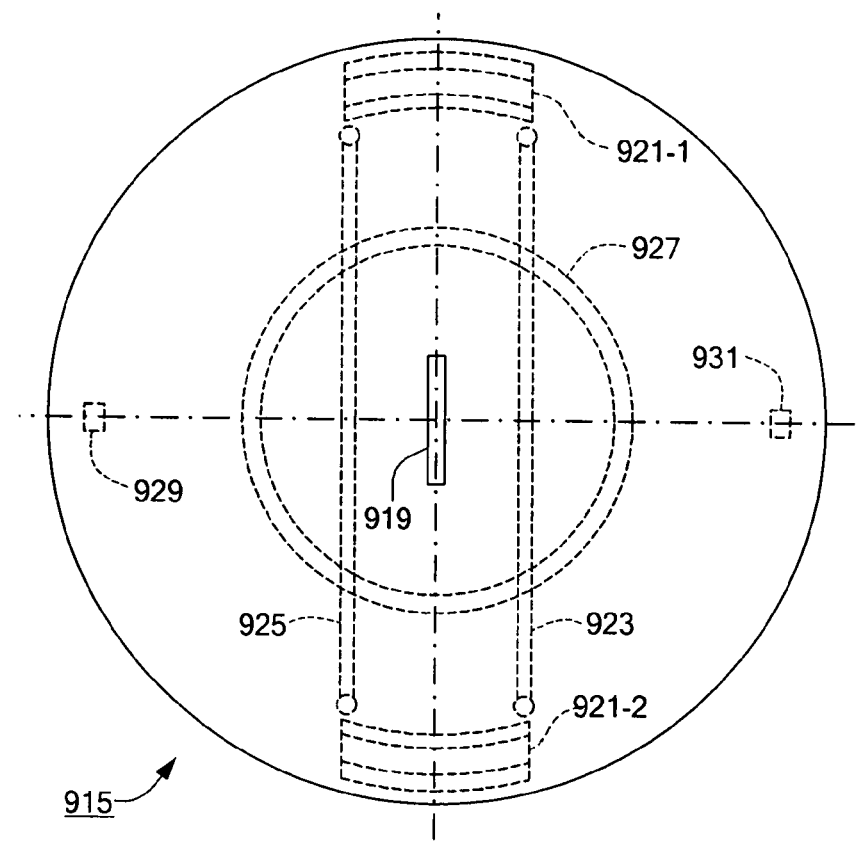
FIG. 49 is a top plan view of another embodiment of a cover for an electrical box constructed according to the teachings of the present invention.

Referring now to FIG. 49, there is shown another embodiment of a cover according to this invention, the cover having identified by reference numeral 915. Cover 915 is intended for use with circular type electrical boxes having threaded bores larger in cross-section than the threaded bores in electrical boxes with which cover 47 is intended to be used.

Figure 50A:
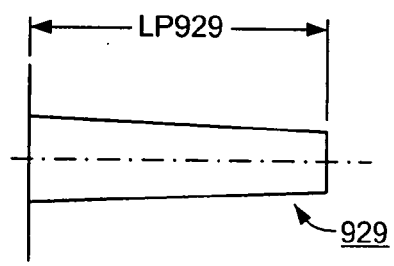
FIGS. 50A, 50B and 50C are enlarged front, top and side views respectively of one of the pins in the cover shown in FIG. 49.
Figure 50B:
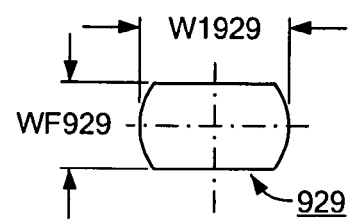
Figure 50C:
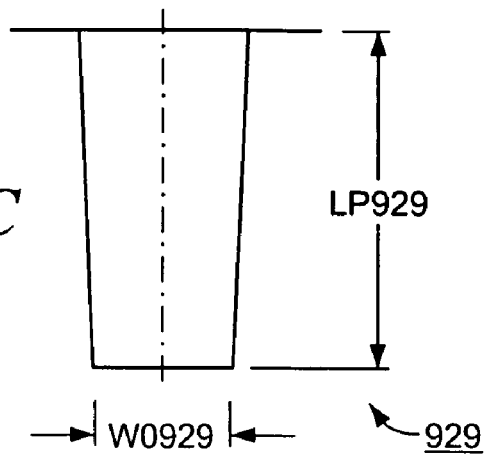

Cover 915 is similar to cover 815 in that cover 915 comprises a circular shaped plate 917 identical in size to plate 815, a handle 919 identical to handle 819, retention wings 921-1 and 921-2 identical to retention wings 821-1 and 821-2 and strengthening ribs 923, 925 and 927 identical to strengthening ribs 823, 825 and 827. Cover 915 also includes two pins 929 and 931 similar to pins 829 and 831 which are intended to fit into threaded bores in a circular type electrical box; however, pins 929 and 931 differ in shape from pins 827 and 829. In particular, instead of being cylindrically shaped as is the case with pins 827 and 829, pins 929 and 931, which are identical, are four sided and taper inward from the inner end to the outer end and useable with boxes having bores larger than the bores in FIG. 47. Enlarged front, top and side views of pin 929 are shown in FIGS. 50A, 50B and 50C, respectively. Pin 929 has a length LP929 of approximately 0.355 inches, a width across the flats WF929 of about 0.100 inches, a width at the inner end WI 929 of about 0.169 inches and a width at the outer end WO929 of about 0.147 inches.

Figure 51:
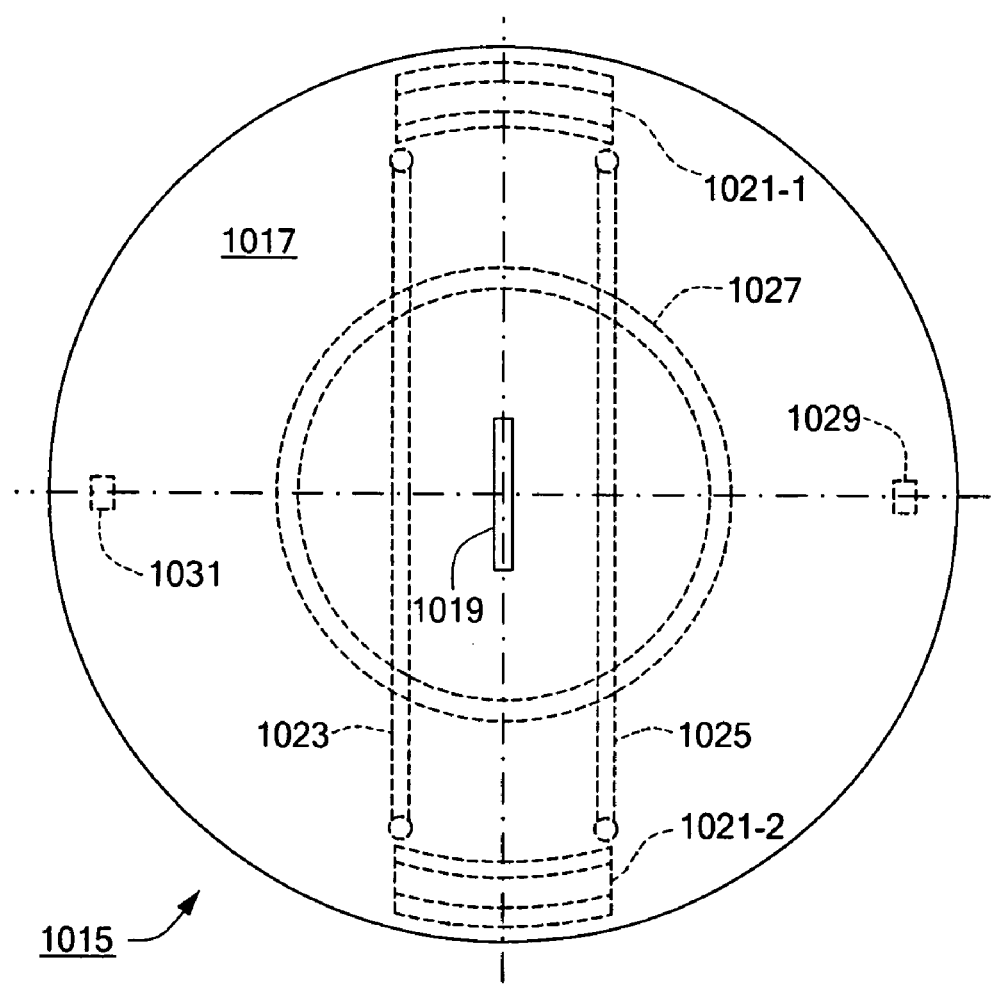
FIG. 51 is a top plan view of another embodiment of a cover for an electrical box constructed according to the teachings of the present invention.

Referring now to FIG. 51, there is shown another embodiment of a cover according to this invention, the cover being identified by reference numeral 1015. Cover 915 is intended for use with circular type electrical boxes having threaded bores larger in cross-section than the threaded bores in electrical boxes with which cover 47 is intended to be used.

Figure 52A:
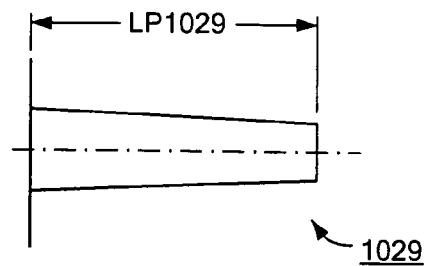
FIGS. 52A, 52B and 52C are enlarged front, top and side views respectively of one of the pins in the cover shown in FIG. 51.
Figure 52B:
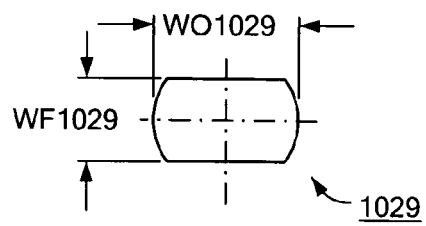
Figure 52C:
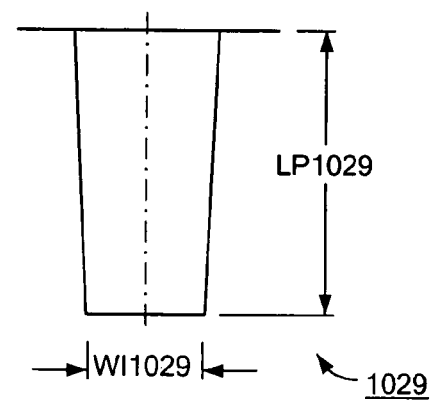

Cover 1015 is similar to cover 915 in that cover 1015 comprises a circular shaped plate 1017 identical in size to plate 915, a handle 1019 identical to handle 919, retention wings 1021-1 and 1021-2 identical to retention wings 921-1 and 921-2, strengthening ribs 1023, 1025 and 1027 identical to strengthening ribs 923, 925 and 927 and two pins 1029 and 1031, similar to pins 929 and 931 in shape but slightly different in measurements. Enlarged front, top and side views of pin 1029 are shown in FIGS. 52A, 52B and 52C, respectively. Pin 1029 has a length LP1029 of approximately 0.300 inches, a width across the flats WF1029 of about 0.100 inches, a width at the inner end WI 1029 of about 0.159 inches and a width at the outer end WO 1029 of about 0.138 inches.

Figure 53A:
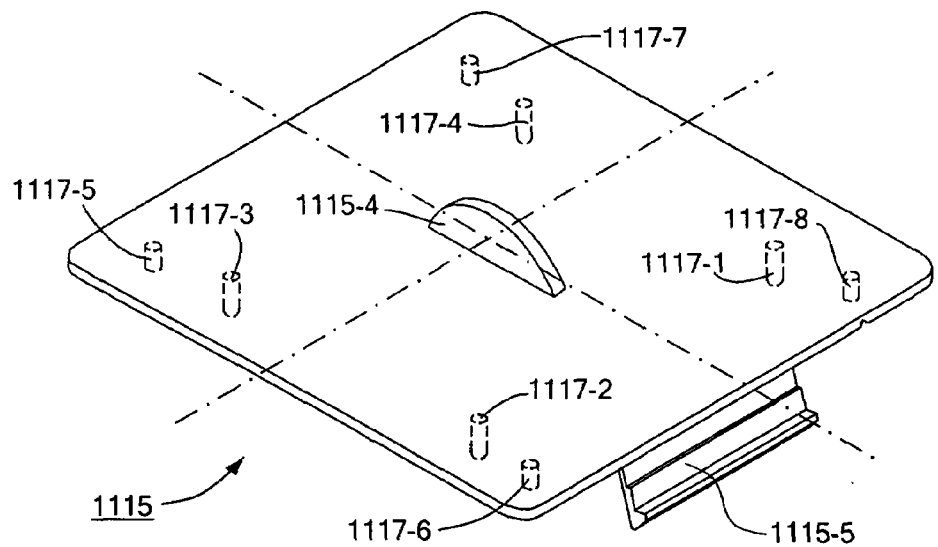
FIGS. 53A and 53B are perspective and front views respectively of another embodiment of a cover constructed according to this invention.
Figure 53B:
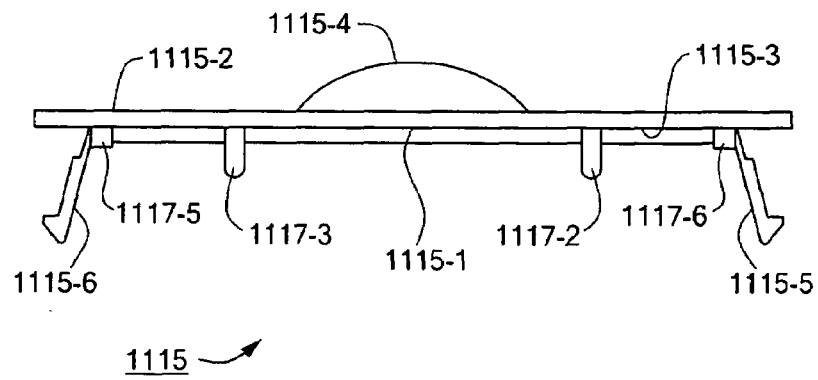

Referring now to FIG. 53A and 53B there are shown perspective and front views of another embodiment of a cover according to this invention, the cover being identified by reference numeral 1115. Cover 1115 comprises a rectangular plate 1115-1 having a top surface 1115-2 and a bottom surface 1115-3, a handle 1115-4, a pair of wings 1115-5 and 1115-6, four pins 1117-1 through 1117-4 and four posts, 1117-5 through 1117-8.

Figure 54A:
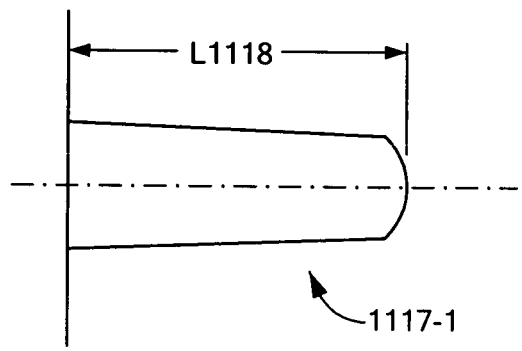
FIGS. 54A, 54B and 54C are enlarged front, top and side views respectively of one of the pins in the cover shown in FIG. 53.
Figure 54B:
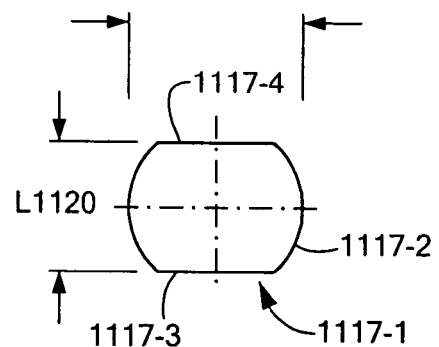
Figure 54C:
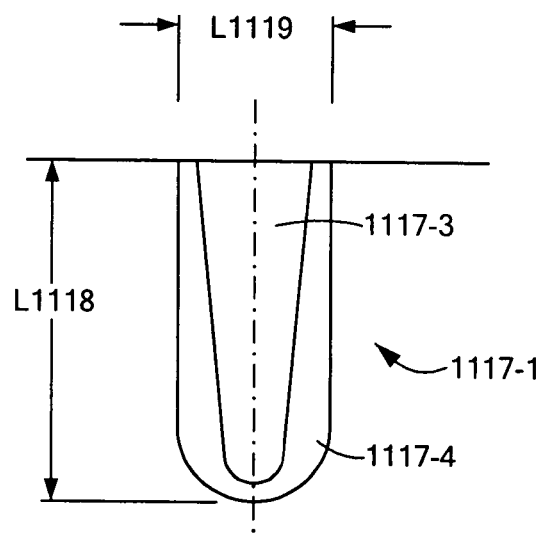

Cover 1115 differs from cover 715 only in the size and shape of the four pins which fit into threaded bores in the electrical box into which it is removably mounted. Instead of being cylindrically shaped and rounded at the top as in the case with pins 727-1 through 727-4 in cover 715, pins 1117-1 through 1117-4 are rounded at the top but specially shaped to fit snugly into large threaded bores. Front top and side views of one of the pins 1117-1 are shown in FIG. 54A, 54B and 54C. As can be seen in FIGS. 54A through 54C, the surface 1117-2 of pin 1117-1 is curved except for the front 1117-3 and back 1117-4 which are flat. Dimensions of pin 1117-1 are as follows: L1118 is about 0.270 inches, L1119 is about 0.135 inches and L1120 is about 0.100 inches.

Figure 55A:
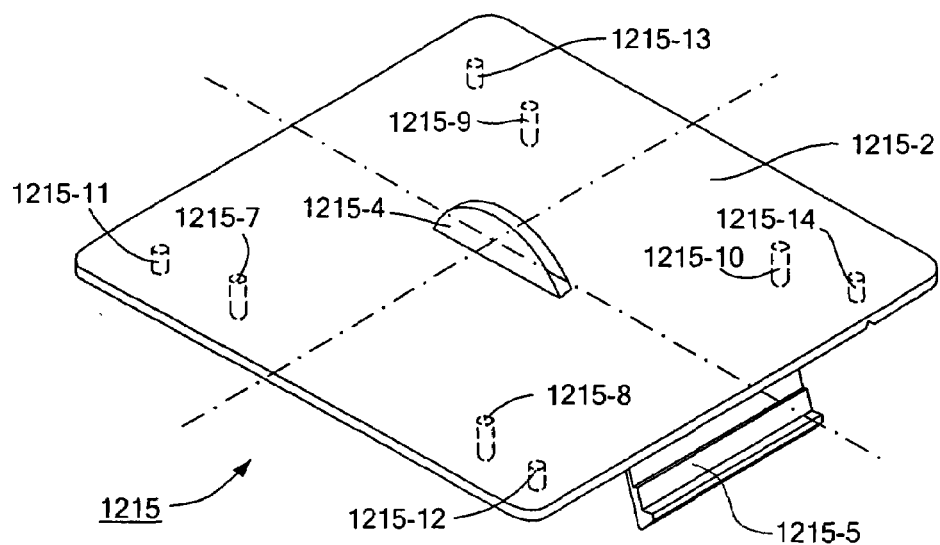
FIGS. 55A and 55B are perspective and front views respectively of another embodiment of a cover constructed according to this invention.
Figure 55B:
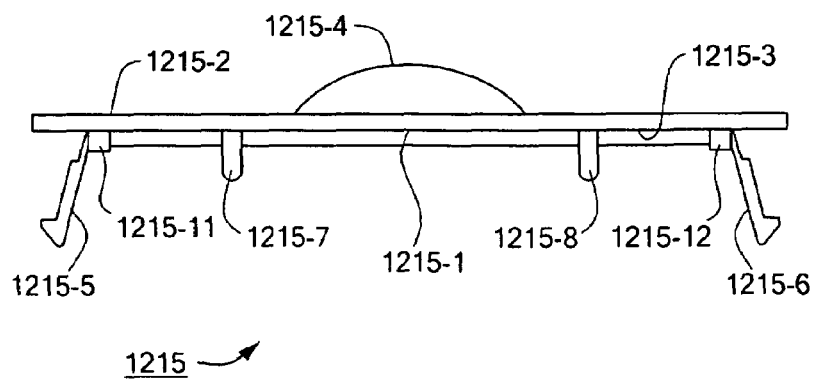
Figure 56A:
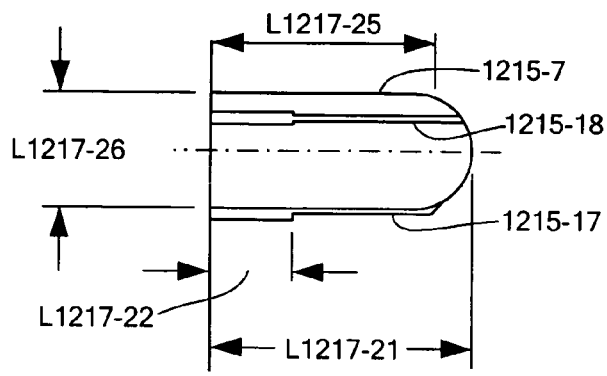
FIGS. 56A and 56B are enlarged side and top views of one of the pins in the cover in FIG. 55.
Figure 56B:
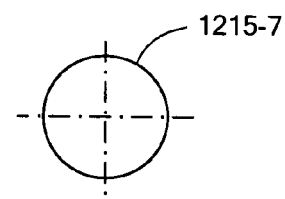
Figure 56C:
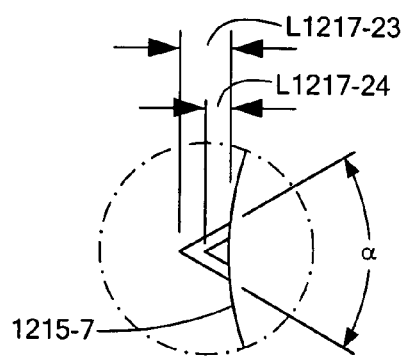
FIG. 56C is an enlarged view showing the rib in the pin in FIG. 56 at the top and at the bottom and FIG. 56D is an enlarged front view of the pin in FIG. 56A.
Figure 56D:
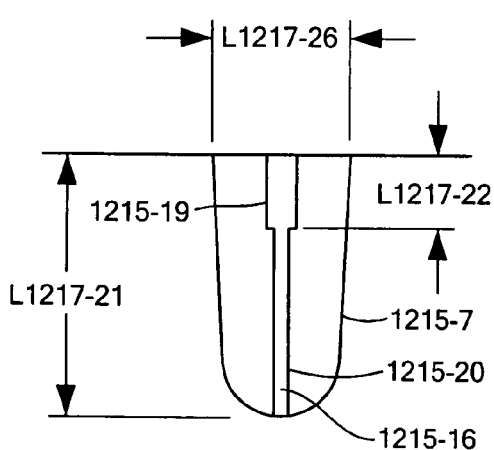

Referring now to FIGS. 55A and 55B there are shown perspective and front views of another embodiment of a cover according to this invention, the cover being identified by reference numeral 1215. Cover 1215 comprises a rectangular plate 1215-1 having a top surface 1215-2 and a bottom surface 1215-3, a handle 1215-4, a pair of wings 1215-5 and 1215-6, four pins 1215-7 through 1215-10 and four posts 1215-11 through 1215-14.

Cover 1215 differs from cover 1115 only in the size and shape of the four pins which fit into threaded bores in the electrical box into which cover 1215 may be removably mounted. Pins 1215-7 through 1215-10, which are identical, are designed to fit snugly into certain types of large threaded bores. Views of one of the pins 1215-7 are shown in FIGS. 56A, 56B, 56C, and 56D. As can be seen, pin 1215-7 includes a main body 1215-15 and three ribs 1215-16 through 1215-18, spaced 120 degrees apart, which are thicker at the bottom of 1215-19 than at the top of 1215-20. Dimensions of pin 1215-7 are as follows: L1217-21 is about 0.250 inches and L1217-22 is about 0.070, L1217-23 is about 0.009 inches and L1217-24 is about 0.04 inches, L1217-25 is about 0.214 inches, L1217-26 is about 0.11 inches, angle λ is about 80 degrees.

Also, the wings in the other embodiments of the invention could, if desired, be modified to include legs as shown in cover 715. Also, the pins shown in FIG. 56 could be used in any single gang, two gang, three gang and four gang cover according to this invention.

The embodiments of the invention described above in FIGS. 24 through 56 are intended for use with what is referred to in the trade as residential outlet boxes and are all made of polycarbonate or other suitable material.

Covers described hereinafter in FIGS. 59 through 64 are intended to be used with what is referred to in the trade as commercial outlet boxes. These covers are all made of polycarbonate or other suitable material.

Commercial outlet boxes are not the same construction as residential outlet boxes and are used in combination with a plaster ring which is constructed to be securely mounted onto the commercial outlet box. In use, the cover according to this invention for use with commercial outlet boxes is removably mounted onto the plaster ring, rather than the outlet box itself as is the case with residential outlet boxes.

It should also be noted that a commercial outlet box is not limited solely for use in commercial applications but can, if desired, also be used in residential applications.

Figure 57A:
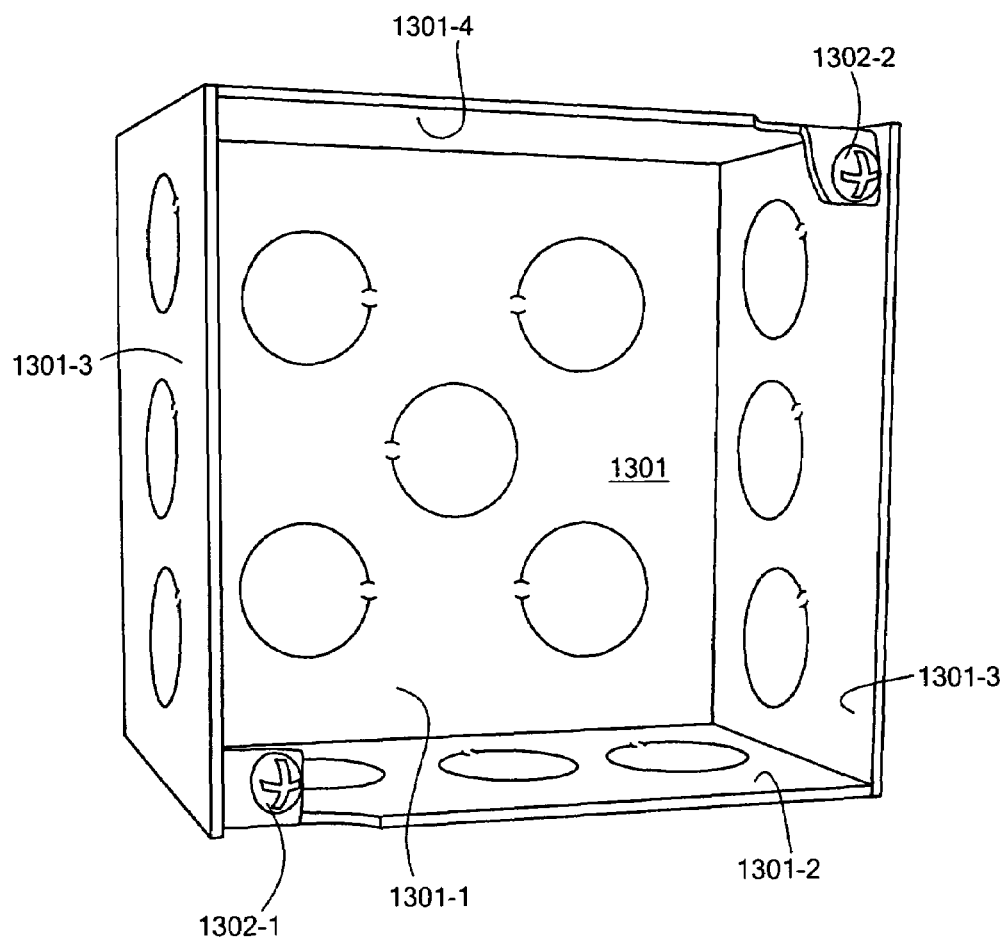
FIG. 57A is a perspective view of a rectangular commercial outlet box.

In FIG. 57A is shown a perspective view of a rectangular commercial outlet box 1301.

Box 1301 includes a back wall 1301-1 and four side walls 1301-2 through 1301-5. Box 1301 also includes a pair of plaster ring mounting screws 1302-1 and 1302-2.

Figure 57B:
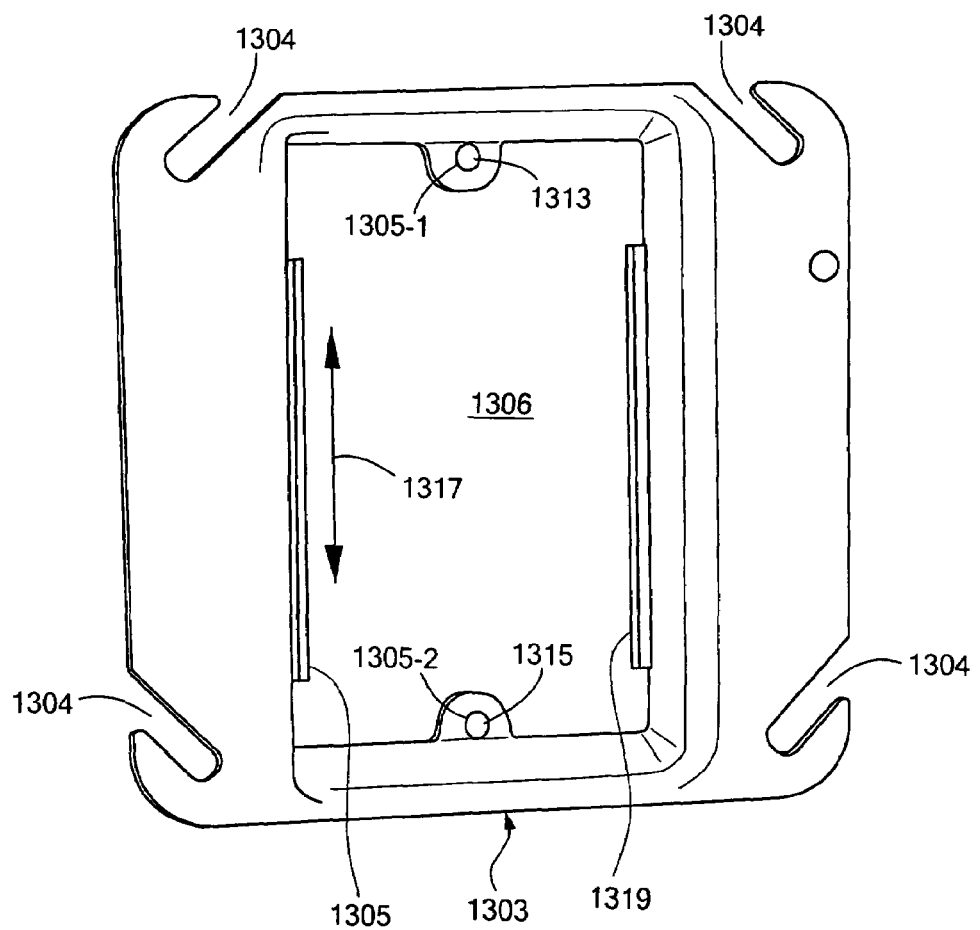
FIG. 57B is a perspective view of a rectangular plaster ring having a rectangular single gang opening which can be mounted on the commercial outlet box shown in FIG. 57A. Also shown is a single gang cover according to this invention which is removably mounted on the rectangular plaster ring.
Figure 58B:
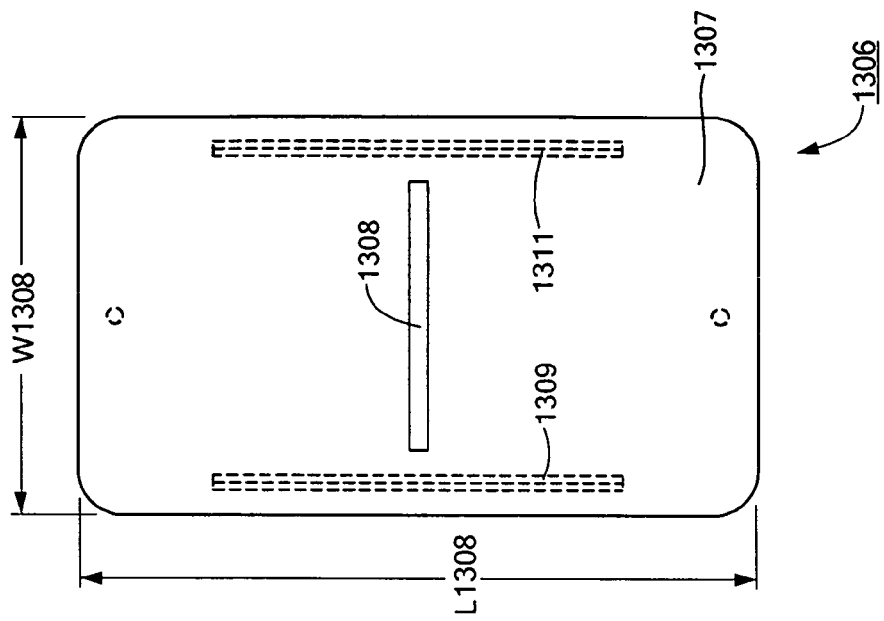
FIG. 58A through 58D are perspective, top, side and front views, respectively, of the cover shown in FIG. 57B.
Figure 58A:
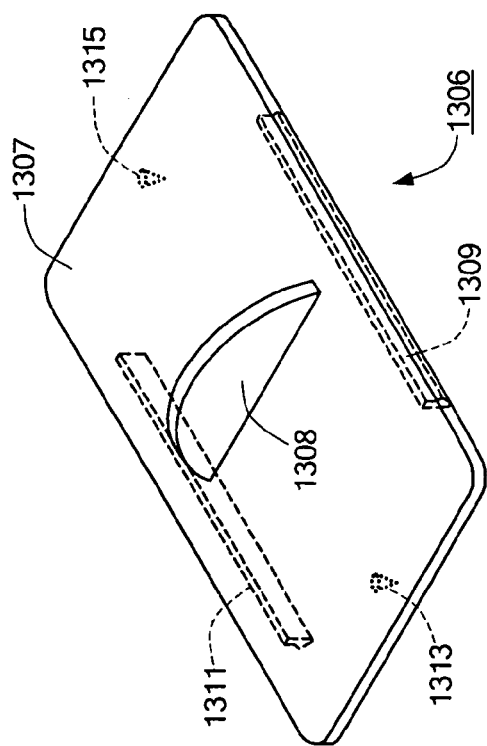
Figure 58E:
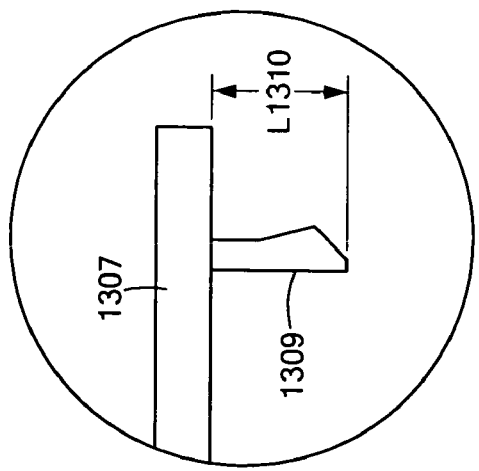
FIG. 58E is a fragmentary view of the cover and plaster ring shown in FIG. 57B.
Figure 58D:
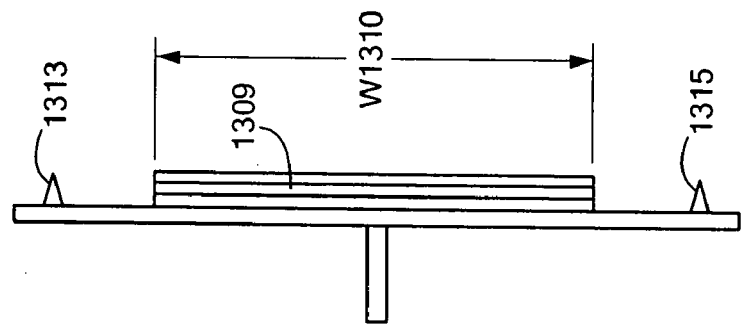
Figure 58C:
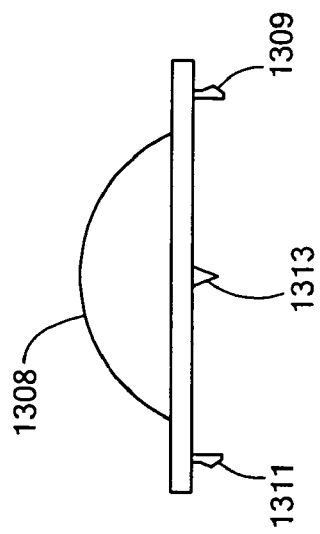

A rectangular plaster ring 1303 having a single gang opening 1305 and a pair of holes 1305-1 and 1305-2 and which can be mounted on box 1301 is shown in FIG. 57B. Ring 1303 also includes slots 1304 for use in attaching ring 1303 to box 1301. Also shown in FIG. 57B is a cover 1306 mounted on plaster ring 1303. Perspective and other views of cover 1306 are shown in FIGS. 58A through 58D. A fragmentary view of cover 1306 is shown in FIG. 58E. Cover 1308 comprises a flat rectangular plate 1307 having a length L1308 of about 3.73 inches a width W1308 of about 2.23 inches and having integrally formed therein a pair of identical flexible retaining wings 1309 and 1311 each having a width W1310 of about 2.250 inches and a length L1310 of about 0.170 inches and a pair of pointed posts 1313 and 1315 each having a length L1314 of about 0.125 inches. Posts 1313 and 1315 are positioned so as to extend through holes 1305-1 and 1305-2 when cover 1306 is mounted on ring 1303. Cover 1306 also includes a handle 1308. The sole reason for having posts 1313 and 1315 is to limit movement of cover 1306 in the direction of arrows 1317 in FIG. 57B when it is mounted on ring 1303. In mounting cover 1306 onto ring 1303, cover 1306 is pushed onto ring 1303 from the top until wings 1309 and 1311 grab underneath lip 1319 in ring 1303 and snap into place. Also, as can be seen, the bottom of wings 1309 and 1311 taper outward at their outermost ends. Also, posts 1313 and 1315 extend through holes 1305-1 and 1305-2 when cover 1306 is mounted on ring 1303.

Figure 59:
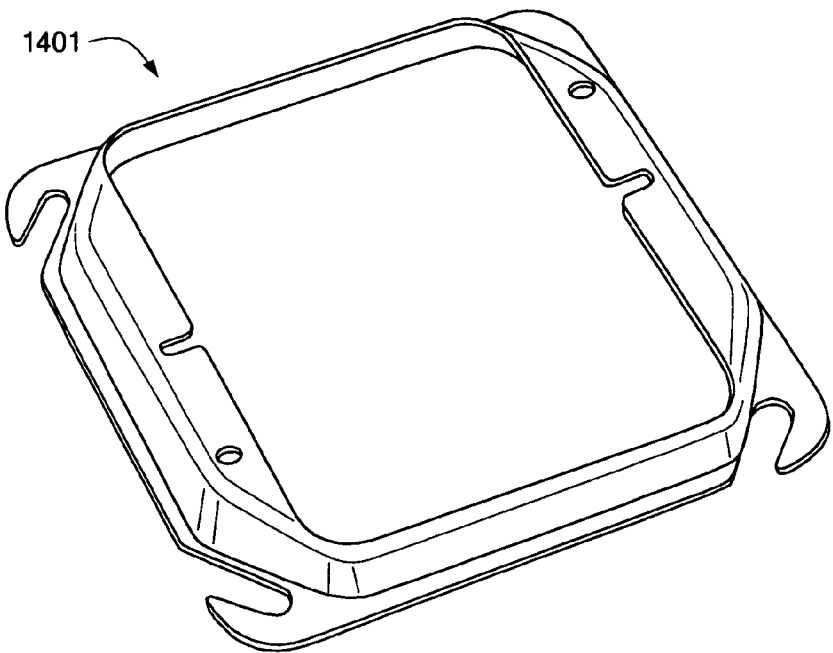
FIG. 59 is a perspective view of a two gang rectangular plaster ring which can be mounted on the electric box shown in FIG. 57A.
Figure 60A:
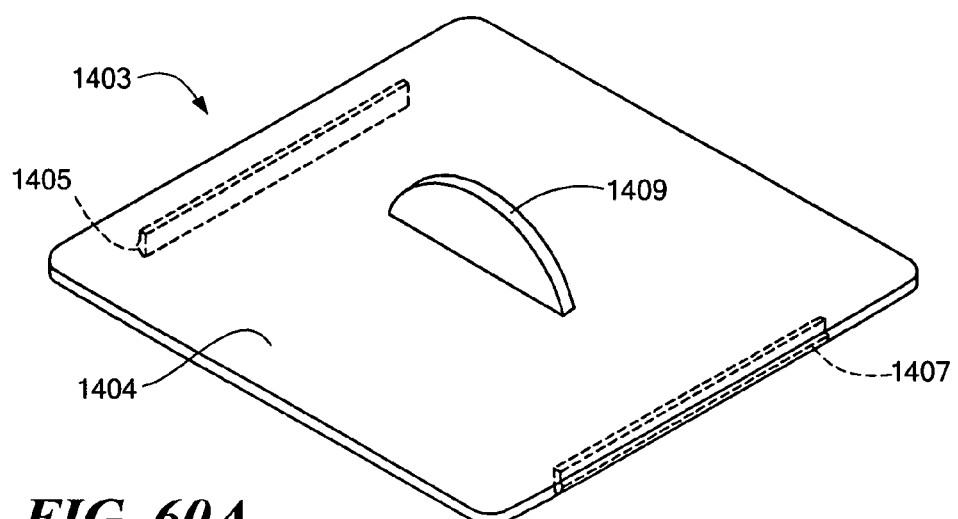
Figure 60D:
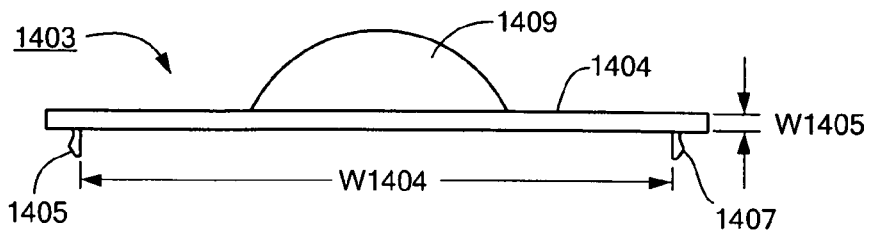
Figure 60E:
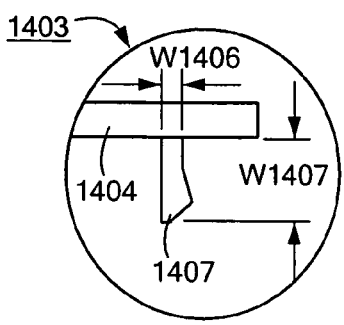
Figure 60F:
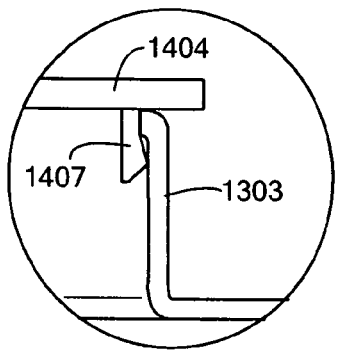
FIG. 60F is a fragmentary front view of the cover in FIG. 60D mounted on the plaster ring in FIG. 59.

A two gang plaster ring 1401 which can be removably mounted on outlet box 1301 is shown in FIG. 59 and perspective and other views of a two gang commercial cover 1403 which can be mounted on plaster ring 1401 are shown in FIG. 60A through 60E. Cover 1403 includes a flat rectangular plate 1404 having a pair of wings 1405 and 1407 extending down from the bottom surface and a handle 1409 extending up from the top surface. As can be seen, cover 1403 does not include any posts because the width W1401 of wings 1405 and 1407, which is about 2.250 inches, is sufficient to limit movement on ring 1401 when cover 1403 is mounted thereon. Other dimensions of cover 1403 are W1402 are W1402 is about 3.73 inches, W1403 is about 3.92 inches, W1404 is about 3.552 inches, W1405 is about 0.075 inches, W1406 is about 0.040 inches and W1407 is 0.170 inches.

Figure 61:
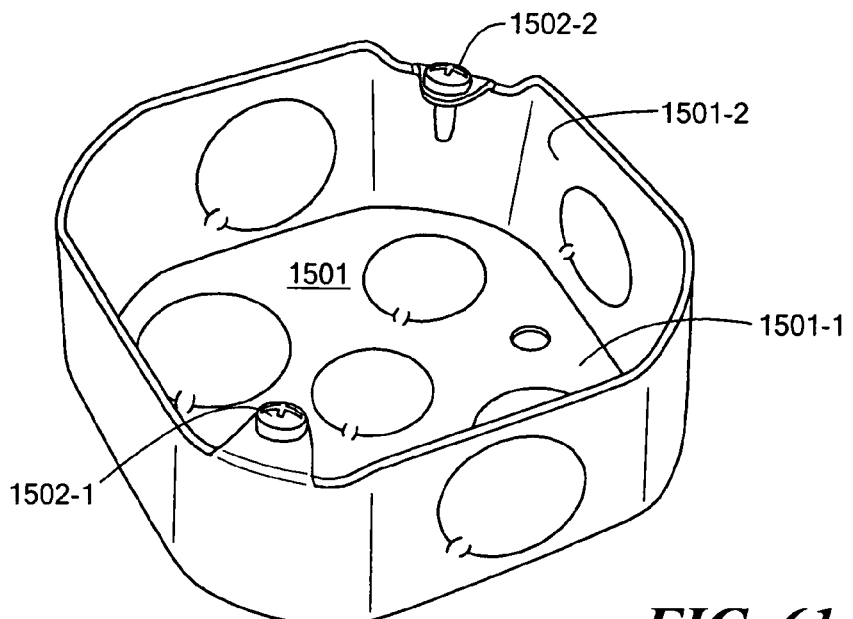
FIG. 61 is a perspective view of a circular commercial electrical outlet box.
Figure 62A:
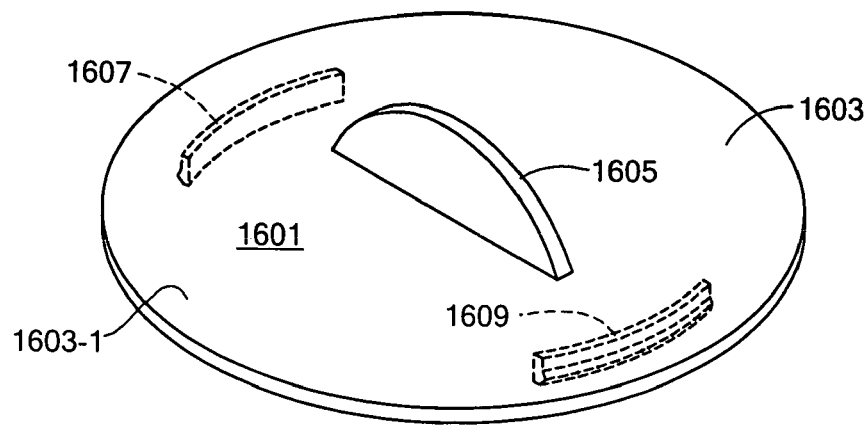
Figure 62B:
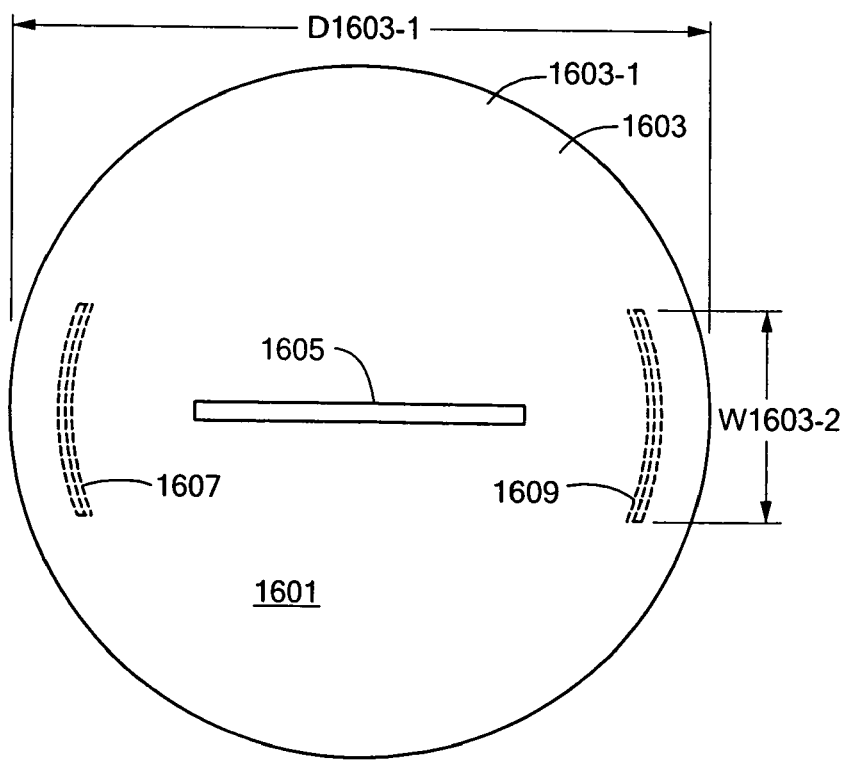
Figures 63E, 63F, 63I, 63J, 63K:
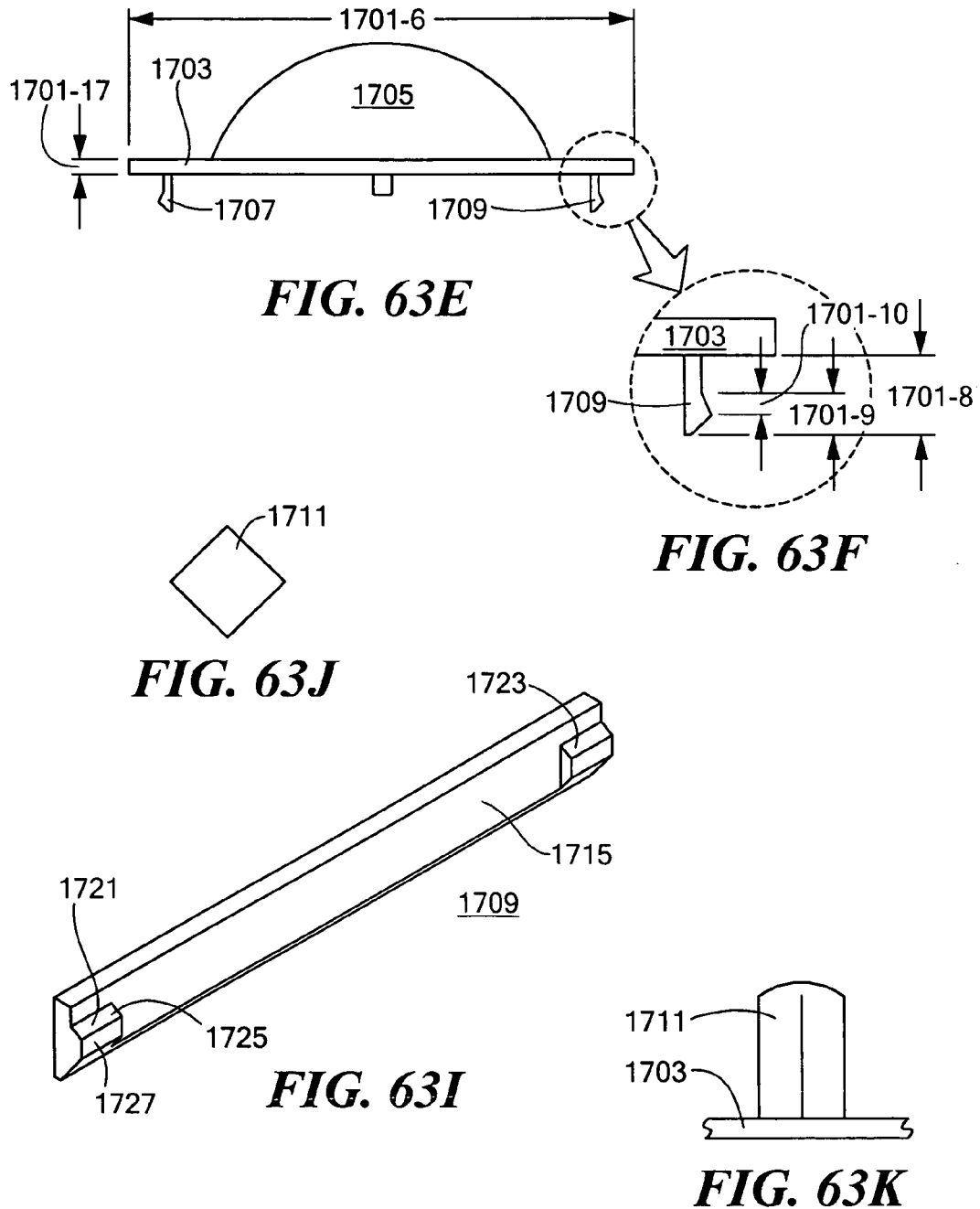
Figures 64E, 64H:
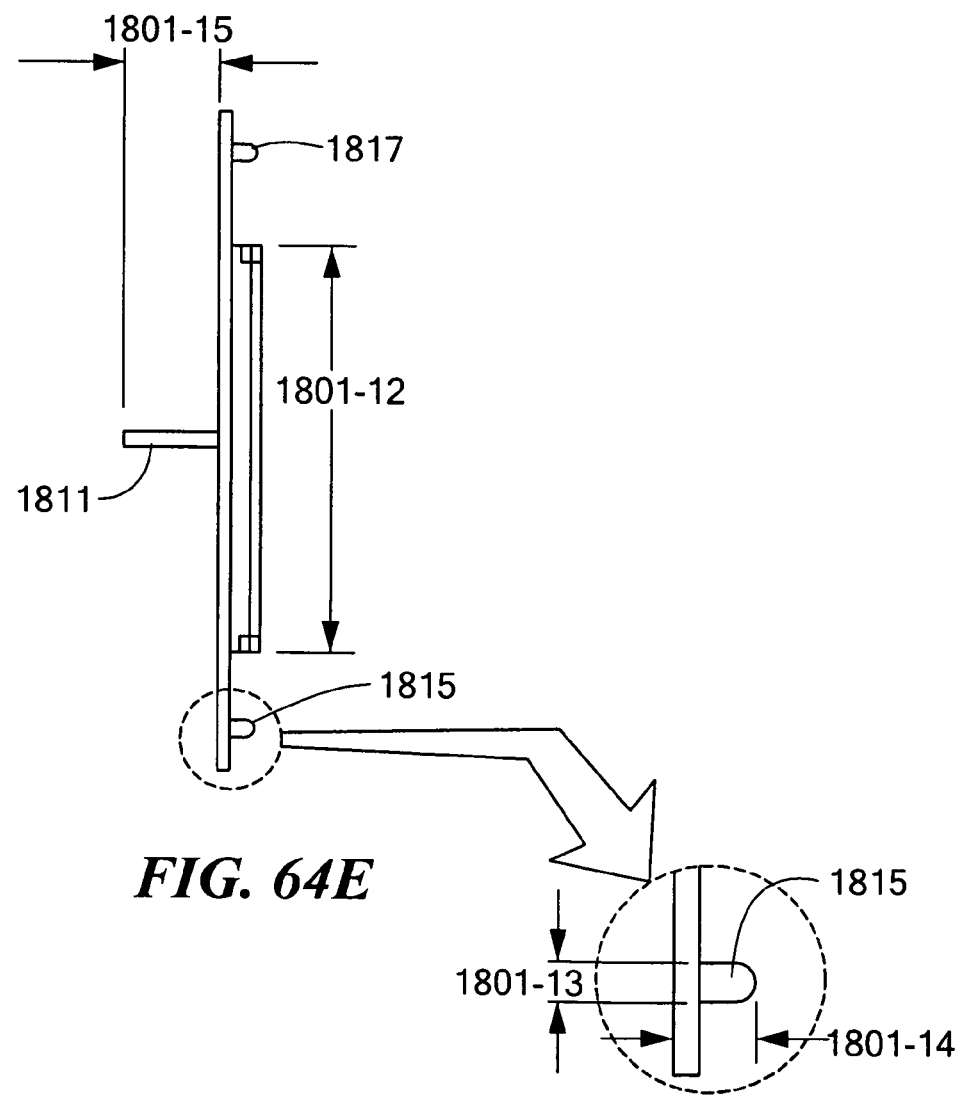

In FIG. 61 is shown a perspective view of a circular type commercial electrical outlet box 1501. Box 1501 includes back wall 1501-1 and a side wall 1501-2. A pair of plaster ring mounting screws 1502-1 and 1502-2 are mounted on box 1501. In FIG. 62 is a perspective view of a circular plaster ring 1503 which can be mounted outlet box 1501, plaster ring 1503 having a circular opening 1505.

In FIG. 62A through 62E are shown perspective and other views of a cover 1601 which can be removably mounted on plaster ring 1503.

Cover 1601 is a unitary device and includes a circular plate 1603 having a top surface 1603-1 and a bottom surface 1603-2, a handle 1605 extending up from top surface 1603-1 and a pair of retention wings 1607 and 1609 extending down from bottom surface 1603-2.

Other dimensions of cover 1603 are D1603-1 is about 3.250 inches, W1603-2 is about 1.000 inches.

Referring now to FIGS. 63A through 63I, there are shown views of another embodiment of a cover for a single gang plastic ring which can be removably mounted on a commercial type electrical box, the cover being identified by reference numeral 1701.

Cover 1701 comprises a flat rectangular plate 1703 having internally formed thereon a handle 1705 for holding cover 1701 and a pair of identical flexible retaining wings 1701 and 1709 for removably securing cover 1701 to the plastic ring. As such, cover 1701 is identical to cover 1306. However, cover 1306 differs from cover 1306 in that in addition to handle 1705 and wings 1707 and 1709 cover 1701 includes a pair of posts 1711 and 1713, not pointed as with posts 1313 and 1315 in cover 1306, but rather, sized, shaped and positioned so that they can be press fit into the mounting screw holes in the plaster ring and also removably secure cover 1701 to the plaster ring. The reason for having posts sized and shaped in this manner is that the plaster rings made by some manufacturers will have central openings sized such that the retaining rings will not grab onto the sides of the central opening. In this case, the posts themselves will serve to removably secure the cover to the plaster ring and not merely limit movement of cover on the plaster ring as with posts 1313 and 1315.

Wings 1701 and 1709 are identical. Wing 1707 comprises an elongated leg 1715 which is integrally formed and extends out from the bottom surface of plate 1703 and a pair of spaced apart identical feet 1717 and 1719, one at each end of the free end of leg 15. Leg 1715 is an elongated generally straight ember which except for feet 1721 and 1723 is generally rectangular in longitudinal cross-section. Foot 1721 has an outwardly tapered portion 1725 and an inwardly tapered portion 1727. Since there are two feet 1721 and 1723, one at each end of wing 1707, rather than one foot that extends the entire length of the wing as inn wing 1309 or wing 719, it is easier to snap the cover onto the plastic ring.

Posts 1711 and 1713 are identical, generally square in cross-section and uniform in cross-sectional area throughout their length.

Dimensions of cover 1701 are as follows: 1701-1 about 3.73 inches, 1701-2 about 2.23 inches, 1701-3 about 2.250 inches, 1701-4 about 0.170 inches, 1701-5 about 0.130 inches, 1701-6 about 1.845 inches, 1701-7 about 1.12 inches, 1701-8 about 0.170 inches, 1701-9 about 0.105 inches, 1701-10 about 0.040 inches, 1710-11 about 0.092 inches, 1701-12 about 0.083 inches, 1701-13 about 0.092 inches, 1701-14 about 0.065 inches square, 1701-15 about 3.313 inches, and 1701-16 about 0.21 inches, 1701-17 about 0.075 inches, 1701-18 about 0.130 inches, 1701-19 about 0.130 inches, 1701-20 about 0.745 inches and 1701-21 about 0.500 inches.

Cover 1701 is removably mounted onto a plaster ring in the same way as cover 1306.

Cover 1701 may be made of polycarbonate regrind.

Referring now to FIGS. 64A through 64H there are shown views of another cover identified by reference numeral 1801 which can be removably mounted on rectangular two gang plaster ring having a two gang opening 1402 and being sized so that it can be mounted onto commercial type electrical box such as box 1301 shown in FIG. 57A.

Cover 1801 which may be made of polycarbonate regrind comprises a flat rectangular plate 1803 having a pair of wings 1805 and 1807 extending down form the bottom surface 1809 of plate 1803 and a handle 1811 extending up from the top surface 1813 of plate 1803. Whereas cover 1403 does not include any posts, cover 1803 includes a pair of posts 1815 and 1817, identical in construction to posts 1711 and 1713 and serving the same purpose as posts 1711 and 1713, namely, to removably secure cover 1801 to a two gang plaster ring. Post 1813 is positioned so as to be aligned with mounting hole 1402-1 and post 1715 is positioned so as to be aligned with mounting hole 1402-4. Wings 1805 and 1807 are identical in size and construction to wings 1707 and 1709. Cover 1801 is dimensional identical to cover 1403 and is basically identical to cover 1403, except for the addition of posts 1713 and 1715 and the specific shape of wings 1805 and 1807. Some dimensions of cover 1801 are as follows: 1801-1 about 1.816 inches, 1801-2 about 3.312 inches, 1801-3 about 0.130 inches, 1801-4 about 3.92 inches, 1801-5 about 1.96 inches, 1801-6 about 1.87 inches, 1801-7 about 3.73 inches, 1801-8 about 3.535 inches, 1801-9 about 3.615 inches, 1801-10 about 0.040 inches, 1801-11 about 0.170 inches, 1801-12 about 2.250 inches, 1801-13 about 0.092 inches, 1801-14 about 0.130 inches and 1801-15 about 0.500 inches.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A protective cover for an electrical outlet box having a plaster ring mounted thereon, said electrical outlet box having a cavity defined by a side wall, a back wall and an open front end, said plaster ring having a single gang central opening for use in accessing said cavity, said single gang central opening having a pair of opposed spaced apart sides, each side being defined by a lip, said plaster ring further having a pair of mounting screw holes for use in mounting thereon an electrical outlet, said protective cover comprising a plate sized and shaped to be removably mounted onto said plaster ring and extend over said single gang central opening, said plate having a pair of flexible wings and a pair of posts, said pair of posts being sized, shaped and positioned on said plate so that they can be press fit into said mounting screw holes in said plaster ring when said protective cover is removably mounted on said plaster ring in order to secure said protective cover to said plaster ring, and said pair of flexible wings being sized and spaced apart on said plate so that when said protective cover is removably mounted on said plaster ring and when said spacing between said pair of flexible wings is about the same as the spacing between the lip on each side of the single gang central opening, the pair of flexible wings will grab onto the lip on each side of the single gang central opening, in order to also secure said protective cover to said plaster ring along with the pair of posts.

2. The protective cover of claim 1 and wherein said single gang central opening in said plaster ring is rectangular.

3. The protective cover of claim 1 and wherein said protective cover is rectangular and said wings each have a length of about 2.250 inches.

4. The protective cover of claim 3 wherein each post is generally uniform in cross-sectional area throughout its length and rounded at its tip.

5. The protective cover of claim 4 wherein said posts are generally square in cross-section.

6. the protective cover of claim 5 wherein each wing comprises a leg and a foot at each end of the leg and wherein the feet are spaced from each other.

7. The protective cover of claim 6 wherein each foot comprises an outwardly tapered portion and an inwardly tapered portion.

8. A protective cover for an electrical outlet box having a plaster ring mounted thereon, said electrical outlet box having a cavity defined by a side wall, a back wall and an open front end, said plaster ring having a multi gang central opening for accessing the cavity in said electrical outlet box, said multi gang central opening having a pair of sides, each side being defined by a lip, said plaster ring also having a plurality of pairs of mounting screw holes for use in mounting therein a plurality of electrical outlets, said protective cover comprising a plate sized and shaped to be removably mounted onto said plaster ring and extend over said multi-gang opening, said plate having a pair of flexible wings and a pair of posts, said pair of posts being sized, shaped and positioned on said plate so that they can be press fit into two of said mounting screw holes in said plaster ring when said protective cover is removably mounted on said plaster ring in order to secure said protective cover to said plaster ring, and said pair of flexible wings being sized and spaced apart on said plate so that when said protective cover is removably mounted on said plaster ring and when said spacing between said pair of flexible wing about the same as the spacing between the lip on each side of the multi gang central opening, the pair of flexible wings will grab onto the lip on each side of the multi gang central opening in the plaster ring in order to also secure said protective cover to said plaster ring.

9. The protective cover of claim 8 wherein each wing has an end shaped to define a tapered guiding surface and a tapered engagement surface.

10. The protective cover of claim 9 wherein said posts are generally square in cross-section.

11. A protective cover for an electrical box having a cavity defined by a side wall, a back wall and an open front end, the electrical box being of the type in which a plaster ring is securely mounted over the open front end, said plaster ring having an opening for accessing the cavity and a pair of mounting screw holes, said opening in said plaster ring having a pair of sides, each side defined by a lip, said protective cover comprising a plate sized and shaped to be removably mounted onto said plaster ring and extend over said opening in said plaster ring, said plate having thereon a pair of flexible wings and a pair of posts, said pair of posts being sized, shaped and positioned on said plate so that they can be press fit into said mounting screw holes in said plaster ring, said protective cover is removably mounted on said plaster ring in order to secure said protective cover to said plaster ring, and said pair of flexible wings being sized and spaced apart on said plate so that when said protective cover is removably mounted on said plaster ring and when said spacing between said pair of flexible wings is about the same as the spacing between the lip on each side of the opening in said plaster ring, the pair of flexible wings will grab underneath the lip on each side of the opening in said plaster ring and snap into place in order to secure said protective cover to said plaster ring along with the pair of posts.

12. A protective cover for temporarily blocking a cavity in an electrical box, said electrical box having an open front end, the protective cover being sized and shaped so that are it can be removably mounted onto a plaster ring which can be securely mounted onto said electrical box over said open front end, said plaster ring having an opening having a pair of sides, each defined by a lip, and a pair of mounting screw holes for use in mounting thereon an electrical outlet, said protective cover comprising a plate sized and shaped to fit over said opening in said plaster ring, said plate having a pair of flexible wings for use in securing said protective cover to said plaster ring and a pair of posts, said pair of posts being sized and positioned to slidably extend through said pair of mounting screw holes in said plaster ring when said plate is mounted onto said plaster ring for use in limiting movement of said plate relative to said plaster ring; wherein each flexible wing is positioned to grab underneath one of the lips in the opening in the plaster ring and snap into place.

13. The protective cover of claim 12 and wherein said opening in said plaster ring is rectangular and said protective cover is shaped to fit over said opening.

14. The protective cover of claim 13 wherein said cover is rectangular and each of said flexible wings has a length of about 2.250 inches.

15. A protective cover for a circular type electrical box, said circular type electrical box having an interior cavity defined by a sidewall, a back wall and an open front end, said electrical box having a pair of threaded bores, said protective cover being a unitary device and comprising a circular plate sized and shaped such that it can be removably mounted onto said circular type electrical box and when so mounted fit over said open front end, said plate having a top surface, a bottom surface, a pair of arcuate shaped flexible wings spaced 180 degrees apart from each other and extending down from the bottom surface for use in securing said protective cover to said circular type electrical box and a handle extending up from the top surface for use in removably attaching said protective cover to said circular type electrical box and detaching said protective cover from said circular type electrical box.

16. The protective cover of claim 15 wherein said circular plate has a thickness of approximately 0.075 inches and an overall diameter of approximately 4.02 inches.

17. The protective cover of claim 15 wherein said wings have an overall length of approximately 1.00 inches.

18. The protective cover of claim 15 and further including a pair of straight strengthening ribs on the bottom surface of the circular plate, a circular strengthening ribs on the bottom surface of the circular plate and a pair of pins extending down from the bottom surface of the circular plate and intended to fit into said pair of threaded bores in said circular type electrical box.

19. The protective cover of claim 18 wherein the pins are cylindrically shaped.

20. The protective cover of claim 18 wherein the pins are four sided and inwardly tapered.

21. The protective cover of claim 15 wherein said unitary device is made of polycarbonate.

22. A protective cover for a circular type electrical box, said circular type electrical type electrical box having a cavity defined by a side wall, a back wall and an open front end and wherein a circular plaster ring is securely mounted onto said electrical box, said circular plaster ring having a circular opening for accessing the cavity in the electrical box and a pair of mounting screw holes for use in mounting thereon an electrical outlet, said protective cover comprising a unitary device, said unitary device comprising a circular plate sized and shaped to be removably mounted onto said circular plaster ring and fit over said opening in said circular plaster ring, said circular plate having a top surface and a bottom surface, a pair of arcuate shaped flexible wings spaced 180 degrees apart from each other and extending down from said bottom surface for use in securing said protective cover to said plastic ring and a handle extending up from the top surface for use in removably attaching said protective cover to said plaster ring and detaching said protective cover from said plaster ring.

23. The protective cover of claim 22 wherein said protective cover has a diameter of about 3.250 inches.

24. The protective cover of claim 23 wherein said wings have an overall length of about 1.000 inches.

25. The protective cover of claim 24 wherein said circular plate has a thickness of approximately 0.075 inches.

26. The protective cover of claim 22 wherein said unitary device is made of polycarbonate.

* * * * *